US010572187B2

(12) United States Patent
Fukutomi et al.

(10) Patent No.: US 10,572,187 B2
(45) Date of Patent: Feb. 25, 2020

(54) CONTROLLER, DATA STORAGE DEVICE, AND COMPUTER PROGRAM PRODUCT

(71) Applicant: TOSHIBA MEMORY CORPORATION, Minato-ku (JP)

(72) Inventors: Kazuhiro Fukutomi, Kanagawa (JP); Shinichi Kanno, Tokyo (JP)

(73) Assignee: TOSHIBA MEMORY CORPORATION, Minato-ku (JP)

(*) Notice: Subject to any disclaimer, the term of this patent is extended or adjusted under 35 U.S.C. 154(b) by 24 days.

(21) Appl. No.: 15/207,308

(22) Filed: Jul. 11, 2016

(65) Prior Publication Data
US 2016/0321015 A1 Nov. 3, 2016

Related U.S. Application Data

(63) Continuation of application No. 13/608,086, filed on Sep. 10, 2012, now abandoned.

(30) Foreign Application Priority Data

Feb. 8, 2012 (JP) .................................. 2012-025497

(51) Int. Cl.
*G06F 3/06* (2006.01)
(52) U.S. Cl.
CPC .......... *G06F 3/0661* (2013.01); *G06F 3/0604* (2013.01); *G06F 3/0608* (2013.01);
(Continued)
(58) Field of Classification Search
None
See application file for complete search history.

(56) References Cited

U.S. PATENT DOCUMENTS 5,305,295 A 4/1994 Chu
5,652,857 A 7/1997 Shimoi et al.
(Continued)

FOREIGN PATENT DOCUMENTS

EP 0798656 A2 * 10/1997 ....... G06F 17/30153
JP 2005-196736 A 7/2005
(Continued)

OTHER PUBLICATIONS

Hu, Xiao-Yu, et al. "Write amplification analysis in flash-based solid state drives." Proceedings of SYSTOR 2009: The Israeli Experimental Systems Conference. ACM, 2009. (Year: 2009).*

(Continued)

*Primary Examiner* — Charles Rones
*Assistant Examiner* — Hewy H Li
(74) *Attorney, Agent, or Firm* — Oblon, McClelland, Maier & Neustadt, L.L.P.

(57) ABSTRACT

According to an embodiment, a controller includes a write control unit configured to make a control that converts data requested to be written by an external device into pieces of cluster data with a size of a cluster of a storage medium, compresses each piece of cluster data, determines a corresponding physical address of a write destination in the storage medium according to a predetermined rule, and writes the compressed pieces of cluster data to the storage medium using the physical address of the write destination. The write control unit also makes a control that writes a correspondence between the physical address and a corresponding logical address to a storage unit. The controller also includes a read control unit configured to a control that reads a piece of cluster data from the storage medium using an acquired physical address, and decompresses the read piece of cluster data.

20 Claims, 23 Drawing Sheets

(52) U.S. Cl.
CPC .......... *G06F 3/0616* (2013.01); *G06F 3/0638* (2013.01); *G06F 3/0659* (2013.01); *G06F 3/0679* (2013.01)

(56) References Cited

U.S. PATENT DOCUMENTS

| | | | |
|---|---|---|---|
| 5,774,715 A * | 6/1998 | Madany | G06F 17/30153 |
| 6,823,422 B2 | 11/2004 | Maeda et al. | |
| 7,051,152 B1 * | 5/2006 | Danilak | G11B 20/10 710/68 |
| 7,058,769 B1 | 6/2006 | Danalik | |
| 7,647,358 B2 | 1/2010 | Rogers et al. | |
| 7,941,409 B2 | 5/2011 | Mimatsu | |
| 8,630,501 B1 * | 1/2014 | Fram | H04N 19/40 382/239 |
| 2002/0191692 A1 | 12/2002 | Fallon et al. | |
| 2003/0035543 A1 * | 2/2003 | Gillon | H04N 7/1675 380/270 |
| 2005/0144368 A1 | 6/2005 | Chung et al. | |
| 2006/0136365 A1 * | 6/2006 | Kedem | G06F 3/0608 |
| 2008/0062775 A1 | 3/2008 | Oh | |
| 2008/0195833 A1 | 8/2008 | Park | |
| 2008/0228992 A1 | 9/2008 | Dumitru et al. | |
| 2008/0307191 A1 | 12/2008 | Lane et al. | |
| 2010/0011150 A1 * | 1/2010 | Klein | G06F 12/0246 711/103 |
| 2010/0082537 A1 * | 4/2010 | Lasser | G06F 3/0608 707/610 |
| 2010/0088464 A1 * | 4/2010 | Yang | G06F 12/0246 711/103 |
| 2010/0161884 A1 | 6/2010 | Kurashige | |
| 2010/0281004 A1 * | 11/2010 | Kapoor | G06F 17/30501 707/693 |
| 2011/0138105 A1 * | 6/2011 | Franceschini | G06F 12/0246 711/103 |
| 2011/0145486 A1 * | 6/2011 | Owa | G06F 12/0246 711/103 |
| 2011/0202578 A1 | 8/2011 | Asano et al. | |
| 2011/0231624 A1 | 9/2011 | Fukutomi et al. | |
| 2011/0239081 A1 | 9/2011 | Hida et al. | |
| 2011/0320915 A1 * | 12/2011 | Khan | G06F 3/0608 714/773 |
| 2012/0079167 A1 | 3/2012 | Yao et al. | |
| 2012/0260009 A1 * | 10/2012 | Lu | G06F 3/0608 710/52 |
| 2013/0297900 A1 | 11/2013 | Fukutomi et al. | |

FOREIGN PATENT DOCUMENTS

| | | |
|---|---|---|
| JP | 2007-94639 A | 4/2007 |
| JP | 2008-65834 | 3/2008 |
| JP | 2011-197945 A | 10/2011 |
| JP | 2011-198272 A | 10/2011 |
| JP | 2011-527807 A | 11/2011 |

OTHER PUBLICATIONS

Office Action dated Jun. 3, 2014 in Japanese Patent Application No. 2012-025497 (with English language translation).

Necrovore. "Sector Size vs. Cluster Size". <http://graveyard-buffet.blogspot.com/2011/02/sector-size-vs-cluster-size.html>. Posted Feb. 19, 2011.

Patpatboy2. "Increasing Available Hard Drive Space by Compressing Files". <https://www.youtube.com/watch?annotation_id=annotation_424106&feature=iv&src_vid=xY0sLcD95g8&v=suJB9TLr2PE>. Uploaded Jul. 14, 2011. Included are two screenshots of the most pertinent frames of the video.

Hu, Xiao-yu et al. "Write Amplification Analysis in Flash-Based Solid State Drives". Published in 2009.

* cited by examiner

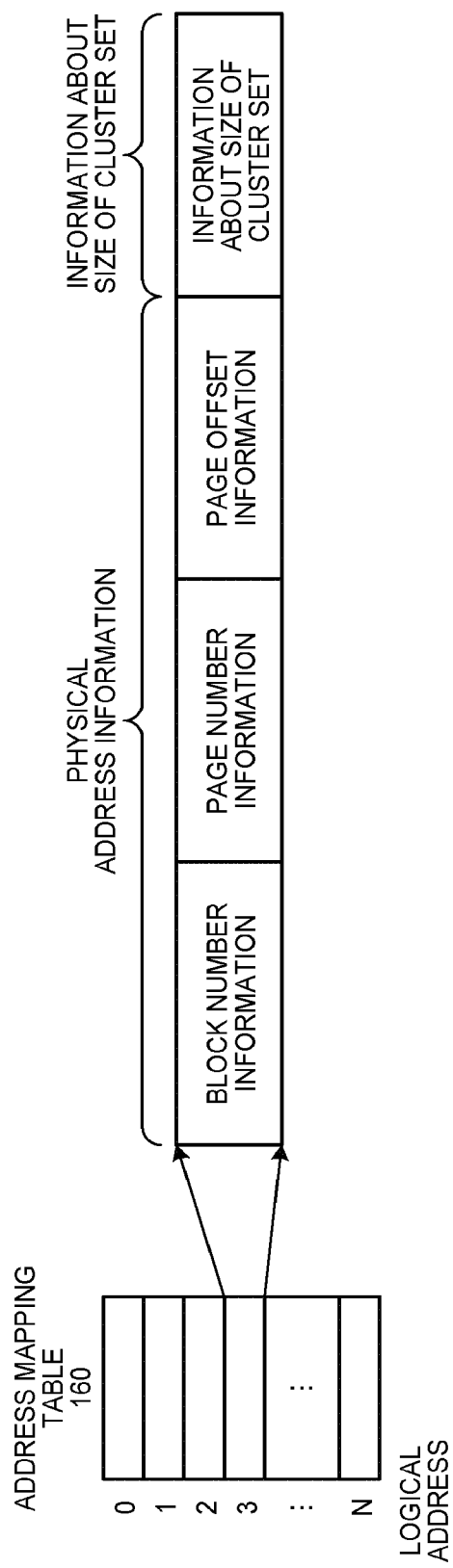

CONTROLLER, DATA STORAGE DEVICE, AND COMPUTER PROGRAM PRODUCT

CROSS-REFERENCE TO RELATED APPLICATION

This application is a continuation application of U.S. application Ser. No. 13/608,086, filed Sep. 10, 2012, which claims the benefit of priority from Japanese Patent Application No. 2012-025497, filed on Feb. 8, 2012. The entire contents of each of which are incorporated herein by reference.

FIELD

Embodiments described herein relate generally to a controller, a data storage device, and a computer program product.

BACKGROUND

A data storage device typified by a solid state drive (SSD) has been known which uses a semiconductor storage medium, such as NAND flash memory.

However, the lifespan of the semiconductor storage medium, such as NAND flash memory, depends on the number of times data is rewritten. In the data storage device using the semiconductor storage medium, it is necessary to minimize the capacity of data written to the semiconductor storage medium.

BRIEF DESCRIPTION OF THE DRAWINGS

FIG. 4 is a schematic diagram illustrating an address mapping table according to the first embodiment;

DETAILED DESCRIPTION

Figure 1:
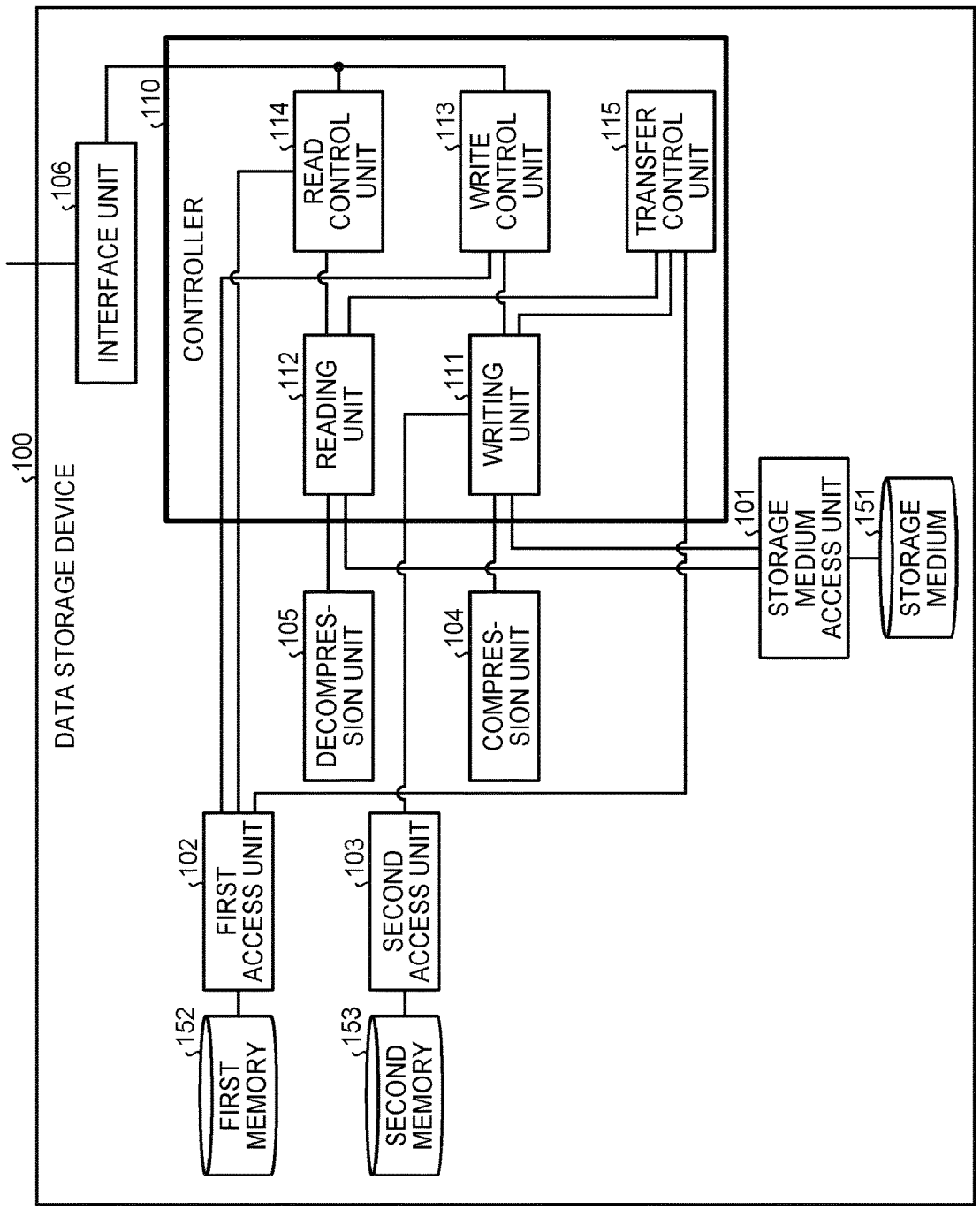
FIG. 1 is a block diagram illustrating an example of the structure of a data storage device according to a first embodiment.

According to an embodiment, a controller controls the reading and writing of data from and to a storage medium and a storage unit. The storage medium includes a plurality of pages each serving as a storage area which is a unit of input and output from and to an external device. The storage medium stores a plurality of pieces of data of clusters in each page, each of the pieces of data being a predetermined data unit. The storage unit stores correspondences between logical addresses for identifying the respective clusters and physical addresses of the storage medium. The controller includes a write control unit configured to make a control that converts data requested to be written by the external device into a plurality of pieces of cluster data with a size equal to a size of the cluster of the storage medium, compresses each of the converted pieces of cluster data by an external compression unit, determines a corresponding physical address of a write destination in the storage medium according to a predetermined rule, and writes the compressed pieces of cluster data to the storage medium using the physical address of the write destination, and a control that writes a correspondence between the physical address of the write destination and a corresponding logical address to the storage unit. The controller also includes a read control unit configured to a control that acquires a corresponding physical address of data requested to be read by the external device from the storage unit, reads a corresponding piece of cluster data from the storage medium using the acquired physical address, decompresses the read piece of cluster data by an external decompression unit, and outputs the decompressed piece of cluster data. The controller also includes a transfer control unit configured to make a control that determines a piece of cluster data to be transferred among the pieces of cluster data written to the storage medium according to a predetermined rule, reads the determined piece of cluster data from the storage medium, decompresses the read piece of cluster data by the external decompression unit, compresses the decompressed piece of cluster data by the external compression unit, determines a corresponding physical address of a transfer destination in the storage medium according to a predetermined rule, and writes the compressed piece of cluster data to the storage medium using the corresponding physical address of the transfer destination, and a control that writes a correspondence between the physical address of the transfer destination and a corresponding logical address to the storage unit.

Hereinafter, a controller, a data storage device, and a computer program product according to exemplary embodiments of the invention will be described in detail. In each of the following embodiments, for example, an SSD is used as the data storage device, but the data storage device is not limited thereto.

(First Embodiment)

A data storage device according to a first embodiment includes a controller having a function of compressing data to be written to a storage medium to reduce the amount of data.

According to the first embodiment, a controller controls the reading and writing of data from and to a storage medium and a storage unit. The storage medium includes a plurality of pages each serving as a storage area which is a unit of input and output from and to an external device. The storage medium stores a plurality of pieces of data of clusters in each page, each of the pieces of data being a predetermined data unit. The storage unit stores correspondences between logical addresses for identifying the respective clusters and physical addresses of the storage medium. The controller includes a write control unit configured to make a control that converts data requested to be written by the external device into a plurality of pieces of cluster data with a size equal to a size of the cluster of the storage medium, compresses each of the converted pieces of cluster data by an external compression unit, determines a corresponding physical address of a write destination in the storage medium according to a predetermined rule, and writes the compressed pieces of cluster data to the storage medium using the physical address of the write destination, and a control that writes a correspondence between the physical address of the write destination and a corresponding logical address to the storage unit. The controller also includes a read control unit configured to a control that acquires a corresponding physical address of data requested to be read by the external device from the storage unit, reads a corresponding piece of cluster data from the storage medium using the acquired physical address, decompresses the read piece of cluster data by an external decompression unit, and outputs the decompressed piece of cluster data. The controller also includes a transfer control unit configured to make a control that determines a piece of cluster data to be transferred among the pieces of cluster data written to the storage medium according to a predetermined rule, reads the determined piece of cluster data from the storage medium, decompresses the read piece of cluster data by the external decompression unit, compresses the decompressed piece of cluster data by the external compression unit, determines a corresponding physical address of a transfer destination in the storage medium according to a predetermined rule, and writes the compressed piece of cluster data to the storage medium using the corresponding physical address of the transfer destination, and a control that writes a correspondence between the physical address of the transfer destination and a corresponding logical address to the storage unit.

In the controller of the data storage device according to the first embodiment, the write control unit controls whether the external compression unit compresses the pieces of cluster data according to a predetermined rule. The read control unit controls whether the external decompression unit decompresses the piece of cluster data according to a predetermined rule. The transfer control unit controls whether the external decompression unit decompresses the piece of cluster data according to a predetermined rule and controls whether the external compression unit compresses the piece of cluster data according to a predetermined rule.

In the controller of the data storage device according to the first embodiment, the storage medium includes a block including the plurality of pages. The write control unit makes a control that writes the pieces of cluster data across the plurality of pages with consecutive physical addresses, respectively, in a management unit in which the block is managed into the storage medium. When the pieces of cluster data are written across the plurality of pages with the consecutive physical addresses in the management unit in which the block is managed, the read control unit makes a control that reads the plurality of pages and extracts the pieces of cluster data. When the pieces of cluster data are written across the plurality of pages with the consecutive physical addresses in the management unit in which the block is managed, the transfer control unit makes a control that reads the plurality of pages and extracts the pieces of cluster data. The transfer control unit makes a control that writes the pieces of cluster data across the plurality of pages with consecutive physical addresses, respectively, in the management unit in which the block is managed into the storage medium.

Hereinafter, an example will be described in detail. FIG. 1 is a block diagram illustrating the example of the structure of a data storage device 100 according to the first embodiment. As illustrated in FIG. 1, the data storage device 100 includes a controller 110, a storage medium access unit 101, a first access unit 102, a second access unit 103, a compression unit 104, a decompression unit 105, an interface unit 106, a storage medium 151, a first memory 152, and a second memory 153.

(Storage Medium 151)

Figure 2:
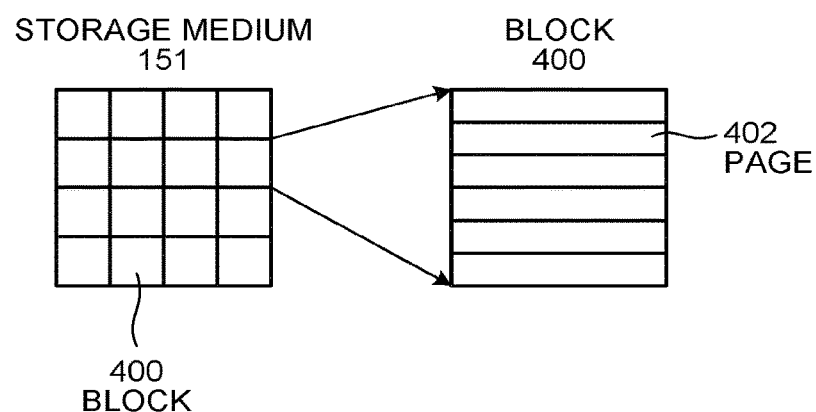
FIG. 2 is a schematic diagram illustrating the relationship between a block and a page in a storage medium.

The storage medium 151 is a semiconductor storage medium, such as NAND flash memory. The storage medium 151 includes a plurality of blocks 400, as illustrated in FIG. 2. The block 400 is, for example, a unit of data reading and writing for the semiconductor storage medium. For example, a deletion process is performed for each block 400 in the storage medium 151.

As illustrated in FIG. 2, the block 400 includes a plurality of pages 402. The page 402 is a unit of data input and output between the storage medium 151 and the outside (for example, the storage medium access unit 101) of the storage medium 151. Consecutive page numbers (serial numbers) are given to each page 402 of the block 400. In addition, data is written to the storage medium 151, for example, in ascending order of the page numbers. That is, data is written to the storage medium 151 in the following order: for example, after a process of deleting data which is recorded in the unit of the blocks 400 in advance, data is written in ascending order of the page numbers.

Figure 3A:
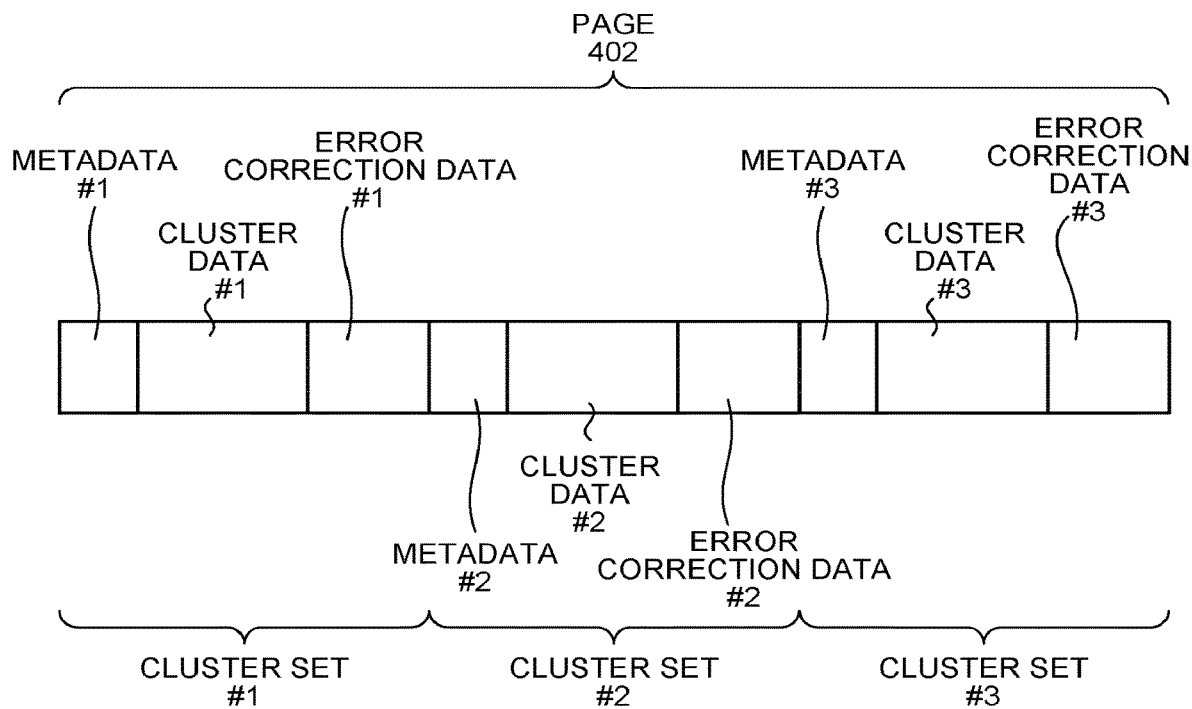
FIGS. 3A and 3B are schematic diagrams illustrating the storage position (arrangement) of a cluster set in the page.

As illustrated in FIG. 3A, a plurality of cluster sets are stored in the page 402. The cluster set includes cluster data and error correction data. The basic data for generating the error correction data includes the cluster data. The cluster is a unit of data in the data storage device 100. In addition, address information for identifying the cluster is, for example, a logical address.

The size of the cluster is set to, for example, 1024 bytes, but is not limited thereto. The cluster data which is stored as a portion of the cluster set in the page 402 may or may not be compressed. The cluster set may further include metadata, which is information indicating the cluster. The metadata is, for example, the logical address of the cluster. When the metadata is included in the cluster set, the basic data for generating the error correction data also includes the metadata. In addition, when the cluster set includes the metadata, the metadata which is stored as a portion of the cluster set in the page 402 may or may not be compressed. In the first embodiment, an example in which the cluster set includes the metadata will be described, but the invention is not limited thereto. The cluster set may not include the metadata.

The cluster set may further include cluster set size data, which is information indicating the size of the cluster set. When the cluster set includes the cluster set size data, the cluster set size data which is stored as a portion of the cluster set in the page 402 is not compressed. In the first embodiment, an example in which the cluster set does not include the cluster set size data will be described, but the invention is not limited thereto. The cluster set may include the cluster set size data.

The storage format of the cluster set stored in the page 402 is not limited to the example illustrated in FIG. 3A. The cluster set may be stored in the page 402 in any storage format as long as each data piece included in the cluster set can be appropriately extracted. For example, as illustrated in FIG. 3A, the metadata, the cluster data, and the error correction data are not necessarily stored in the page 402 in this order.

Figure 3B:
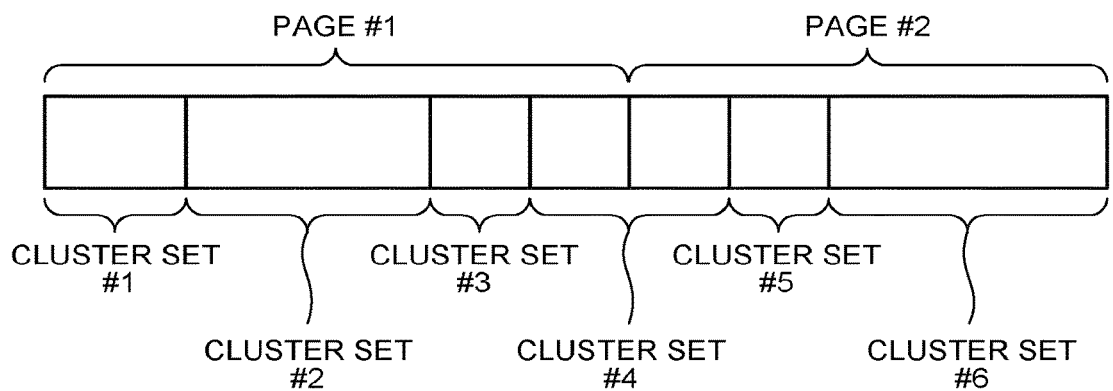

Two pages 402 including consecutive physical address information items, which will be described below, may include one cluster set in a management unit managing the block 400, as illustrated in FIG. 3B. That is, the cluster set may be stored across two pages 402. When only the page 402 stores the cluster set, the page 402 may be configured such that dummy data is stored in the area in which the cluster set is not stored. The dummy data may have a predetermined value (for example, all zero) or a random value. The page 402 may be configured such that the dummy data is stored instead of the error correction data. When the page 402 stores the error correction data, it is possible to improve the reliability of data stored in the storage medium 151. In addition, the page 402 may be configured such that the order of the cluster sets is appropriately changed to reduce the amount of dummy data stored. When the amount of dummy data stored in the page 402 is reduced, it is possible to improve the usage efficiency of the storage medium 151.

(Storage Medium Access Unit 101)

When receiving an instruction to write data to the storage medium 151, the storage medium access unit 101 (FIG. 1) inputs data which is instructed to be written to the storage medium 151 and performs a writing process. When receiving an instruction to read data stored in the storage medium 151, the storage medium access unit 101 reads data which is instructed to be read from the storage medium 151 and returns the read data to a request source which has requested the reading process.

(First Memory 152)

The first memory 152 stores management information. The management information includes an address mapping table 160. The address mapping table 160 is a table in which the logical address of the cluster is associated with the physical address information (hereinafter, in some cases, simply referred to as a physical address) of the storage medium 151 in which data indicated by the logical address is stored. In addition, the first memory 152 may be configured so as to store information derived from the information of the address mapping table 160 in advance in order to simplify various processes performed by the data storage device 100.

As described with reference to FIG. 3A, when the page 402 stores a plurality of cluster sets, the address mapping table 160 includes, as indexes, the logical addresses which are arranged in ascending order as illustrated in FIG. 4. The address mapping table 160 stores, as elements of the table, a set of block number information, page number information, and information about a page offset (an offset on a page), which are the physical address of the storage medium 151.

The address mapping table 160 stores information about the size of the cluster set stored in the storage medium 151. The information about the size of the cluster set is not necessarily stored in the address mapping table 160. For example, the metadata may include the information about the size of the cluster set.

In the first embodiment, an example in which the address mapping table 160 includes the information about the size of the cluster set will be described. However, the invention is not limited thereto. The address mapping table 160 may not include the information about the size of the cluster set. In this embodiment, the pages 402 with consecutive page numbers in the same block 400 correspond to two pages 402 which have consecutive physical addresses in a management unit managing the block 400 which is described with reference to FIG. 3B.

For example, a page with page number 34 in a block with block number 66 is the left page of FIG. 3B and a page with page number 35 in the same block (block number 66) is the right page of FIG. 3B. In this case, in the physical address of the cluster set in the page, the block number information is 66, the page number information is 34, and the information about the page offset is the storage start position of the cluster set. In addition, when data for the cluster set stored across the pages is needed, data may be read with the page offset being zero in the page with page number 35 in the block with block number 66. As such, two pages 402 with consecutive physical addresses may store one cluster set in the management unit managing the block 400.

The structure of the address mapping table 160 is not limited to that illustrated in FIG. 4. For example, when the data storage device 100 includes a plurality of storage media 151 and parallel access to the storage media 151 is performed to improve the processing speed, the address mapping table 160 may be configured such that various kinds of information are associated with each other using a logical block, which is a set of block groups selected from each storage medium 151, as a unit. In addition, the address mapping table 160 may be configured such that various kinds of information are associated with each other using a logical page, which is a set of the pages with the same page number in a plurality of blocks 400 forming the logical block, as a unit.

The management information may be configured so as to further include a logical-physical conversion table (not illustrated) for deriving information about the blocks 400 forming the logical block from logical block information. In addition, the management information may be configured so as to include, as the physical address of the storage medium 151, logical block number information, logical page number information, and information about an offset on the logical page. In this case, consecutive pages forming the same logical page, or pages with consecutive logical page numbers in the same logical block correspond to the two pages 402 with consecutive physical addresses in the management unit managing the block 400 which is described with reference to FIG. 3B.

For the former, for example, it is assumed that a block with block number 5, a block with block number 97, a block with block number 36, and a block with block number 104 form a logical block with logical block number 49 and the clusters are written to the logical pages in this order. At that time, for example, in the logical page with logical page number 40, a page with page number 40 in the block with block number 5 is the left page of FIG. 3B and a page with page number 40 in the block with block number 97 is the right page of FIG. 3B. In the physical address of the cluster set stored in consecutive pages with the same logical page, the logical block number information is 49, the logical page number information is 40, and the information about the offset on the logical page is the storage start position of the cluster set. In addition, when data for the cluster set stored across consecutive pages with the same logical page is needed, data may be read from an offset 0 on the page with page number 40 in the block with block number 97.

For the latter, for example, a logical page with logical page number 34 in a logical block with logical block number 66 is the left page of FIG. 3B and a logical page with logical page number 35 in the same logical block (logical block number 66) is the right page of FIG. 3B. In this case, in the physical address of the cluster set stored across the logical pages, the logical block number information is 66, the logical page number information is 34, and the information about the offset on the logical page is the storage start position of the cluster set. In addition, when data for the cluster set stored across consecutive pages in the same logical page is needed, data may be read from an offset 0 on the logical page with logical page number 35 in the logical block with logical block number 66. Therefore, the two pages 402 with consecutive physical addresses may store one cluster set in the unit of management of the block 400.

As such, the structure of the address mapping table 160 may be changed in various ways. In the first embodiment, for example, the address mapping table 160 includes the block number information, the page number information, and the information about the page offset as the physical address of the storage medium 151. However, the structure of the address mapping table 160 is not limited thereto and the address mapping table 160 may have other structures.

(First Access Unit 102)

When receiving an instruction to write data to the first memory 152, the first access unit 102 (FIG. 1) writes data which is instructed to be written to the first memory 152. In addition, when receiving an instruction to read data stored in the first memory 152, the first access unit 102 reads data which is instructed to be read from the first memory 152 and returns the read data to a request source which has requested the reading.

(Second Memory 153)

The second memory 153 temporarily stores a plurality of cluster sets to be written.

(Second Access Unit 103)

When receiving an instruction to write data to the second memory 153, the second access unit 103 writes data which is instructed to be written to the second memory 153. In addition, when receiving an instruction to read data stored in the second memory 153, the second access unit 103 reads data which is instructed to be read from the second memory 153 and returns the read data to a request source which has requested the reading process.

(Compression Unit 104)

When receiving an instruction to compress data, the compression unit 104 reversibly compresses the instructed data using a predetermined method and returns the compressed data to a request source which has requested compression.

(Decompression Unit 105)

When receiving an instruction to decompress the data compressed by the compression unit 104, the decompression unit 105 decompressed the instructed data using a predetermined method and returns the decompressed data to a request source which has requested decompression.

(Controller 110)

The controller 110 includes a writing unit 111, a reading unit 112, a write control unit 113, a read control unit 114, and a transfer control unit 115.

(Writing Unit 111)

The writing unit 111 receives a cluster write request from the write control unit 113 (or transfer control unit 115). The cluster write request includes write destination information, cluster data to be written, and data indicating the logical address of the cluster to be written. The write destination information includes the block number of the write destination of the cluster, a page number, and information about an offset on a page.

The writing unit 111 extracts the cluster data to be written from the received cluster write request. The writing unit 111 transmits the extracted cluster data to be written to the compression unit 104 and instructs the compression unit 104 to compress the cluster data. Then, the writing unit 111 acquires the cluster data to be written which is compressed by the compression unit 104. When there is no necessity to compress the cluster data, the writing unit 111 processes the extracted cluster data to be written in the same way as that in which the compressed cluster data to be written is processed, without transmitting the cluster data to the compression unit 104 (the cluster data is regarded as the compressed cluster data to be written). For example, when there is little difference between the size of data obtained by compressing the extracted cluster data to be written and the size of the cluster data before compression, the effect of compressing the cluster data is small. Therefore, it is not necessary to compress the cluster data. In this case, the writing unit 111 may not transmit the cluster data to the compression unit 104.

The writing unit 111 extracts data indicating the logical address of the cluster to be written from the received cluster write request and generates metadata including the extracted data indicating the logical address of the cluster to be written. When the metadata included in the cluster set is compressed, the writing unit 111 may instruct the compression unit 104 to compress the generated metadata, acquire the compressed metadata from the compression unit 104, and replace the generated metadata with the acquired compressed metadata. The writing unit 111 generates the error correction data on the basis of the compressed cluster data to be written and data including the generated metadata. Then, the writing unit 111 generates the cluster set including the compressed cluster data to be written, the generated metadata, and the generated error correction data.

Then, the writing unit 111 calculates the size of the generated cluster set. Then, the writing unit 111 determines whether the generated cluster set is fitted into a page, which is a write destination. Specifically, the writing unit 111 determines whether the sum of the information about the page offset included in the write destination information and the calculated size of the cluster set is within the size of the page.

When the determination result is YES (the cluster set is fitted into the page, which is a write destination), the writing unit 111 instructs the second access unit 103 to perform a writing process such that the second memory 153 temporarily stores the generated cluster set. In addition, the writing unit 111 returns the information about the size of the cluster set to a request source (write request source) which has requested the writing process.

When the determination result is No (the cluster set is not fitted into the page, which is a write destination), the writing unit 111 returns a response indicating the overflow of the page, which is a write destination, to the request source which has requested the writing process. When receiving the next write destination information from the write request source, the writing unit 111 instructs the second access unit 103 to perform a writing process such that the second memory 153 temporarily stores the generated cluster set. In addition, the writing unit 111 returns the information about the size of the cluster set to the write request source.

When receiving an instruction to store the dummy data from the write request source, the writing unit 111 generates dummy data corresponding to the size of the area in which the cluster set is not stored in the page, which is a write destination. The dummy data may have a predetermined value (for example, all zero) or a random value. Then, the writing unit 111 instructs the second access unit 103 to perform a writing process such that the second memory 153 temporarily stores the generated dummy data.

The writing unit 111 may be configured so as to generate the error correction data of the cluster set which is temporarily stored in the second memory 153, instead of the dummy data. When the error correction data of the cluster set temporarily stored in the second memory 153 is generated, it is possible to improve the reliability of the data stored in the storage medium 151. In addition, the cluster sets may be stored in the second memory 153 such that the order thereof is appropriately changed, thereby reducing the amount of dummy data stored in the second memory 153. When the amount of dummy data stored in the second memory 153 is reduced, it is possible to improve the usage efficiency of the storage medium 151.

When the total size of the data temporarily stored in the second memory 153 is equal to or more than the size of the page 402, the writing unit 111 instructs the second access unit 103 to read data corresponding to the size of the page from the second memory 153. In this way, the writing unit 111 acquires data corresponding to the size of the page. Specifically, the writing unit 111 instructs the second access unit 103 to read the data stored in the left page of FIG. 3B among the data pieces temporarily stored in the second memory 153.

In a case in which the data storage device 100 includes a plurality of storage media 151 and parallel access to the storage media 151 is performed to improve the processing speed, when the total size of the data temporarily stored in the second memory 153 is equal to or more than the size of the pages 402 to which data is written in parallel, the writing unit 111 instructs the second access unit 103 to read data corresponding to the size of the pages to which data is written in parallel from the second memory 153.

Then, the writing unit 111 instructs the storage medium access unit 101 to write the data corresponding to the page size (or the size of the pages to which data is written in parallel) which is acquired through the second access unit 103 to the write destination pages (or each page to which data is written in parallel).

Here, the write destination page is the left page of FIG. 3B. The writing unit 111 instructs the storage medium access unit 101 to write the block number of the write destination of the cluster and the page number which are included in the write destination information received from the write request source. The writing unit 111 transmits a notice indicating that the writing of data to the page, which is a write destination, has been completed to the write request source. In addition, the writing unit 111 notifies the write request source of the block number of the write destination of the cluster and the page number which are included in the write destination information received from the write request source.

In the first embodiment, the block 400 to which data which is requested to be written by the host apparatus is written is different from a transfer destination block 400. Therefore, when the write request source is the transfer control unit 115, the writing unit 111 performs the same process as that performed when the write request source is the write control unit 113 on another write destination page.

The writing unit 111 may be configured such that the block 400 to which data which is requested to be written by the host apparatus is written is the same as the transfer destination block 400. For example, even when there is a write request from the write control unit 113 or there is a write request from the transfer control unit 115, the writing unit 111 performs the above-mentioned process on the same write destination page.

(Reading Unit 112)

The reading unit 112 receives a cluster read request from the read request source. The cluster read request includes read destination information and data indicating the logical address of the cluster to be read. The read destination information includes the block number, the page number, the information about the page offset, and the information about the size of the cluster set. When the cluster set to be read is stored across the pages, the reading unit 112 also receives information about consecutive read destination pages. The information about consecutive read destination pages includes the block number and the page number.

The reading unit 112 extracts the block number and the page number from the acquired read destination information and instructs the storage medium access unit 101 to read the data of the page 402 with the extracted page number in the block 400 with the extracted block number. Then, the reading unit 112 acquires the data of the page from the storage medium access unit 101. When the cluster set to be read is stored across the pages, the reading unit 112 extracts the block number and the page number from the acquired information about consecutive read destination pages and instructs the storage medium access unit 101 to read the data of the pages 402 with the extracted page numbers in the block 400 with the extracted block number. Then, the reading unit 112 further acquires the data of the pages from the storage medium access unit 101.

The reading unit 112 extracts the information about the page offset and the information about the size of the cluster set from the acquired read destination information. The reading unit 112 extracts data with the size indicated by the extracted information about the size of the cluster set, using the position indicated by the extracted information about the page offset as a read start position in the acquired page. When the cluster set to be read is stored across the pages, the reading unit extracts data corresponding to the remaining size of the cluster set from the position of the head of the consecutive read destination pages and adds the extracted data and the previously extracted data to generate data for the cluster set.

The reading unit 112 corrects the error of the data for the cluster set and acquires the error corrected data for the cluster set. Specifically, the reading unit 112 uses data including metadata and cluster data as the basic data for generating error correction data in the data for the cluster set. In addition, the reading unit 112 corrects the error of the data for the cluster set and acquires the error corrected data for the cluster set. When error correction fails (error correction is unavailable), the reading unit 112 notifies the read request source of the occurrence of a read error.

When error correction succeeds (error correction is available), the reading unit 112 extracts the cluster data from the error corrected data for the cluster set. The reading unit 112 transmits the extracted cluster data to the decompression unit 105 and instructs the decompression unit 105 to decompress the extracted cluster data. Then, the reading unit 112 acquires the cluster data decompressed by the decompression unit 105.

When it is not necessary to decompress the cluster data, the reading unit 112 may process the extracted cluster data in the same way as that in which the decompressed cluster data is processed, without transmitting the extracted cluster data to the decompression unit 105. For example, when the cluster data is stored in the storage medium 151 without being compressed, the reading unit 112 processes the extracted cluster data in the same way as that in which the decompressed cluster data is processed, without transmitting the extracted cluster data to the decompression unit 105. Then, the reading unit 112 transmits the decompressed cluster data (or the extracted cluster data which does not need to be decompressed) to the read request source.

(Interface Unit 106)

The interface unit 106 receives instructions, such as a write instruction and a read instruction, from a host apparatus (not illustrated), such as a personal computer (PC). The write instruction includes data storage device address information and write data. The read instruction includes the data storage device address information. The data storage device address information is address information which is provided from the data storage device 100 to the host apparatus (not illustrated). For example, a logical block address (LBA) is an example of the data storage device address information of a hard disk drive (HDD) or an SSD. The size of the data specified by LBA is set to, for example, 512 bytes. As described above, the size of the data specified by the data storage device address is generally different from the size of the data (cluster) specified by the logical address. However, the data storage device address and the logical address can be converted into each other. For example, when the data storage device address information is allocated for every 512 bytes and the logical address is allocated for every 1024 bytes, the quotient of the data storage device address information divided by 2 can be calculated to convert the data storage device address information into the logical address. In the first embodiment, for simplicity of explanation, an example in which the size of the data specified by the data storage device address is equal to the size of the cluster will be described. However, the invention is not limited thereto. The data storage device 100 may be configured such that the size of the data specified by the data storage device address is different from the size of the cluster.

When the received instruction is a write instruction, the interface unit 106 transmits the received write instruction to the write control unit 113. When the received instruction is a read instruction, the interface unit 106 transmits the received read instruction to the read control unit 114. When receiving data from the read control unit 114, the interface unit 106 transmits the received data to the host apparatus (not illustrated).

(Write Control Unit 113)

When receiving the write instruction from the interface unit 106, the write control unit 113 extracts the data storage device address information and the write data from the received write instruction. Then, the write control unit 113 converts the extracted data storage device address information into a corresponding logical address. In addition, the write control unit 113 shifts the write destination information transmitted in the previous cluster write request for the writing unit 111 by the size of the cluster set returned from the writing unit 111 in the previous cluster write request for the writing unit 111 to generate the write destination information.

As illustrated in FIG. 4, the write destination information transmitted in the previous cluster write request for the writing unit 111 includes the block number of the write destination of the cluster, the page number, and the information about the page offset. The write control unit 113 adds, to the information about the page offset, the size of the cluster set indicated by the information about the size of the cluster set which is returned from the writing unit 111 in the previous cluster write request for the writing unit 111, thereby generating the write destination information.

When the next write destination information is given to the writing unit 111 (when the cluster is stored across the pages) in the previous cluster write request for the writing unit 111, the write control unit 113 shifts the next write destination information by the remaining size of the cluster set to generate write destination information. The next write destination information includes the block number of the write destination of the cluster, the page number, and the information about the page offset which indicates the position of the head of the page. The write control unit 113 adds the remaining size of the cluster set to the information about the page offset to generate the write destination information.

When the block 400 to which the data which is requested to be written by the host apparatus (not illustrated) is written is the same as the transfer destination block 400, the write control unit 113 and the transfer control unit 115 perform a process in cooperation with each other such that the generated write destination information items do not overlap each other. The write control unit 113 transmits the generated write destination information, the extracted write data, which is the cluster data to be written, and the converted logical address in which the cluster to be written to the writing unit 111 and instructs the writing unit 111 to perform a writing process.

When a response indicating the overflow of the write destination page is received from the writing unit 111 and the physical addresses are consecutive in the same management unit managing the block 400, the write control unit 113 gives the next write destination information to the writing unit 111. In some cases, the write control unit 113 instructs the writing unit 111 to write the dummy data. For example, the write control unit 113 may appropriately instruct the writing unit 111 to write the dummy data even when the physical addresses are not consecutive in the same management unit managing the block 400. When instructing the writing unit 111 to write the dummy data, the write control unit 113 ensures a new write destination page in order to write the cluster data, which is a write target, and performs the writing process again. Then, the write control unit 113 receives the size of the cluster set from the writing unit 111.

When receiving a write completion notice from the writing unit 111, the write control unit 113 updates the address mapping table 160 for the cluster written to the page. Specifically, the write control unit 113 instructs the first access unit 102 to perform a writing process such that the physical address of the storage medium 151 indicated by the converted logical address in the address mapping table 160 is updated to the physical address of the storage medium 151, which is a write destination, for the cluster written to the page.

In addition, the write control unit 113 instructs the first access unit 102 to perform a writing process such that the information about the size of the cluster set acquired from the writing unit 111 is written to the address mapping table 160 for the cluster written to the page (see FIG. 4).

(Read Control Unit 114)

When receiving a read instruction from the interface unit 106, the read control unit 114 extracts the data storage device address information from the received read instruction. The read control unit 114 converts the extracted data storage device address information to a corresponding logical address. The read control unit 114 acquires information associated with the converted logical address. Specifically, the read control unit 114 instructs the first access unit 102 to read the physical address of the storage medium 151 and the information about the size of the cluster set indicated by the converted logical address in the address mapping table 160. Then, the read control unit 114 acquires the physical address and the information about the size of the cluster set.

The read control unit 114 determines whether the cluster set is stored across the pages on the basis of the information about the page offset which is included in the acquired physical address and the acquired information about the size of the cluster set. When the determination result is YES (the cluster set is stored across the pages), the read control unit 114 generates information about consecutive read destination pages. The information about consecutive read destination pages includes the block number and the page number. Here, the block number and numbers subsequent to the page number included in the acquired physical address are newly set as the block number and the page number included in the information about consecutive read destination pages.

For example, when the pages with consecutive page numbers in the same block 400 correspond to a case in which the physical addresses are consecutive in the same management unit managing the block 400 which is described in FIG. 3B, the block number and numbers subsequent to the page number are newly set. For example, when the left page of FIG. 3B is a page with page number 34 in the block with block number 66 on the basis of the acquired physical address, the right page of FIG. 3B is a page with page number 35 in the same block (block number 66) on the basis of the information about the consecutive read destination pages.

When the physical addresses are consecutive in the same management unit managing the block 400 which is described in FIG. 3B, consecutive pages in the same logical page, or pages with consecutive logical page numbers in the same logical block are as follows. For example, a block with block number 5, a block with block number 97, a block with block number 36, and a block with block number 104 form a logical block with logical block number 49 and the clusters are written to the logical page in this order.

For the former, for example, when the left page of FIG. 3B is a page with page number 40 in the block with block number 5 on the basis of the acquired physical address, the right page of FIG. 3B is a page with page number 40 in the block with block number 97 on the basis of the information about consecutive read destination pages. For the latter, for example, when the left page of FIG. 3B is a page with logical page number 34 in a logical block with logical block number 66, the right page of FIG. 3B is a page with logical page number 35 in the same logical block (logical block number 66) on the basis of the information about consecutive read destination pages.

The read control unit 114 instructs the reading unit 112 to perform a reading process, using the acquired physical address and the acquired information about the size of the cluster set as the read destination information and the converted logical address as the logical address of the cluster to be read. When the cluster set to be read is stored across the pages, the read control unit 114 adds the generated information items about consecutive read destination pages and transmits the added information to the reading unit 112.

When receiving a notice indicating the occurrence of the read error from the reading unit 112, the read control unit 114 transmits data indicating the read error to the interface unit 106. The first memory 152 may further store information indicating that the read error occurs when the logical address is read as one of the management information items. In this way, when a read request for the same logical address is issued again, it is possible to rapidly return the read error. When receiving the data read from the reading unit 112, the read control unit 114 transmits the received data to the interface unit 106.

(Transfer Control Unit 115)

The data storage device 100 appropriately performs a transfer process in order to internally manage the data stored in the data storage device 100. The transfer control unit 115 controls the following transfer process according to a predetermined rule. First, the transfer control unit 115 determines the cluster to be transferred. Specifically, the transfer control unit 115 instructs the first access unit 102 to read the management information stored in the first memory 152 and acquires the management information. The transfer control unit 115 determines the cluster to be transferred from the acquired management information using a predetermined method. In the first embodiment, any known method may be used to determine the cluster to be transferred. The transfer control unit 115 extracts the logical address of the determined cluster from the acquired management information.

Then, the transfer control unit 115 reads the cluster to be transferred. Specifically, the transfer control unit 115 acquires information associated with the extracted logical address. For example, the transfer control unit 115 instructs the first access unit 102 to read the physical address of the storage medium 151 and the information about the size of the cluster set indicated by the extracted logical address in the address mapping table 160. The transfer control unit 115 acquires the physical address and the information about the size of the cluster set.

The transfer control unit 115 determines whether the cluster set is stored across the pages on the basis of the information about the page offset in the acquired physical address and the acquired information about the size of the cluster set. When the determination result is YES (the cluster set is stored across the pages), the transfer control unit 115 generates information about consecutive read destination pages. The information about consecutive read destination pages includes the block number and the page number. Here, the block number and numbers subsequent to the page number included in the acquired physical address are newly set as the block number and the page number included in the information about consecutive read destination pages.

For example, when the pages with consecutive page numbers in the same block 400 correspond to a case in which the physical addresses are consecutive in the same management unit managing the block 400 described in FIG. 3B, the block number and numbers subsequent to the page number are newly set. For example, when the left page of FIG. 3B is the page with page number 34 in the block with block number 66 on the basis of the acquired physical address, the right page of FIG. 3B is the page with page number 35 in the same block (block number 66) on the basis of the information about the consecutive read destination pages.

When the physical addresses are consecutive in the same management unit managing the block 400 which is described in FIG. 3B, consecutive pages in the same logical page, or pages with consecutive logical page numbers in the same logical block are as follows. For example, a block with block number 5, a block with block number 97, a block with block number 36, and a block with block number 104 form a logical block with logical block number 49 and the clusters are written to the logical page in this order.

For the former, for example, when the left page of FIG. 3B is a page with page number 40 in the block with block number 5 on the basis of the acquired physical address, the right page of FIG. 3B is a page with page number 40 in the block with block number 97 on the basis of the information about consecutive read destination pages. For the latter, for example, when the left page of FIG. 3B is a page with logical page number 34 in a logical block with logical block number 66, the right page of FIG. 3B is a page with logical page number 35 in the same logical block (logical block number 66) on the basis of the information about consecutive read destination pages.

The transfer control unit 115 instructs the reading unit 112 to perform a reading process, using the acquired physical address and the acquired information about the size of the cluster set as the read destination information and the converted logical address as the logical address of the cluster to be read. When the cluster set to be read is stored across the pages, the transfer control unit 115 adds the generated information items about consecutive read destination pages and transmits the added information to the reading unit 112.

When receiving a notice indicating the occurrence of the read error from the reading unit 112, the transfer control unit 115 performs a process of maintaining consistency such that an error occurs when the cluster is read after the transfer process. For example, the transfer control unit 115 may transfer the cluster data with the read error, without correcting the read error. In addition, the transfer control unit 115 may insert information indicating that the read error occurs when the logical address is read into the management information stored in the first memory 152 such that the cluster data with the read error is not transferred.

Then, the transfer control unit 115 receives the data read by the reading unit 112. Then, the transfer control unit 115 writes the cluster to be transferred. Specifically, the transfer control unit 115 shifts the write destination information transmitted in the previous cluster write request for the writing unit 111 by the size of the cluster set indicated by the information about the size of the cluster set which is returned from the writing unit 111 in the previous cluster write request for the writing unit 111, thereby generating write destination information. The write destination information transmitted in the previous cluster write request for the writing unit 111 includes the block number of the write destination of the cluster, the page number, and the information about the page offset. The transfer control unit 115 adds, to the information about the page offset, the size of the cluster set indicated by the information about the size of the cluster set which is returned from the writing unit 111 in the previous cluster write request for the writing unit 111, thereby generating the write destination information.

In the previous cluster write request for the writing unit 111, when the next write destination information is given to the writing unit 111 (the cluster is stored across the pages), the transfer control unit 115 shifts the next write destination information by the remaining size of the cluster set to generate the write destination information. The next write destination information includes the block number of the write destination of the cluster, the page number, and the information about the page offset indicating the position of the head of the page. The transfer control unit 115 adds the remaining size of the cluster set to the information about the page offset to generate the write destination information.

When the block 400 to which the data which is requested to be written by the host apparatus is written is the same as the transfer destination block 400, the write control unit 113 and the transfer control unit 115 perform a process in cooperation with each other such that the generated write destination information items do not overlap each other. The transfer control unit 115 transmits the generated write destination information, the data which is received as the cluster data to be transferred from the reading unit 112, and the extracted logical address to the writing unit 111. Then, the write control unit 113 instructs the writing unit 111 to perform a writing process.

When a response indicating the overflow of the write destination page is received from the writing unit 111 and the physical addresses are consecutive in the same management unit managing the block 400, the transfer control unit 115 outputs the next write destination information to the writing unit 111. In some cases, the transfer control unit 115 instructs the writing unit 111 to write the dummy data.

For example, the transfer control unit 115 may appropriately instruct the writing unit 111 to write the dummy data even when the physical addresses are not consecutive in the same management unit managing the block 400. When instructing the writing unit 111 to write the dummy data, the transfer control unit 115 ensures a new write destination page in order to write the cluster data, which is a write target, and performs the writing process again.

Then, the transfer control unit 115 receives the size of the cluster set from the writing unit 111. The transfer control unit 115 repeatedly performs the above-mentioned process until a write request for the writing unit 111 corresponds to at least one page. Since the unit of input and output for the storage medium 151 is the page 402, the transfer control unit 115 needs to write data corresponding to at least one page in order to perform a process of updating the management information, which will be described. Therefore, the transfer process is not completed.

The transfer control unit 115 updates the management information about the transferred cluster. Specifically, when receiving the write completion notice from the writing unit 111, the transfer control unit 115 updates the address mapping table 160 for the cluster written to the page. The transfer control unit 115 instructs the first access unit 102 to perform a writing process such that the physical address of the storage medium 151 indicated by the extracted logical address in the address mapping table 160 is updated to the physical address of the storage medium 151, which is a write destination, for the cluster written to the page.

In addition, the transfer control unit 115 instructs the first access unit 102 to perform a writing process such that the information about the size of the cluster set which is acquired from the writing unit 111 is stored in the address mapping table 160 for the cluster written to the page.

The transfer control unit 115 repeatedly performs the above-mentioned process according to a predetermined method.

The data storage device 100 may be configured such that the compression unit 104 determines whether to perform compression on the basis of, for example, the reception speed of data by the interface unit 106. For example, when the reception speed of data by the interface unit 106 is reduced due to the compression of the compression unit 104, the data storage device 100 performs control such that the compression unit 104 does not perform compression. The data storage device 100 may be configured such that, when the read control unit 114 reads data which has not been compressed by the compression unit 104 from, for example, the storage medium 151, the decompression unit 105 does not decompress the data.

Figure 5:
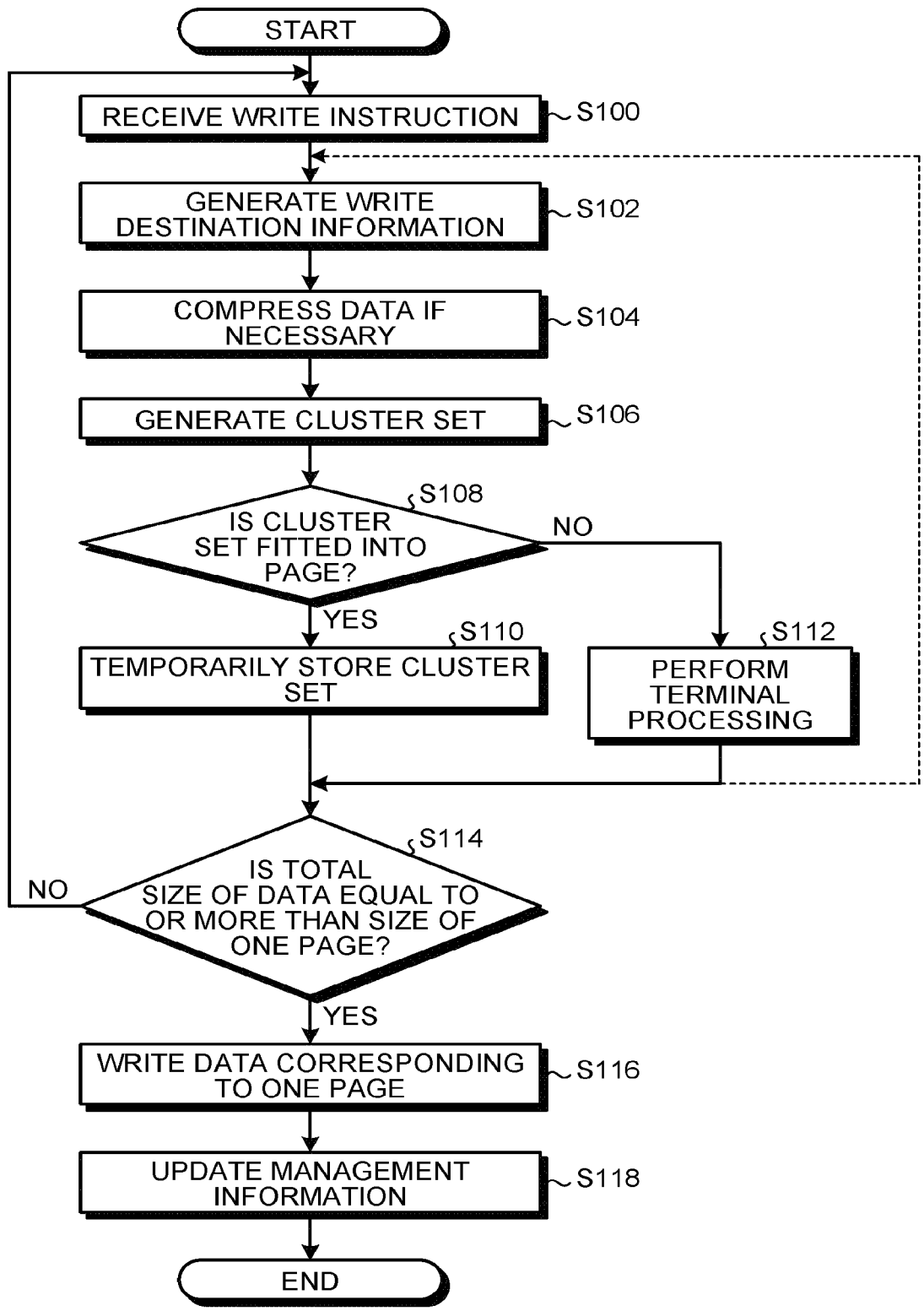
FIG. 5 is a flowchart illustrating an example of the procedure of a writing process according to the first embodiment.

Next, the operation of the data storage device 100 according to the first embodiment will be described. First, the procedure of the writing process performed by the data storage device 100 in response to a write instruction from the host apparatus (not illustrated) will be described with reference to FIG. 5. FIG. 5 is a flowchart illustrating an example of the procedure of the writing process performed by the data storage device 100.

(Writing Process)

In Step S100, the data storage device 100 receives instructions including a write instruction and a read instruction from, for example, an external host apparatus (not illustrated). Specifically, the interface unit 106 receives a write instruction from the host apparatus (not illustrated). The write instruction includes the data storage device address information and the write data. The read instruction includes the data storage device address information. The data storage device address information is address information which is provided from the data storage device 100 to the host apparatus (not illustrated).

For example, an LBA is an example of the data storage device address information of an HDD (Hard Disk Drive) or an SSD. The size of the data specified by LBA is set to, for example, 512 bytes. As described above, the size of the data specified by the data storage device address is generally different from the size of the data (cluster) specified by the logical address. However, the data storage device address and the logical address can be converted into each other. For example, when the data storage device address information is allocated for every 512 bytes and the logical address is allocated for every 1024 bytes, the quotient of the data storage device address information divided by 2 can be calculated to convert the data storage device address information into the logical address.

In the first embodiment, for simplicity of explanation, an example in which the size of the data specified by the data storage device address is equal to the size of the cluster will be described. However, the invention is not limited thereto. The data storage device 100 may be configured such that the size of the data specified by the data storage device address is different from the size of the cluster. When the received instruction is a write instruction, the interface unit 106 transmits the received write instruction to the write control unit 113.

In Step S102, the write control unit 113 generates write destination information. Specifically, when receiving the write instruction from the interface unit 106, the write control unit 113 extracts the data storage device address information and the write data from the received write instruction. Then, the write control unit 113 converts the extracted data storage device address information into a corresponding logical address. In addition, the write control unit 113 shifts the write destination information transmitted in the previous cluster write request for the writing unit 111 by the size of the cluster set returned from the writing unit 111 in the previous cluster write request for the writing unit 111 to generate the write destination information.

Specifically, as illustrated in FIG. 4, the write destination information transmitted in the previous cluster write request for the writing unit 111 includes the block number of the write destination of the cluster, the page number, and the information about the page offset. The write control unit 113 adds, to the information about the page offset, the size of the cluster set indicated by the information about the size of the cluster set which is returned from the writing unit 111 in the previous cluster write request for the writing unit 111, thereby generating the write destination information. When the next write destination information is given to the writing unit 111 (when the cluster is stored across the pages) in the previous cluster write request for the writing unit 111, the write control unit 113 shifts the next write destination information by the remaining size of the cluster set to generate the write destination information.

Specifically, the next write destination information includes the block number of the write destination of the cluster, the page number, and the information about the page offset which indicates the position of the head of the page. The write control unit 113 adds the remaining size of the cluster set to the information about the page offset to generate the write destination information. When the block 400 to which the data which is requested to be written by the host apparatus (not illustrated) is written is the same as a transfer destination block 400, the write control unit 113 and the transfer control unit 115 perform a process in cooperation with each other such that the generated write destination information items do not overlap each other. The write control unit 113 transmits the generated write destination information, the extracted write data, which is the cluster data to be written, and the converted logical address in which the cluster to be written to the writing unit 111 and instructs the writing unit 111 to perform a writing process. The writing unit 111 receives a cluster write request from the write control unit 113. The cluster write request includes write destination information, cluster data to be written, and data indicating the logical address of the cluster to be written. The write destination information includes the block number of the write destination of the cluster, the page number, and the information about the page offset.

In Step S104, the writing unit 111 transmits a compression instruction to the compression unit 104 (if necessary). Specifically, the writing unit 111 extracts the cluster data to be written from the received cluster write request. The writing unit 111 transmits the extracted cluster data to be written to the compression unit 104 and instructs the compression unit 104 to compress the cluster data. When receiving an instruction to compress data, the compression unit 104 reversibly compresses the instructed data using a predetermined method and returns the compressed data to a request source which has requested the compression. Then, the writing unit 111 acquires the compressed cluster data to be written from the compression unit 104. When there is no necessity to compress the cluster data, the writing unit 111 processes the extracted cluster data to be written in the same way as that in which the compressed cluster data to be written is processed, without transmitting the cluster data to the compression unit 104 (the cluster data is regarded as the compressed cluster data to be written). For example, when there is little difference between the size of data obtained by compressing the extracted cluster data to be written and the size of the cluster data before compression, the effect of compressing the cluster data is small. Therefore, it is not necessary to compress the cluster data. In this case, the writing unit 111 may not transmit the cluster data to the compression unit 104.

In Step S106, the writing unit 111 generates a cluster set. Specifically, the writing unit 111 extracts data indicating the logical address of the cluster to be written from the received cluster write request and generates metadata including the extracted data indicating the logical address of the cluster to be written. When the metadata included in the cluster set is compressed, the writing unit 111 may instruct the compression unit 104 to compress the generated metadata, acquire the compressed metadata from the compression unit 104, and replace the generated metadata with the acquired compressed metadata. The writing unit 111 generates error correction data on the basis of the compressed cluster data to be written and data including the generated metadata. Then, the writing unit 111 generates the cluster set including the compressed cluster data to be written, the generated metadata, and the generated error correction data.

In Step S108, the writing unit 111 calculates the size of the generated cluster set. Then, the writing unit 111 determines whether the generated cluster set is fitted into a write destination page. Specifically, the writing unit 111 calculates the size of the generated cluster set. Then, the writing unit 111 determines whether the generated cluster set is fitted into the write destination page. Specifically, the writing unit 111 determines whether the sum of the information about the page offset included in the write destination information and the calculated size of the cluster set is within the size of the page.

In Step S110, the second memory 153 temporarily stores a plurality of cluster sets to be written. Specifically, when the determination result in Step S108 is YES (the cluster set is fitted into the write destination page), the writing unit 111 instructs the second access unit 103 to perform a writing process such that the second memory 153 temporarily stores the generated cluster set. In addition, the writing unit 111 returns the information about the size of the cluster set to a write request source. The write control unit 113 receives the size of the cluster set from the writing unit 111.

In Step S112, the writing unit 111 and the write control unit 113 perform terminal processing. Specifically, when the determination result in Step S108 is No (the cluster set is not fitted into the write destination page), the writing unit 111 returns a response indicating the overflow of the write destination page to the write request source. When the response indicating the overflow of the write destination page is received from the writing unit 111 and the physical addresses are consecutive in the same management unit managing the block 400, the write control unit 113 gives the next write destination information to the writing unit 111. When receiving the next write destination information from the write request source, the writing unit 111 instructs the second access unit 103 to perform a writing process such that the second memory 153 temporarily stores the generated cluster set. In addition, the writing unit 111 returns the information about the size of the cluster set to the write request source. The write control unit 113 receives the size of the cluster set from the writing unit 111. Then, the process proceeds to Step S114. The write control unit 113 may appropriately instruct the writing unit 111 to write the dummy data even when the physical addresses are not consecutive in the same management unit managing the block 400. When receiving an instruction to store the dummy data from the write request source, the writing unit 111 generates dummy data corresponding to the size of the area in which the cluster set is not stored in the write destination page. The dummy data may have a predetermined value (for example, all zero) or a random value. Then, the writing unit 111 instructs the second access unit 103 to perform a writing process such that the second memory 153 temporarily stores the generated dummy data.

The writing unit 111 may be configured so as to generate the error correction data of the cluster set which is temporarily stored in the second memory 153, instead of the dummy data. When the error correction data of the cluster set temporarily stored in the second memory 153 is generated, it is possible to improve the reliability of the data stored in the storage medium 151. In addition, the cluster sets may be stored in the second memory 153 such that the order thereof is appropriately changed, thereby reducing the amount of dummy data stored in the second memory 153. When the amount of dummy data stored in the second memory 153 is reduced, it is possible to improve the usage efficiency of the storage medium 151. When instructing the writing unit 111 to write the dummy data, the write control unit 113 ensures a new write destination page in order to write the cluster data, which is a write target, and performs the writing process again from Step S102.

In Step S114, the writing unit 111 determines whether the total size of the data temporarily stored in the second memory 153 is equal to or more than the size of one page. When the total size of the data temporarily stored in the second memory 153 is not equal to or more than the size of the page 402 (No in Step S114), the writing unit 111 proceeds to Step S100. When the total size of the data temporarily stored in the second memory 153 is equal to or more than the size of the page 402 (Yes in Step S114), the writing unit 111 proceeds to Step S116.

In Step S116, the writing unit 111 writes data corresponding to one page to the storage medium 151 through the storage medium access unit 101. Specifically, when the total size of the data temporarily stored in the second memory 153 is equal to or more than the size of the page 402, the writing unit 111 instructs the second access unit 103 to read data corresponding to the page size from the second memory 153. Then, the writing unit 111 acquires the data corresponding to the page size. Specifically, the writing unit 111 instructs the second access unit 103 to read data stored in the left page of FIG. 3B among the data pieces temporarily stored in the second memory 153.

In a case in which the data storage device 100 includes a plurality of storage media 151 and parallel access to the storage media 151 is performed to improve the processing speed, when the total size of the data temporarily stored in the second memory 153 is equal to or more than the size of the pages 402 to which data is written in parallel, the writing unit 111 instructs the second access unit 103 to read data corresponding to the size of the pages to which data is written in parallel from the second memory 153.

Then, the writing unit 111 instructs the storage medium access unit 101 to write the data corresponding to the page size (or the size of the pages to which data is written in parallel) which is acquired through the second access unit 103 to the write destination pages (or each page to which data is written in parallel).

Here, the write destination page is the left page of FIG. 3B. The writing unit 111 instructs the storage medium access unit 101 to write the block number of the write destination of the cluster and the page number which are included in the write destination information received from the write request source. When receiving an instruction to write data to the storage medium 151, the storage medium access unit 101 inputs the data which is instructed to be written to the storage medium 151 and performs a writing process.

In Step S118, the write control unit 113 updates the management information. Specifically, the writing unit 111 transmits a notice indicating that the writing of data to the write destination page has been completed to the write request source. The write destination page is the left page of FIG. 3B and the writing unit 111 notifies the write request source of the block number of the write destination of the cluster and the page number included in the write destination information received from the write request source. When receiving the write completion notice from the writing unit 111, the write control unit 113 updates the address mapping table 160 for the cluster written to the page. Specifically, the write control unit 113 instructs the first access unit 102 to perform a writing process such that the physical address of the storage medium 151 indicated by the converted logical address in the address mapping table 160 is updated to the physical address of the storage medium 151, which is a write destination, for the cluster written to the page. In addition, the write control unit 113 instructs the first access unit 102 to perform a writing process such that the information about the size of the cluster set acquired from the writing unit 111 is written to the address mapping table 160 for the cluster written to the page (see FIG. 4).

Figure 6:
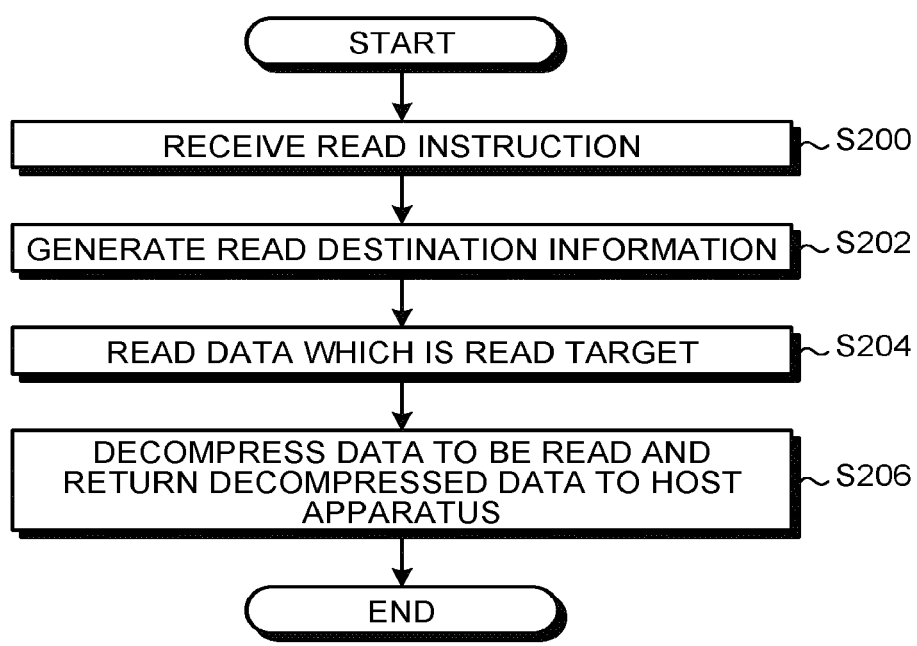
FIG. 6 is a flowchart illustrating an example of the procedure of a reading process according to the first embodiment.

Next, the procedure of the reading process performed by the data storage device 100 in response to a read instruction from the host apparatus (not illustrated) will be described with reference to FIG. 6. FIG. 6 is a flowchart illustrating an example of the procedure of the reading process performed by the data storage device 100.

(Reading Process)

In Step S200, the data storage device 100 receives a read instruction from, for example, an external host apparatus (not illustrated). Specifically, the interface unit 106 receives instructions including a write instruction and a read instruction from, for example, the host apparatus (not illustrated). The write instruction includes the data storage device address information and the write data. The read instruction includes the data storage device address information. The data storage device address information is address information which is provided from the data storage device 100 to the host apparatus (not illustrated).

For example, an LBA is an example of the data storage device address information of an HDD (Hard Disk Drive) or an SSD. The size of the data specified by LBA is set to, for example, 512 bytes. As described above, the size of the data specified by the data storage device address is generally different from the size of the data (cluster) specified by the logical address. However, the data storage device address and the logical address can be converted into each other. For example, when the data storage device address information is allocated for every 512 bytes and the logical address is allocated for every 1024 bytes, the quotient of the data storage device address information divided by 2 can be calculated to convert the data storage device address information into the logical address.

In the first embodiment, for simplicity of explanation, an example in which the size of the data specified by the data storage device address is equal to the size of the cluster will be described. However, the invention is not limited thereto. The data storage device 100 may be configured such that the size of the data specified by the data storage device address is different from the size of the cluster. When the received instruction is a read instruction, the interface unit 106 transmits the received read instruction to the read control unit 114.

In Step S202, the read control unit 114 generates read destination information. Specifically, when receiving the read instruction from the interface unit 106, the read control unit 114 extracts the data storage device address information from the received read instruction. Then, the read control unit 114 converts the extracted data storage device address information into a corresponding logical address. In addition, the read control unit 114 acquires information associated with the converted logical address. Specifically, the read control unit 114 instructs the first access unit 102 to read the physical address of the storage medium 151 and the information about the size of the cluster set indicated by the converted logical address in the address mapping table 160. Then, the read control unit 114 acquires the physical address and the information about the size of the cluster set. The read control unit 114 determines whether the cluster set is stored across the pages on the basis of the information about the page offset which is included in the acquired physical address and the acquired information about the size of the cluster set. When the determination result is YES (the cluster set is stored across the pages), the read control unit 114 generates information about consecutive read destination pages. Specifically, the information about consecutive read destination pages includes the block number and the page number. Here, the block number and numbers subsequent to the page number included in the acquired physical address are newly set as the block number and the page number included in the information about consecutive read destination pages.

For example, when the pages with consecutive page numbers in the same block 400 correspond to a case in which the physical addresses are consecutive in the same management unit managing the block 400 described in FIG. 3B, the block number and numbers subsequent to the page number are newly set. For example, when the left page of FIG. 3B is a page with page number 34 in a block with block number 66 on the basis of the acquired physical address, the right page of FIG. 3B is a page with page number 35 in the same block (block number 66) on the basis of the information about consecutive read destination pages. When the physical addresses are consecutive in the same management unit managing the block 400 described in FIG. 3B, consecutive pages in the same logical page, or pages with consecutive logical page numbers in the same logical block are as follows. For example, a block with block number 5, a block with block number 97, a block with block number 36, and a block with block number 104 form a logical block with logical block number 49 and the clusters are written to the logical page in this order.

For the former, for example, when the left page of FIG. 3B is a page with page number 40 in the block with block number 5 on the basis of the acquired physical address, the right page of FIG. 3B is a page with page number 40 in the block with block number 97 on the basis of the information about consecutive read destination pages. For the latter, for example, when the left page of FIG. 3B is a page with logical page number 34 in a logical block with logical block number 66, the right page of FIG. 3B is a page with logical page number 35 in the same logical block (logical block number 66) on the basis of the information about consecutive read destination pages.

In Step S204, the read control unit 114 reads data, which is a read target, through the reading unit 112. Specifically, the read control unit 114 instructs the reading unit 112 to perform a reading process, using the acquired physical address and the acquired information about the size of the cluster set as read destination information and the converted logical address as the logical address of the cluster to be read. When the cluster set to be read is stored across the pages, the read control unit 114 adds the generated information items about consecutive read destination pages and transmits the added information to the reading unit 112.

The reading unit 112 receives a request to read the cluster from a read request source. The read destination information includes data indicating the logical address of the cluster to be read. The read destination information includes the block number, the page number, the information about the page offset, and the information about the size of the cluster set. When the cluster set to be read is stored across the pages, the reading unit 112 also receives information about consecutive read destination pages. The information about consecutive read destination pages includes the block number and the page number.

The reading unit 112 extracts the block number and the page number from the acquired read destination information and instructs the storage medium access unit 101 to read the data of the page 402 with the extracted page number in the block 400 with the extracted block number. Then, the reading unit 112 acquires the data of the page from the storage medium access unit 101.

When the cluster set to be read is stored across the pages, the reading unit 112 extracts the block number and the page number from the acquired information about consecutive read destination pages and instructs the storage medium access unit 101 to read the data of the pages 402 with the extracted page numbers in the block 400 with the extracted block number. Then, the reading unit 112 further acquires the data of the pages from the storage medium access unit 101. The reading unit 112 extracts the information about the page offset and the information about the size of the cluster set from the acquired read destination information. The reading unit 112 extracts data with the size indicated by the extracted information about the size of the cluster set, using the position indicated by the extracted information about the page offset as a read start position in the acquired page. When the cluster set to be read is stored across the pages, the reading unit extracts data corresponding to the remaining size of the cluster set from the position of the head of the consecutive read destination pages and adds the extracted data and the previously extracted data to generate data for the cluster set.

In Step S206, the read control unit 114 decompresses the data to be read using the decompression unit 105 and returns the decompressed data to the host apparatus. Specifically, the reading unit 112 corrects the error of the data for the cluster set and acquires the error corrected data for the cluster set. Specifically, the reading unit 112 uses data including the metadata and the cluster data as the basic data for generating error correction data in the data for the cluster set. In addition, the reading unit 112 corrects the error of the data for the cluster set and acquires the error corrected data for the cluster set.

When error correction fails (error correction is unavailable), the reading unit 112 notifies the read request source of the occurrence of a read error. When receiving a notice indicating the occurrence of the read error from the reading unit 112, the read control unit 114 transmits data indicating the read error to the interface unit 106. The first memory 152 may further store information indicating that the read error occurs when the logical address is read as one of the management information items. When receiving data (data indicating the read error) from the read control unit 114, the interface unit 106 transmits the received data (data indicating the read error) to the host apparatus (not illustrated). When error correction succeeds (error correction is available), the reading unit 112 extracts the cluster data from the error corrected data for the cluster set. The reading unit 112 transmits the extracted cluster data to the decompression unit 105 and instructs the decompression unit 105 to decompress the extracted cluster data. When receiving an instruction to decompress the data compressed by the compression unit 104, the decompression unit 105 decompresses the instructed data using a predetermined method and returns the decompressed data to the request source which has requested decompression. Then, the reading unit 112 acquires the cluster data decompressed by the decompression unit 105.

When it is not necessary to decompress the cluster data, the reading unit 112 may process the extracted cluster data in the same way as that in which the decompressed cluster data is processed, without transmitting the extracted cluster data to the decompression unit 105. For example, when the cluster data is stored in the storage medium 151 without being compressed, the reading unit 112 processes the extracted cluster data in the same way as that in which the decompressed cluster data is processed, without transmitting the extracted cluster data to the decompression unit 105. Then, the reading unit 112 transmits the decompressed cluster data (or the extracted cluster data which does not need to be decompressed) to the read request source.

When receiving the data read from the reading unit 112, the read control unit 114 transmits the received data to the interface unit 106. When receiving the data from the read control unit 114, the interface unit 106 transmits the received data to the host apparatus (not illustrated).

Figure 7:
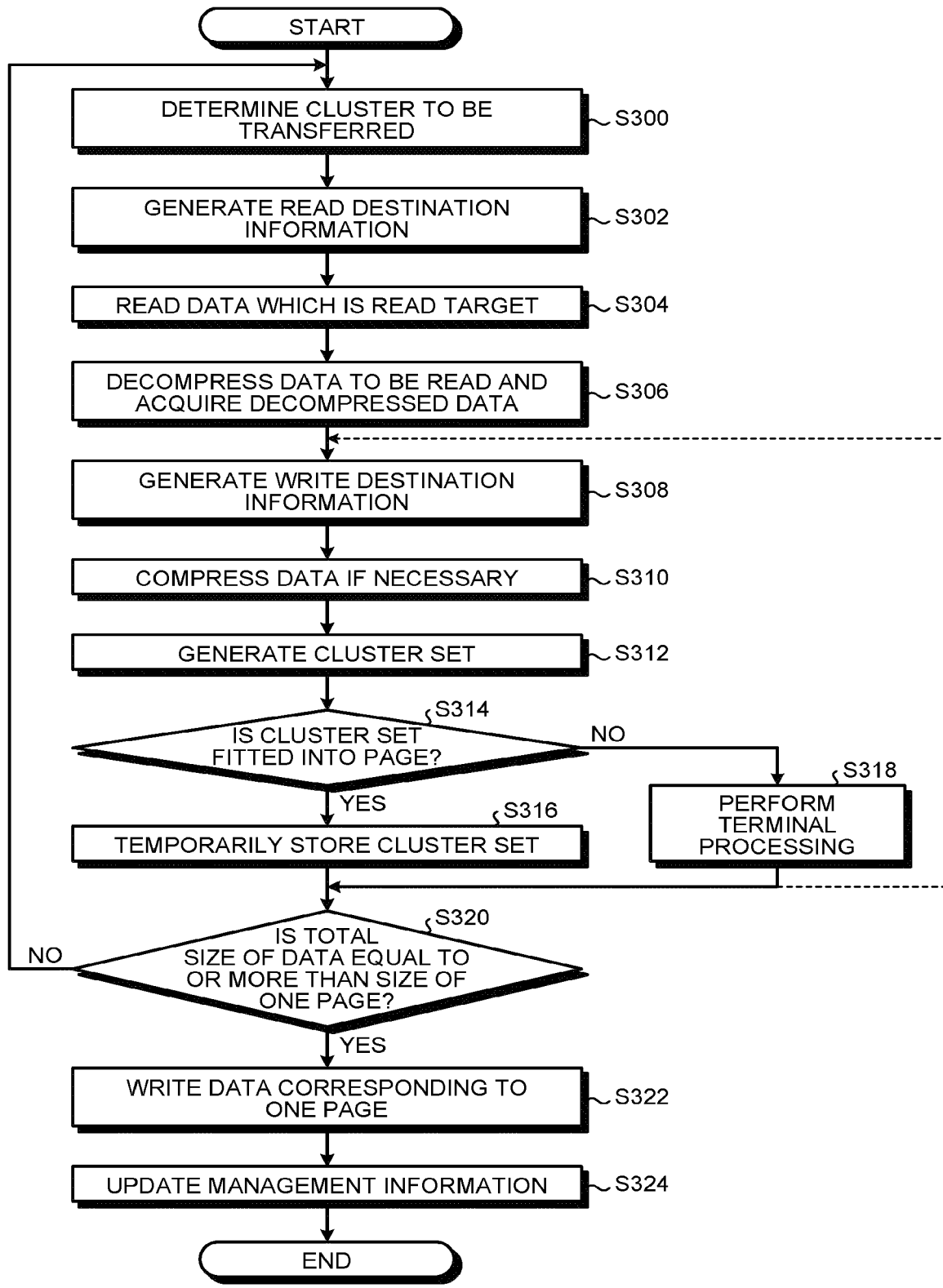
FIG. 7 is a flowchart illustrating an example of the procedure of a transfer process according to the first embodiment.

Next, the procedure of the transfer process performed by the data storage device 100 will be described with reference to FIG. 7. FIG. 7 is a flowchart illustrating an example of the procedure of the transfer process performed by the data storage device 100. The transfer control unit 115 controls the transfer process illustrated in FIG. 7 according to a predetermined rule.

(Transfer Process)

In Step S300, the transfer control unit 115 determines the cluster to be transferred. Specifically, the transfer control unit 115 instructs the first access unit 102 to read the management information stored in the first memory 152 and acquires the management information. The transfer control unit 115 determines the cluster to be transferred from the acquired management information using a predetermined method. In the first embodiment, any known method may be used to determine the cluster to be transferred. The transfer control unit 115 extracts the logical address of the determined cluster from the acquired management information.

In Step S302, the transfer control unit 115 generates read destination information. Specifically, the transfer control unit 115 acquires information associated with the extracted logical address. For example, the transfer control unit 115 instructs the first access unit 102 to read the physical address of the storage medium 151 and the information about the size of the cluster set indicated by the extracted logical address in the address mapping table 160. The transfer control unit 115 acquires the physical address and the information about the size of the cluster set. The transfer control unit 115 determines whether the cluster set is stored across the pages on the basis of the information about the page offset included in the acquired physical address and the acquired information about the size of the cluster set. When the determination result is YES (the cluster set is stored across the pages), the transfer control unit 115 generates information about consecutive read destination pages. The information about consecutive read destination pages includes a block number and a page number.

Here, the block number and numbers subsequent to the page number included in the acquired physical address are newly set as the block number and the page number included in the information about consecutive read destination pages. For example, when the pages with consecutive page numbers in the same block 400 correspond to a case in which the physical addresses are consecutive in the same management unit managing the block 400 described in FIG. 3B, the block number and numbers subsequent to the page number are newly set. For example, when the left page of FIG. 3B is the page with page number 34 in the block with block number 66 on the basis of the acquired physical address, the right page of FIG. 3B is the page with page number 35 in the same block (block number 66) on the basis of the information about the consecutive read destination pages.

When the physical addresses are consecutive in the same management unit managing the block 400 described in FIG. 3B, consecutive pages in the same logical page, or pages with consecutive logical page numbers in the same logical block are as follows. For example, a block with block number 5, a block with block number 97, a block with block number 36, and a block with block number 104 form a logical block with logical block number 49 and the clusters are written to the logical page in this order.

For the former, for example, when the left page of FIG. 3B is a page with page number 40 in the block with block number 5 on the basis of the acquired physical address, the right page of FIG. 3B is a page with page number 40 in the block with block number 97 on the basis of the information about consecutive read destination pages. For the latter, for example, when the left page of FIG. 3B is a page with logical page number 34 in a logical block with logical block number 66, the right page of FIG. 3B is a page with logical page number 35 in the same logical block (logical block number 66) on the basis of the information about consecutive read destination pages.

In Step S304, the transfer control unit 115 reads data, which is a read target, through the reading unit 112. The transfer control unit 115 instructs the reading unit 112 to perform a reading process, using the acquired physical address and the acquired information about the size of the cluster set as read destination information and the converted logical address as the logical address of the cluster to be read. When the cluster set to be read is stored across the pages, the transfer control unit 115 adds the generated information items about consecutive read destination pages and transmits the added information to the reading unit 112.

The reading unit 112 receives a cluster read request from a read request source. The cluster read request includes read destination information and data indicating the logical address of the cluster to be read. The read destination information includes the block number, the page number, the information about the page offset, and the information about the size of the cluster set. When the cluster set to be read is stored across the pages, the reading unit 112 also receives information about consecutive read destination pages. The information about consecutive read destination pages includes the block number and the page number.

The reading unit 112 extracts the block number and the page number from the acquired read destination information and instructs the storage medium access unit 101 to read the data of the page 402 with the extracted page number in the block 400 with the extracted block number. Then, the reading unit 112 acquires the data of the page from the storage medium access unit 101. When the cluster set to be read is stored across the pages, the reading unit 112 extracts the block number and the page number from the acquired information about consecutive read destination pages and instructs the storage medium access unit 101 to read the data of the pages 402 with the extracted page numbers in the block 400 with the extracted block number. Then, the reading unit 112 further acquires the data of the pages from the storage medium access unit 101.

The reading unit 112 extracts the information about the page offset and the information about the size of the cluster set from the acquired read destination information. The reading unit 112 extracts data with the size indicated by the extracted information about the size of the cluster set, using the position indicated by the extracted information about the page offset as a read start position in the acquired page. When the cluster set to be read is stored across the pages, the reading unit extracts data corresponding to the remaining size of the cluster set from the position of the head of the consecutive read destination pages and adds the extracted data and the previously extracted data to generate data for the cluster set.

In Step S306, the transfer control unit 115 decompresses the data to be read using the decompression unit 105 and acquires the decompressed data. Specifically, the reading unit 112 corrects the error of the data for the cluster set and acquires the error corrected data for the cluster set. Specifically, the reading unit 112 uses data including metadata and cluster data as the basic data for generating error correction data in the data for the cluster set. In addition, the reading unit 112 corrects the error of the data for the cluster set and acquires the error corrected data for the cluster set. When error correction fails (error correction is unavailable), the reading unit 112 notifies the read request source of the occurrence of a read error.

Specifically, when receiving a notice indicating the occurrence of the read error from the reading unit 112, the transfer control unit 115 performs a process of maintaining consistency such that an error occurs when the cluster is read after the transfer process. For example, the transfer control unit 115 may transfer the cluster data with the read error, without correcting the read error. In addition, the transfer control unit 115 may insert information indicating that the read error occurs when the logical address is read into the management information stored in the first memory 152 such that the cluster data with the read error is not transferred.

When error correction succeeds (error correction is available), the reading unit 112 extracts cluster data from the error corrected data for the cluster set. The reading unit 112 transmits the extracted cluster data to the decompression unit 105 and instructs the decompression unit 105 to decompress the extracted cluster data. Then, the reading unit 112 acquires the cluster data decompressed by the decompression unit 105.

When it is not necessary to decompress the cluster data, the reading unit 112 may process the extracted cluster data in the same way as that in which the decompressed cluster data is processed, without transmitting the extracted cluster data to the decompression unit 105. For example, when the cluster data is stored in the storage medium 151 without being compressed, the reading unit 112 processes the extracted cluster data in the same way as that in which the decompressed cluster data is processed, without transmitting the extracted cluster data to the decompression unit 105. Then, the reading unit 112 transmits the decompressed cluster data (or the extracted cluster data which does not need to be decompressed) to the read request source. The transfer control unit 115 receives the data to be read from the reading unit 112.

In Step S308, the transfer control unit 115 generates write destination information. Specifically, the transfer control unit 115 shifts the write destination information transmitted in the previous cluster write request for the writing unit 111 by the size of the cluster set indicated by the information about the size of the cluster set which is returned from the writing unit 111 in the previous cluster write request for the writing unit 111, thereby generating write destination information. The write destination information transmitted in the previous cluster write request for the writing unit 111 includes the block number of the write destination of the cluster, the page number, and the information about the page offset. The write control unit 113 adds, to the information about the page offset, the size of the cluster set indicated by the information about the size of the cluster set which is returned from the writing unit 111 in the previous cluster write request for the writing unit 111, thereby generating the write destination information.

In the previous cluster write request for the writing unit 111, when the next write destination information is given to the writing unit 111 (the cluster is stored across the pages), the transfer control unit 115 shifts the next write destination information by the remaining size of the cluster set to generate write destination information. The next write destination information includes the block number of the write destination of the cluster, the page number, and the information about the page offset indicating the position of the head of the page. The transfer control unit 115 adds the remaining size of the cluster set to the information about the page offset to generate the write destination information. When the block 400 to which the data which is requested to be written by the host apparatus (not illustrated) is written is the same as a transfer destination block 400, the write control unit 113 and the transfer control unit 115 perform a process in cooperation with each other such that the generated write destination information items do not overlap each other.

The transfer control unit 115 transmits the generated write destination information, the data which is received as the cluster data to be transferred from the reading unit 112, and the extracted logical address to the writing unit 111. Then, the write control unit 113 instructs the writing unit 111 to perform a writing process. The writing unit 111 receives a cluster write request from the transfer control unit 115. The cluster write request includes write destination information, cluster data to be written, and data indicating the logical address of the cluster to be written. The write destination information includes the block number of the write destination of the cluster, the page number, and the information about the page offset.

In Step S310, the writing unit 111 compresses the cluster data using the compression unit 104 (if necessary). Specifically, the writing unit 111 extracts the cluster data to be written from the received cluster write request. The writing unit 111 transmits the extracted cluster data to be written to the compression unit 104 and instructs the compression unit 104 to compress the cluster data. Then, the writing unit 111 acquires the cluster data to be written which is compressed by the compression unit 104.

When there is no necessity to compress the cluster data, the writing unit 111 processes the extracted cluster data to be written in the same way as that in which the compressed cluster data to be written is processed, without transmitting the cluster data to the compression unit 104 (the cluster data is regarded as the compressed cluster data to be written).

In Step S312, the writing unit 111 generates a cluster set. Specifically, the writing unit 111 extracts data indicating the logical address of the cluster to be written from the received cluster write request and generates metadata including the extracted data indicating the logical address of the cluster to be written. When the metadata included in the cluster set is compressed, the writing unit 111 may instruct the compression unit 104 to compress the generated metadata, acquire the compressed metadata from the compression unit 104, and replace the generated metadata with the acquired compressed metadata.

The writing unit 111 generates the error correction data on the basis of the compressed cluster data to be written and data including the generated metadata. Then, the writing unit 111 generates a cluster set including the compressed cluster data to be written, the generated metadata, and the generated error correction data.

In Step S314, the writing unit 111 determines whether the generated cluster set is fitted into the page. Specifically, the writing unit 111 calculates the size of the generated cluster set. Then, the writing unit 111 determines whether the generated cluster set is fitted into the write destination page. Specifically, the writing unit 111 determines whether the sum of the information about the page offset included in the write destination information and the calculated size of the cluster set is within the size of the page.

In Step S316, the second memory 153 temporarily stores a plurality of cluster sets to be written. Specifically, when the determination result in Step S314 is YES (the cluster set is fitted into the write destination page), the writing unit 111 instructs the second access unit 103 to perform a writing process such that the second memory 153 temporarily stores the generated cluster set. In addition, the writing unit 111 returns the information about the size of the cluster set to the write request source. The transfer control unit 115 receives the size of the cluster set from the writing unit 111.

In Step S318, the writing unit 111 and the transfer control unit 115 perform terminal processing. Specifically, when the determination result in Step S318 is No (the cluster set is not fitted into the write destination page), the writing unit 111 returns a response indicating the overflow of the write destination page to the write request source. When the response indicating the overflow of the write destination page is received from the writing unit 111 and the physical addresses are consecutive in the same management unit managing the block 400, the transfer control unit 115 gives the next write destination information to the writing unit 111. When receiving the next write destination information from the write request source, the writing unit 111 instructs the second access unit 103 to perform a writing process such that the second memory 153 temporarily stores the generated cluster set. In addition, the writing unit 111 returns the information about the size of the cluster set to the write request source. The transfer control unit 115 receives the size of the cluster set from the writing unit 111. Then, the process proceeds to Step S320.

In some cases, the transfer control unit 115 instructs the writing unit 111 to write the dummy data. For example, the transfer control unit 115 may appropriately instruct the writing unit 111 to write the dummy data even when the physical addresses are not consecutive in the same management unit managing the block 400. When receiving an instruction to store the dummy data from the write request source, the writing unit 111 generates dummy data corresponding to the size of the area in which the cluster set is not stored in the write destination page. Then, the writing unit 111 instructs the second access unit 103 to perform a writing process such that the second memory 153 temporarily stores the generated dummy data.

The writing unit 111 may be configured so as to generate the error correction data of the cluster set which is temporarily stored in the second memory 153, instead of the dummy data. When the error correction data of the cluster set temporarily stored in the second memory 153 is generated, it is possible to improve the reliability of the data stored in the storage medium 151. In addition, the cluster sets may be stored in the second memory 153 such that the order thereof is appropriately changed, thereby reducing the amount of dummy data stored in the second memory 153. When the amount of dummy data stored in the second memory 153 is reduced, it is possible to improve the usage efficiency of the storage medium 151. When instructing the writing unit 111 to write the dummy data, the transfer control unit 115 ensures a new write destination page in order to write the cluster data, which is a write target, and performs the writing process again from Step S308.

In Step S320, the writing unit 111 determines whether the total size of the data temporarily stored in the second memory 153 is equal to or more than the size of one page. When the total size of the data temporarily stored in the second memory 153 is not equal to or more than the size of the page 402 (No in Step S320), the writing unit 111 proceeds to Step S300. When the total size of the data temporarily stored in the second memory 153 is equal to or more than the size of the page 402 (Yes in Step S320), the writing unit 111 proceeds to Step S322. The reason is as follows. Since the unit of input and output for the storage medium 151 is the page 402, the transfer control unit 115 needs to write data corresponding to at least one page in order to perform a process of updating the management information, which will be described. Therefore, the transfer process is not completed.

In Step S322, the writing unit 111 writes data corresponding to one page to the storage medium 151 through the storage medium access unit 101. Specifically, when the total size of the data temporarily stored in the second memory 153 is equal to or more than the size of the page 402, the writing unit 111 instructs the second access unit 103 to read data corresponding to the page size from the second memory 153. Then, the writing unit 111 acquires the data corresponding to the page size. Specifically, the writing unit 111 instructs the second access unit 103 to read data stored in the left page of FIG. 3B among the data pieces temporarily stored in the second memory 153 and acquires data corresponding to the page size.

In a case in which the data storage device 100 includes a plurality of storage media 151 and parallel access to the storage media 151 is performed to improve the processing speed, when the total size of the data temporarily stored in the second memory 153 is equal to or more than the size of the pages 402 to which data is written in parallel, the writing unit 111 instructs the second access unit 103 to read data corresponding to the size of the pages to which data is written in parallel from the second memory 153.

Then, the writing unit 111 instructs the storage medium access unit 101 to write the data corresponding to the page size (or the size of the pages to which data is written in parallel) which is acquired through the second access unit 103 to the write destination pages (or each page to which data is written in parallel).

Here, the write destination page is the left page of FIG. 3B. The writing unit 111 instructs the storage medium access unit 101 to write the block number of the write destination of the cluster and the page number which are included in the write destination information received from the write request source.

In Step S324, the transfer control unit 115 updates the management information. Specifically, the writing unit 111 transmits a notice indicating that the writing of data to the write destination page has been completed to the write request source. The write destination page is the left page of FIG. 3B and the writing unit 111 notifies the write request source of the block number of the write destination of the cluster and the page number included in the write destination information received from the write request source. When receiving the write completion notice from the writing unit 111, the transfer control unit 115 updates the address mapping table 160 for the cluster written to the page. Specifically, the transfer control unit 115 instructs the first access unit 102 to perform a writing process such that the physical address of the storage medium 151 indicated by the converted logical address in the address mapping table 160 is updated to the physical address of the storage medium 151, which is a write destination, for the cluster written to the page. In addition, the transfer control unit 115 instructs the first access unit 102 to perform a writing process such that the information about the size of the cluster set acquired from the writing unit 111 is written to the address mapping table 160 for the cluster written to the page (see FIG. 4).

As such, according to the data storage device 100 of the first embodiment, the compression unit 104 performs the compression process. Therefore, it is possible to reduce the amount of data which is actually written to the storage medium 151 with respect to the total size of data which is requested to be written from the outside. As a result, it is possible to increase the lifespan of the data storage device 100, as compared to a data storage device data without the compression function.

(Second Embodiment)

However, when the (compressed) cluster set is stored in the page 402 as in the first embodiment, the storage efficiency of the storage medium 151 is improved, but the amount of data managed increases. In the second embodiment, the size of the cluster set stored in the page 402 is arranged in a predetermined unit.

In a controller of a data storage device according to the second embodiment, the page includes at least one set area with a size that is an integer multiple of the size of the cluster. The set area is divided into a plurality of predetermined division sizes. The write control unit adds dummy data to the compressed piece of cluster data so that a size of the compressed piece of cluster data is an integer multiple of the division size. The transfer control unit adds dummy data to the compressed piece of cluster data so that a size of the compressed piece of cluster data is an integer multiple of the division size.

In the controller of the data storage device according to the second embodiment, the page includes at least one set area with a size that is an integer multiple of the size of the cluster. The set area is divided into a plurality of predetermined division sizes. The write control unit adds dummy data to the compressed piece of cluster data so that a size of the compressed piece of cluster data is an integer multiple of the division size. The transfer control unit adds dummy data to the compressed piece of cluster data so that a size of the compressed piece of cluster data is an integer multiple of the division size. When the size of the piece of cluster data that is an integer multiple of the division size is equal to the size of the set area, the write control unit makes a control that cancels the compression of the piece of cluster data, and writes the piece of cluster data whose compression is cancelled to the storage medium using the physical address of the write destination, and a control that writes a correspondence between the physical address of the write destination and the logical address to the storage unit. When the read piece of cluster data is not compressed, the read control unit makes a control that outputs the read piece of cluster data without decompressing by the external decompression unit. When the read cluster data is not compressed, the transfer control unit makes a control that does not decompress the read piece of cluster data by the external decompression unit. When the size of the cluster data that is an integer multiple of the division size is equal to the size of the set area, the transfer control unit makes a control that cancels the compression of the piece of cluster data, writes the piece of cluster data whose compression is cancelled to the storage medium using the physical address of the write destination, and a control that writes a correspondence between the physical address of the transfer destination and the logical address to the storage unit.

In the controller of the data storage device according to the second embodiment, the storage medium includes a block including the plurality of set areas. The write control unit makes a control that writes the pieces of cluster data across the plurality of set areas with consecutive physical addresses, respectively, in a management unit in which the block is managed into the storage medium. When the pieces of cluster data are written across the plurality of set areas with the consecutive physical addresses in the management unit in which the block is managed, the read control unit makes a control that reads the plurality of set areas and extracts the pieces of cluster data. When the pieces of cluster data are written across the plurality of set areas with the consecutive physical addresses in the management unit in which the block is managed, the transfer control unit makes a control that reads the plurality of set areas and extracts the pieces of cluster data. The transfer control unit makes a control that writes the pieces of cluster data across the plurality of set areas with consecutive physical addresses, respectively, in the management unit in which the block is managed into the storage medium.

Hereinafter, an example will be described in detail. First, the structure of the data storage device according to the second embodiment will be described. In the second embodiment, components having the same functions as those in the first embodiment are denoted by the same reference numerals as those in the first embodiment. For example, the second embodiment differs from the first embodiment in that a read/write target is not the first memory 152, but is a first memory 252. The other components have the same functions as those in the components according to the first embodiment and are denoted by the same reference numerals as those in the first embodiment.

Figure 8:
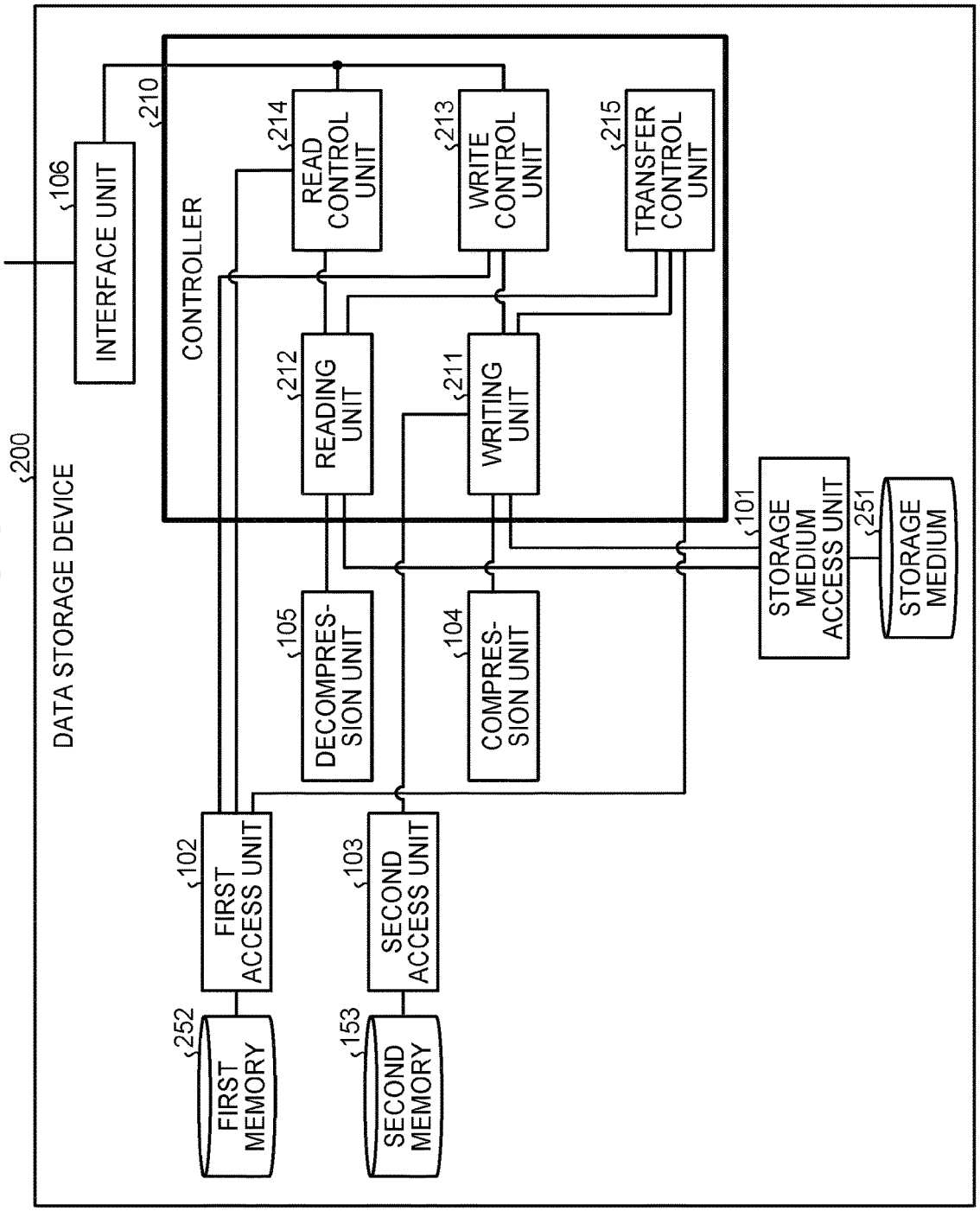
FIG. 8 is a block diagram illustrating an example of the structure of a data storage device according to a second embodiment.

FIG. 8 is a block diagram illustrating the example of the outline of the functional structure of a data storage device 200 according to the second embodiment. As illustrated in FIG. 8, the data storage device 200 includes the storage medium access unit 101, the first access unit 102, the second access unit 103, the compression unit 104, the decompression unit 105, the interface unit 106, a controller 210, a storage medium 251, the first memory 252, and the second memory 153.

(Storage Medium 251)

Figure 9:
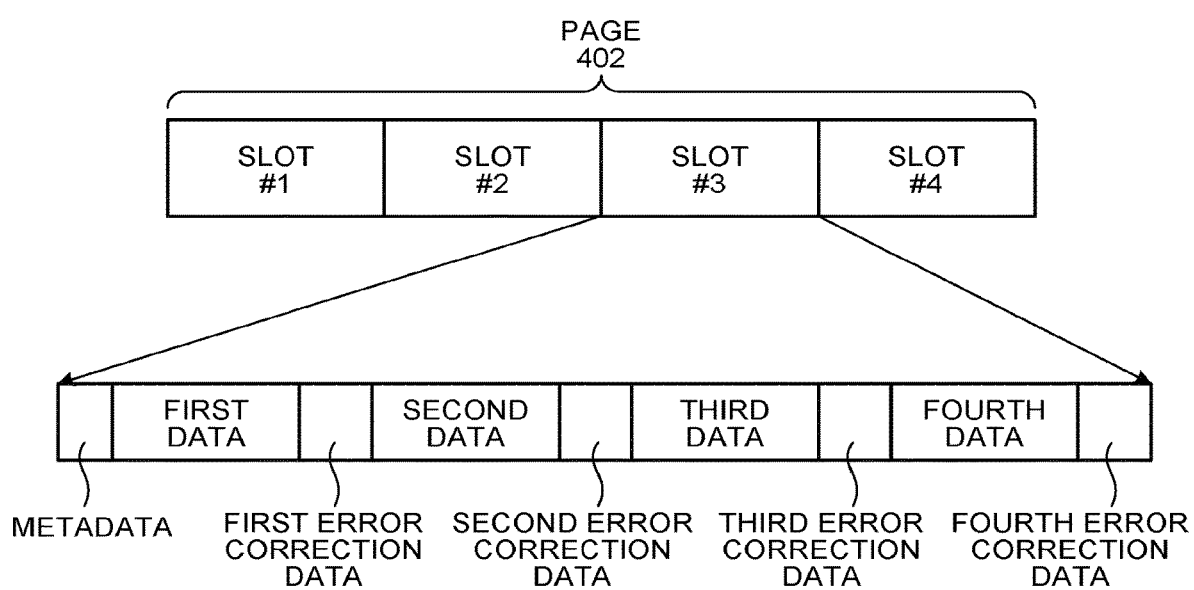
FIG. 9 is a schematic diagram illustrating an example of the structure of a slot.

The storage medium 251 has restrictions in a data storage format, as compared to the storage medium 151 (FIG. 1). Specifically, as illustrated in FIG. 9, a page 402 includes a plurality of slots. The size of the slot is equal to, for example, the size of a cluster set (or cluster data) which is not compressed in the storage medium 151. However, the slot is a set area which may have other sizes. For example, the size of the slot may be an integer multiple of the size of the cluster set (or cluster data) which is not compressed.

The area of the slot in which data can be stored is divided into a predetermined number of areas. The slot is divided into an arbitrary number of areas. For example, the size of data (cluster) which can be identified by a logical address is set to 1024 bytes and the size of data (sector) which can be identified by a data storage device address is set to 512 bytes. In this case, the cluster is divided into two areas when the area of the slot in which data can be stored is divided by 512 bytes, which are the size of sector data.

For example, when the area of the slot in which data can be stored is divided into four areas, the storage format of the slot includes, metadata, a first data piece, a first error correction data piece, a second data piece, a second error correction data piece, a third data piece, a third error correction data piece, a fourth data piece, and a fourth error correction data piece, as illustrated in FIG. 9. The basic data for generating the first error correction data piece includes the metadata and the first data piece. The basis data for generating the second error correction data piece includes the metadata and the second data piece. The basis data for generating the third error correction data piece includes the metadata and the third data piece. The basis data for generating the fourth error correction data piece includes the metadata and the fourth data piece. Hereinafter, an example in which the slot is divided into four areas will be described, but the slot may be divided into any number of areas.

When the cluster is compressed and stored, the size of the compressed data is an integer multiple of the division size. Here, the division size corresponds to the storage areas of the first to fourth data pieces illustrated in FIG. 9. That is, the storage areas of the metadata or the first to fourth error correction data pieces are not included. Specifically, the size of data obtained by adding the metadata of the cluster to be compressed and the compressed cluster data is an integer multiple of the division size. In addition, the metadata of the cluster to be compressed may or may not be compressed.

Figure 10A:
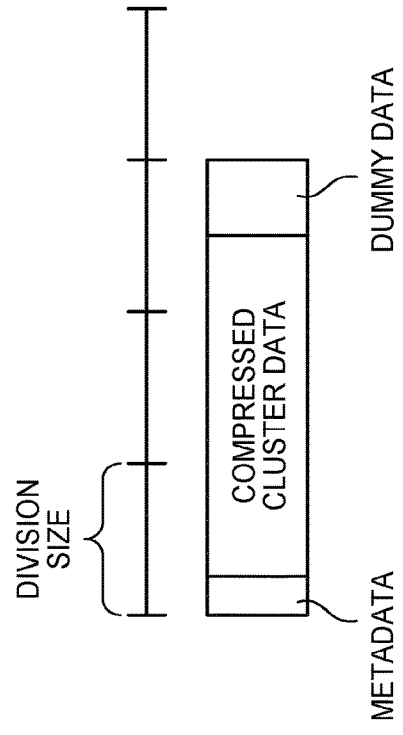
FIGS. 10A to 10D are schematic diagrams illustrating the size of compressed data with respect to the division size of the slot.

When the size of the data obtained by adding the metadata of the cluster to be compressed and the compressed cluster data is equal to or less than (one time) the division size, dummy data is stored in the remainder of the area of the data obtained by adding the metadata of the cluster to be compressed and the compressed cluster data in the area with the division size (one time), as illustrated in FIG. 10A. In this way, the size of data is an integer multiple of the division size. The dummy data may have a predetermined value (for example, all zero) or a random value. The dummy data may be error correction data which is generated on the basis of the data obtained by adding the metadata of the cluster to be compressed and the compressed cluster data. When the dummy data is the error correction data, the effect of improving the reliability of the stored data is obtained.

Figure 10C:
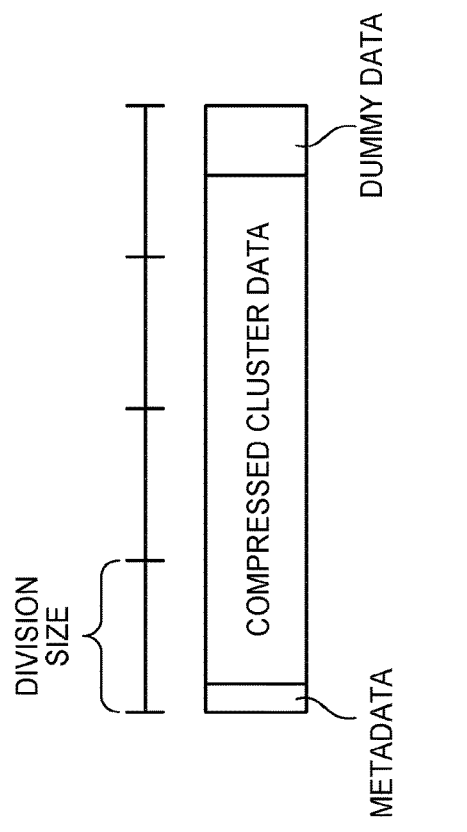
Figure 10B:
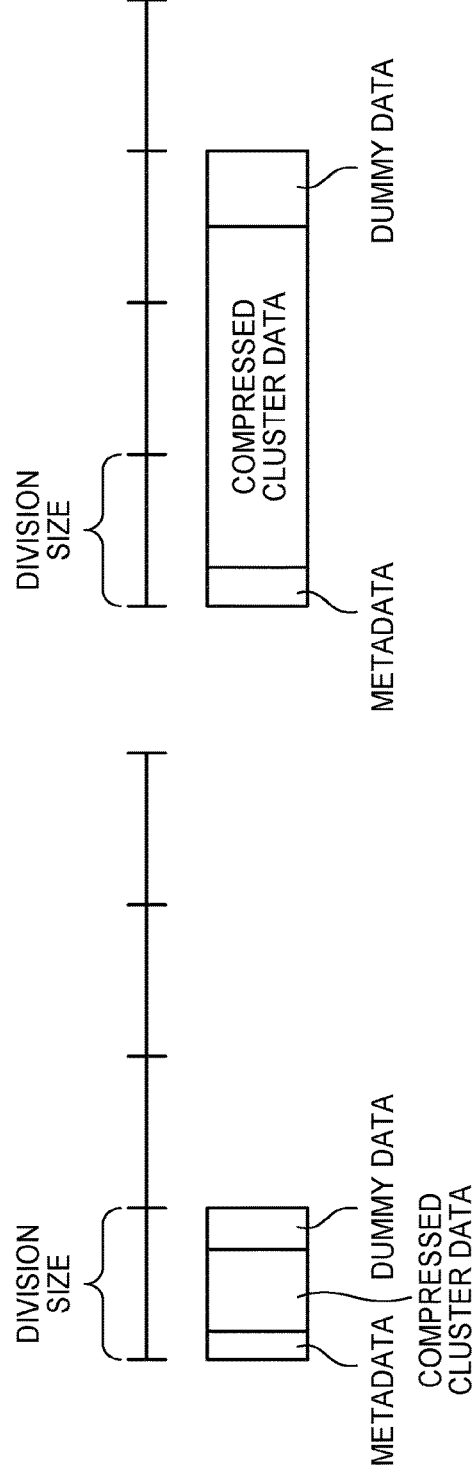

In the second embodiment, as described above, an example in which the cluster data (slot) is divided into four areas will be described. When the size of the data obtained by adding the metadata of the cluster to be compressed and the compressed cluster data is equal to or less than twice the division size, the size of data is an integer multiple of the division size, as illustrated in FIG. 10B. When the size of the data obtained by adding the metadata of the cluster to be compressed and the compressed cluster data is equal to or less than three times the division size, the size of data is an integer multiple of the division size, as illustrated in FIG. 10C. In addition, the size of data is not limited to an integer multiple of the division size, but may be other values. For example, the size of data may be a multiple of 2.

Figure 10D:
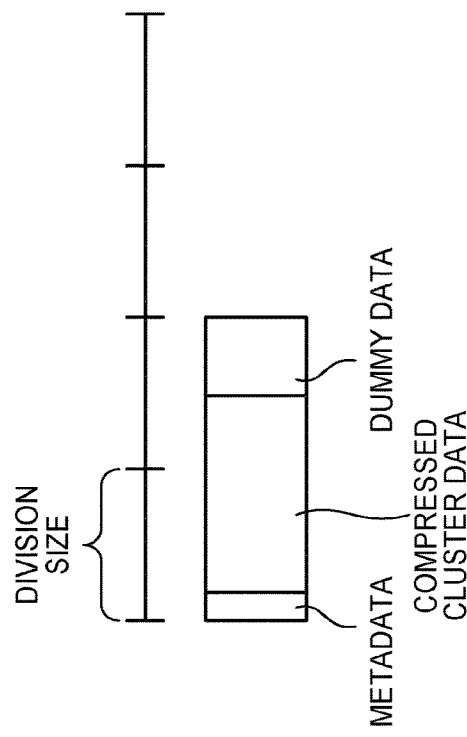

When the size of the data obtained by adding the metadata of the cluster to be compressed and the compressed cluster data is equal to or less than four times the division size, that is, when the size of the data is equal to or less than the size of the cluster data which is not compressed, the size of the data may be set as follows. For example, as illustrated in FIG. 10D, the size of the data may be an integer multiple of the same division size as that illustrated in FIGS. 10A to 10C. In addition, the cluster data may be stored in a plurality of slots of the page 402 illustrated in FIG. 9, without being compressed.

The advantage of the structure in which the cluster data is compressed and stored and the size is an integer multiple of the division size is that error correction data, which is generated on the basis of the data obtained by adding the metadata of the cluster to be compressed and the compressed cluster data, is dummy data and the reliability of the stored data is improved. In addition, only when the cluster is stored across adjacent slots in the same page or the physical addresses are consecutive in the range in which the units of management of the block 400 do not overlap each other (for example, in the same block 400), it is possible to store data across the pages. Therefore, according to the second embodiment, it is possible to improve the storage efficiency of the storage medium 251 and increase the lifespan of the data storage device 200.

Figure 11A:
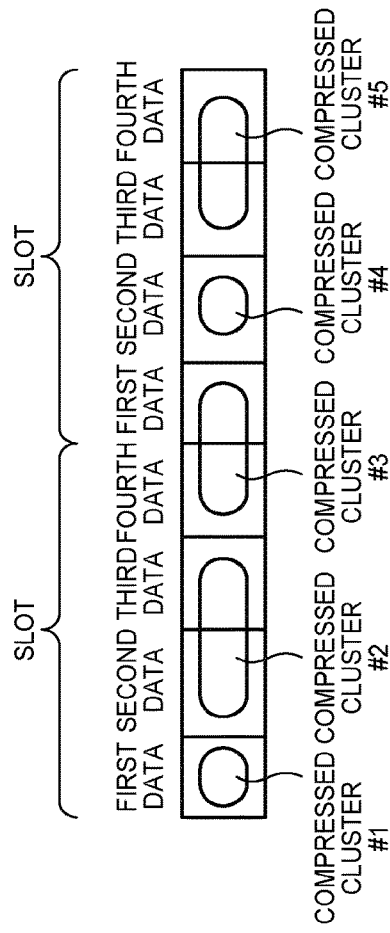
FIGS. 11A and 11B are schematic diagrams illustrating a state in which the compressed clusters are stored across the slots (or pages)
Figure 11B:
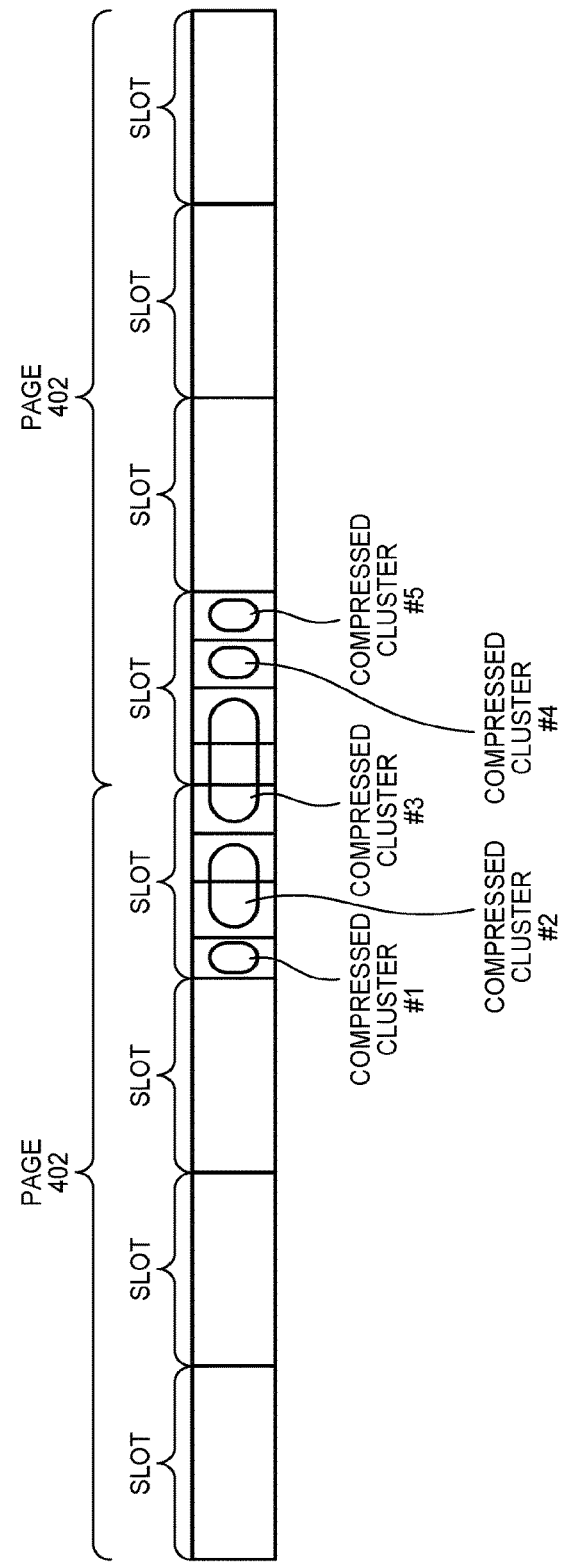

The advantage of the structure in which the cluster data is stored without being compressed is that it is possible to reduce the time required for the compression process during, for example, the writing process or the time required for the decompression process during the reading process. The compressed cluster may be stored across adjacent slots in the same page illustrated in FIG. 11A, similarly to the structure in which the cluster is stored across the pages illustrated in FIG. 3B. In addition, as illustrated in FIG. 11B, only when the physical addresses are consecutive in the range in which the units of management of the block 400 do not overlap each other, the compressed cluster may be stored across the pages 402. In FIGS. 11A and 11B, for simplicity of explanation, the storage area of the metadata or the error correction data in the slot is not illustrated.

When the cluster data is compressed and stored, data indicating a special value (magic number) indicating the arrangement pattern of the compressed and stored cluster is stored in the area of the metadata in the storage format of the slot in the page 402.

In the second embodiment, as described above, an example in which the cluster data is divided into four parts. In this case, for example, the page 402 stores the magic number indicating eight patterns illustrated in FIG. 12 in the slot. In this way, it is possible to distinguish a case in which the cluster data is stored in the slot without being compressed from a case in which the cluster data is compressed and stored in the slot.

Figure 12:
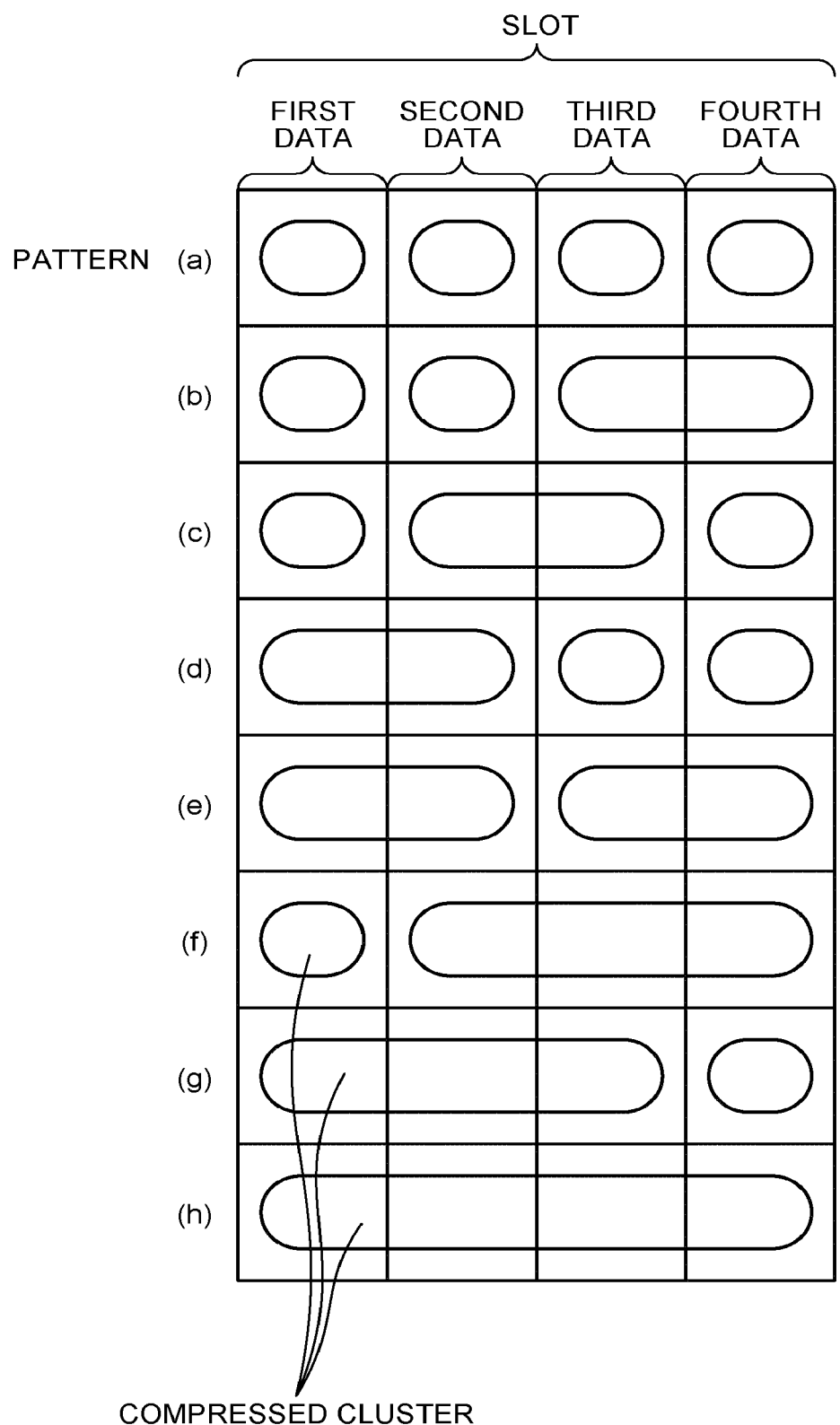
FIG. 12 is a schematic diagram illustrating the storage patterns of the compressed clusters in the slot.

In the patterns illustrated in FIG. 12, in some cases, the cluster stored at the head or tail of the slot is stored across adjacent slots in the same page or across the pages 402, as illustrated in FIGS. 11A and 11B. Therefore, for the slot, the pattern indicating the situations may be added to the magic number, thereby simplifying the process.

(First Memory 252)

The first memory 252 (FIG. 8) stores management information and the management information includes an address mapping table 162. The address mapping table 162 is a table in which the logical address of the cluster is associated with the physical address of the storage medium 151 at which data indicated by the logical address is stored. In addition, the first memory 252 may be configured so as to store information derived from the information of the address mapping table 160 in advance in order to simplify various processes performed by the data storage device 200.

Figure 13:
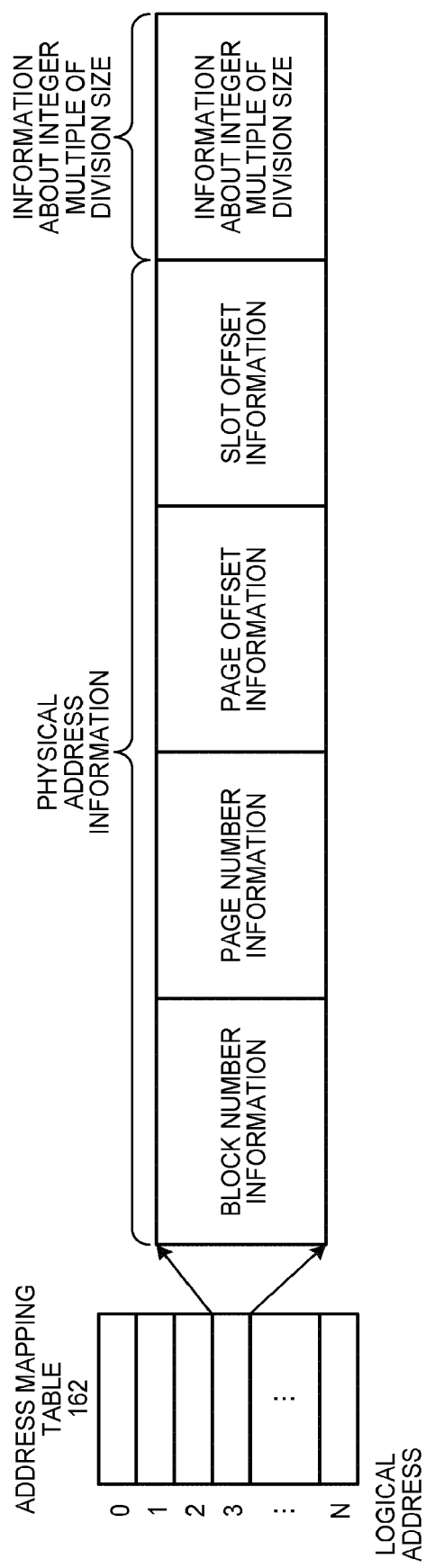
FIG. 13 is a schematic diagram illustrating an address mapping table according to the second embodiment.

The address mapping table 162 manages the association between the logical address of the cluster and the physical address of the storage medium 251 at which data indicated by the logical address is stored. The address mapping table 162 is similar to the address mapping table 160 of the first memory 152 in that the logical addresses arranged in ascending order are indexes. As illustrated in FIG. 13, the address mapping table 162 includes, as elements of the table, a set of block number information, page number information, information about the offset on a page and information about the offset on a slot, which are the physical address of the storage medium 251. In addition, the address mapping table 162 includes information indicating how many times greater the size of the data is than the division size instead of information about the size of the cluster set stored in the address mapping table 160.

In the case of adjacent slots in the same page illustrated in FIG. 11A, or when the physical addresses are consecutive in the range in which the units of management of the block 400 do not overlap each other as illustrated in FIG. 11B, the first memory 252 is processed by the same method as that processing the first memory 152 according to the first embodiment. In addition, when a plurality of storage media 251 are provided and parallel access is performed, the structure of the address mapping table 162 is the same as that of the first memory 152 according to the first embodiment.

The controller 210 (FIG. 8) includes a writing unit 211, a reading unit 212, a write control unit 213, a read control unit 214, and a transfer control unit 215.

(Writing Unit 211)

The writing unit 211 receives a cluster write request from the write control unit 213 (or the transfer control unit 215). The cluster write request includes write destination information, cluster data to be written, and data indicating the logical address of the cluster to be written. The write destination information includes the block number of the write destination of the cluster, a page number, information about a page offset (a slot offset on a page), and information about a slot offset (an offset on the slot).

A cluster data compression process of the writing unit 211 is the same as that of the writing unit 111. Specifically, the writing unit 211 extracts the cluster data to be written from the received cluster write request. The writing unit 211 transmits the extracted cluster data to be written to the compression unit 104 and instructs the compression unit 104 to compress the cluster data. Then, the writing unit 211 acquires the cluster data to be written which is compressed by the compression unit 104.

The writing unit 211 extracts data indicating the logical address of the cluster to be written from the received cluster write request and generates metadata including the extracted data indicating the logical address of the cluster to be written. When the metadata included in the cluster set is compressed, the writing unit 211 treats the compressed metadata the same as the metadata.

The writing unit 211 adjusts the size of the data obtained by adding the generated metadata and the compressed cluster data to an integer multiple of the division size. Specifically, when the size of the data obtained by adding the metadata of the cluster to be compressed and the compressed cluster data is equal to or less than an integer multiple of the division size, the writing unit 211 generates dummy data corresponding to the remainder of the area of the data obtained by adding the metadata of the cluster to be compressed and the compressed cluster data in the area with a size that is an integer multiple of the division size. The dummy data may have a predetermined value (for example, all zero) or a random value. In addition, the dummy data may be error correction data which is generated on the basis of the data obtained by adding the metadata of the cluster to be compressed and the compressed cluster data. When the dummy data is the error correction data, it is possible to improve the reliability of the stored data. The detailed example of setting the data size is the same as that in the storage medium 251.

The writing unit 211 determines whether data with a size that is an integer multiple of the division size is fitted into the slot, which is a write destination. Specifically, the writing unit 211 may determine whether the sum of the information about the offset on a slot included in the write destination information and the size that is an integer multiple of the division size is within the slot.

When the determination result is YES (the sum is fitted into the slot, which is a write destination), the writing unit 211 instructs the second access unit 103 to perform a writing process such that the second memory 153 temporarily stores the data with a size that is an integer multiple of the division size. In addition, the writing unit 211 returns information indicating the size of the data that is an integer multiple of the division size to a write request source.

When the determination result is NO (the sum is not fitted into the slot, which is a write destination), the writing unit 211 returns a response indicating the overflow of the slot, which is a write destination, to the write request source. When receiving the next write destination information from the write request source, the writing unit 211 instructs the second access unit 103 to perform a writing process such that the second memory 153 temporarily stores the data with a size that is an integer multiple of the division size. In addition, the writing unit 211 returns the information indicating the size of the data that is an integer multiple of the division size to the write request source.

When receiving an instruction to store the dummy data from the write request source, the writing unit 211 generates dummy data corresponding to the size of the remaining area of the slot, which is a write destination. Then, the writing unit 211 instructs the second access unit 103 to perform a writing process such that the second memory 153 temporarily stores the generated dummy data. The writing unit 211 may be configured so as to generate the error correction data of the data with a size that is an integer multiple of the division size which is temporarily stored in the second memory 153, instead of the dummy data. The writing unit 211 may use the error correction data of the data with a size that is an integer multiple of the division size which is temporarily stored in the second memory 153 to improve the reliability of data. In addition, the writing unit 211 may appropriately change the order of the data with a size that is an integer multiple of the division size to reduce the amount of dummy data stored, thereby improving the usage efficiency of the storage medium 251. The writing unit 211 repeats the above-mentioned process until data corresponding to the slot is obtained.

When data corresponding to one slot is obtained, the writing unit 211 generates data for a special value (magic number) indicating the arrangement pattern of the compressed and stored cluster as the metadata in the storage format of the slot. In addition, the writing unit 211 generates error correction data in the storage format of the slot. Specifically, for example, when the cluster data is divided into four parts, data which is a base for generating the first error correction data piece includes the metadata indicating the generated magic number and the first data piece, as illustrated in FIG. 9. Data which is a base for generating the second error correction data piece includes the metadata indicating the generated magic number and the second data piece. Data which is a base for generating the third error correction data piece includes the metadata indicating the generated magic number and the third data piece. Data which is a base for generating the fourth error correction data piece includes the metadata indicating the generated magic number and the fourth data piece.

The writing unit 211 instructs the second access unit 103 to perform a writing process such that the metadata indicating the generated magic number, the data with a size that is an integer multiple of the division size which is temporarily stored in the second memory 153, and the generated error correction data are temporarily stored as data of the slot. In addition, for example, when there is no necessity to compress data since the data size is not reduced by compression, the writing unit 211 may store the extracted cluster data to be written in a plurality of slots of the page 402 without transmitting the cluster data to the compression unit 104. The writing unit 211 repeatedly performs the above-mentioned process until write data corresponding to one page is obtained.

When the total size of the data temporarily stored in the second memory 153 is equal to or more than the size of the page 402, the writing unit 211 instructs the second access unit 103 to read data corresponding to the page size from the second memory 153 and acquires the data corresponding to the page size. Here, the writing unit 211 instructs the storage medium access unit 101 to write, as the write destination page, the block number of the write destination of the cluster and the page number which are included in the write destination information received from the write request source. The writing unit 211 transmits a notice indicating that the writing of data to the write destination page has been completed to the write request source.

In the second embodiment, the block 400 to which data which is requested to be written by the host apparatus is written is different from a transfer destination block 400. Therefore, when the write request source is the transfer control unit 115, the writing unit 211 performs the same process as that performed when the write request source is the write control unit 213 on another write destination page. The data storage device 200 may be configured such that the block 400 to which data which is requested to be written by the host apparatus is written is the same as the transfer destination block 400. In this case, even when there is a write request from the write control unit 213 or there is a write request from the transfer control unit 215, the writing unit 211 performs the above-mentioned process on the same write destination page.

(Reading Unit 212)

The reading unit 212 receives a cluster read request from the read request source. The cluster read request includes read destination information and data indicating the logical address of the cluster to be read. The read destination information includes the block number, the page number, information about the offset on a page, information about the offset on a slot, and information indicating how many times greater the size of the data is than the division size. When the cluster to be read is stored across the slots or the pages, the reading unit 212 also receives information about consecutive read destination slots. The information about consecutive read destination slots includes the block number, the page number, the information about the offset on a page, and the information about the offset on a slot.

The reading unit 212 extracts the block number and the page number from the acquired read destination information, instructs the storage medium access unit 101 to read the data of the page 402 with the extracted page number in the block 400 with the extracted block number, and acquires the data of the page. When the cluster to be read is stored across the slots or the pages, the reading unit 212 extracts the block number and the page number from the acquired information about consecutive read destination pages, instructs the storage medium access unit 101 to read the data of the pages 402 with the extracted page numbers in the block 400 with the extracted block number, and further acquires the data of the pages. When the cluster to be read is stored across adjacent slots in the same page, the reading unit 212 can read data from the storage medium 251 using one reading process since data is read from the storage medium 251 in the unit of the pages 402. Therefore, when the cluster is stored across adjacent slots in the same page, the reading unit 212 may perform one reading process to read data.

The reading unit 212 extracts the information about the offset on a page, the information about the offset on a slot, and the information indicating how many times greater the size of the data is than the division size from the acquired read destination information. The reading unit 212 extracts the metadata of the slot, data with a size that is an integer multiple of the division size, and the error correction data of the data from the position by the extracted information about the offset on a page, the information about the offset on a slot, and the information indicating how many times greater the size of the data is than the division size among the data pieces of the acquired page. When the cluster to be read is stored across the slots or the pages, the reading unit extracts data corresponding to the remaining size of the cluster from the position of the head of the consecutive slots and adds the data pieces to generate data for the cluster.

The reading unit 212 corrects the error of the extracted error correction target data using the extracted error correction data and acquires the error corrected data for the cluster set. Specifically, the reading unit 212 uses data including the metadata of the slot and the data with a size that is an integer multiple of the division size as the basic data for generating the error correction data, among the extracted data pieces. In addition, the reading unit 212 performs error correction using the error correction data among the extracted data pieces and acquires the error corrected data.

When error correction fails (error correction is unavailable), the reading unit 212 notifies the read request source of the occurrence of a read error. When error correction succeeds (error correction is available), the reading unit 212 extracts cluster data from the error corrected data. The reading unit 212 transmits the extracted cluster data to the decompression unit 105 and instructs the decompression unit 105 to decompress the extracted cluster data. Then, the reading unit 212 acquires the decompressed cluster data.

For example, when the cluster data extracted from the error corrected data is not compressed, the reading unit 212 does not transmit the cluster data to the decompression unit 105. The reading unit 212 transmits the acquired decompressed cluster data to the read request source.

(Write Control Unit 213)

When receiving a write instruction from the interface unit 106, the write control unit 213 extracts data storage device address information and write data from the received write instruction. Then, the write control unit 213 converts the extracted data storage device address information into a corresponding logical address. In addition, the write control unit 213 shifts the write destination information transmitted in the previous cluster write request for the writing unit 211 by the slot offset on the basis of the information how many times greater the size of the data is than the division size which is returned from the writing unit 211 in the previous cluster write request for the writing unit 211, thereby generating write destination information.

The write destination information transmitted in the previous cluster write request for the writing unit 211 includes the block number of the write destination of the cluster, the page number, and the information about the offset on a page, and the information about the offset on a slot. Among them, the information about the offset on a slot is added to an offset indicated by the information indicating how many times greater the size of the data is than the division size which is returned from the writing unit 211 in the previous cluster write request for the writing unit 211, thereby generating the write destination information.

When the next write destination information is given to the writing unit 211 (when the cluster is stored across the slots or the pages) in the previous cluster write request for the writing unit 211, the next write destination information is shifted by the remaining size of the multiple of the division size to generate write destination information. Specifically, the next write destination information includes the block number of the write destination of the cluster, the page number, the information about the offset on a page, and the information about the offset on a slot which indicates the position of the head of the slot. The write control unit 213 adds an offset corresponding to the remainder of the multiple of the division size to the information about the offset on a slot, thereby generating the write destination information.

In the data storage device 200, when the block 400 to which the data which is requested to be written by the host apparatus is written is the same as the transfer destination block 400, the write control unit 213 and the transfer control unit 215 perform a process in cooperation with each other such that the generated write destination information items do not overlap each other.

The write control unit 213 transmits the generated write destination information, the extracted write data which is the cluster data to be written, and the logical address which is converted as the logical address of the cluster to be written to the writing unit 211 and instructs the writing unit 211 to perform a writing process.

When a response indicating the overflow of the slot, which is a write destination, is received from the writing unit 211 and the cluster is stored across adjacent slots in the same page or the physical addresses are consecutive in the range in which the units of management of the block 400 do not overlap each other, the write control unit 213 gives the next write destination information to the writing unit 111.

In some cases, the write control unit 213 instructs the writing unit 211 to write the dummy data. In cases other than when the cluster is stored across adjacent slots in the same page or the physical addresses are consecutive in the range in which the units of management of the block 400 do not overlap each other, the write control unit 213 gives a dummy data storage instruction to the writing unit 211. When giving the dummy data write instruction to the writing unit 211, the write control unit 213 ensures a new write destination slot in order to write the cluster data, which is a write target, and performs the writing process again.

Then, the write control unit 213 receives the information indicating how many times greater the size of the data is than the division size from the writing unit 211. When receiving a write completion notice from the writing unit 211, the write control unit 213 updates the address mapping table 162 for the cluster written to the page. Specifically, the write control unit 213 instructs the first access unit 102 to perform a writing process such that the physical address of the storage medium 251 indicated by the converted logical address in the address mapping table 162 is updated to the physical address of the storage medium 251, which is a write destination, for the cluster written to the page.

In addition, the write control unit 213 instructs the first access unit 102 to write the information indicating how many times greater the size of the data is than the division size which is acquired from the writing unit 211 to the address mapping table 162 for the cluster written to the page.

(Read Control Unit 214)

When receiving a read instruction from the interface unit 106, the read control unit 214 extracts the data storage device address information from the received read instruction. The read control unit 214 converts the extracted data storage device address information to a corresponding logical address. The read control unit 214 acquires information associated with the converted logical address. Specifically, the read control unit 214 instructs the first access unit 102 to read the physical address of the storage medium 251 and the information indicating how many times greater the size of the data is than the division size which are indicated by the converted logical address in the address mapping table 162. Then, the read control unit 214 acquires the physical address and the information indicating how many times greater the size of the data is than the division size.

The read control unit 214 determines whether the cluster is stored across adjacent slots in the same page or the pages on the basis of the information about the offset on a page and the information about the offset on a slot which are included in the acquired physical address, and the acquired information indicating how many times greater the size of the data is than the division size. When the determination result is YES (the cluster is stored across adjacent slots in the same page or the pages), the read control unit 214 generates information about consecutive read destination slots. Specifically, the information about consecutive read destination slots includes the block number, the page number, and the information about the offset on a page. When the cluster is stored across adjacent slots in the same page, the block number and the page number included in the acquired physical address are set as the block number and the page number and consecutive information is set to the information about the offset on a page. In addition, when the cluster is stored across the pages, the block number included in the acquired physical address is set to the block number, consecutive numbers are set to the page numbers, and information indicating the position of the head is set to the information about the offset on a page.

The read control unit 214 instructs the reading unit 212 to perform a reading process, using the acquired physical address and the acquired information indicating how many times greater the size of the data is than the division size as read destination information and the converted logical address as the logical address of the cluster to be read. When the cluster to be read is stored across adjacent slots in the same page or across the pages, the read control unit 214 adds the generated information items about consecutive read destination slots and transmits the added information to the reading unit 212. When the cluster to be read is stored across adjacent slots in the same page, the cluster is read from the storage medium 251 by one reading process since data is read from the storage medium 251 in the unit of the pages 402. Therefore, the read control unit 214 may read the information about consecutive read destination slots using one reading process.

When receiving a notice indicating the occurrence of a read error from the reading unit 212, the read control unit 214 transmits data indicating the read error to the interface unit 106. The first memory 252 may further store information indicating that the read error occurs when the logical address is read as one of the management information items. In this way, when a read request for the same logical address is issued again, it is possible to rapidly return the read error. When receiving the data read by the reading unit 212, the read control unit 214 transmits the received data to the interface unit 106.

(Transfer Control Unit 215)

The transfer control unit 215 controls the following transfer process according to a predetermined rule. First, the transfer control unit 215 determines the cluster to be transferred. Specifically, the transfer control unit 215 instructs the first access unit 102 to read the management information from the first memory 252 and acquires the management information. The transfer control unit 215 determines the cluster to be transferred from the acquired management information using a predetermined method. Any known method may be used to determine the cluster to be transferred.

The transfer control unit 215 extracts the logical address of the determined cluster from the acquired management information. The transfer control unit 215 reads data for the cluster to be transferred. Specifically, the transfer control unit 215 acquires information associated with the extracted logical address. The transfer control unit 215 instructs the first access unit 102 to read the physical address of the storage medium 151 and the information indicating how many times greater the size of the data is than the division size which are indicated by the extracted logical address in the address mapping table 162. Then, the transfer control unit 215 acquires the physical address and the information indicating how many times greater the size of the data is than the division size.

The transfer control unit 215 determines whether the cluster is stored across adjacent slots in the same page or across the pages, on the basis of the information about the offset on a page and the information about the offset on a slot included in the acquired physical address, and the acquired information indicating how many times greater the size of the data is than the division size. When the determination result is YES (the cluster is stored across adjacent slots in the same page or across the pages), the transfer control unit 215 generates information about consecutive read destination slots. Specifically, the information about consecutive read destination slots includes the block number, the page number, and information about the offset on a page. When the cluster is stored across adjacent slots in the page, the block number included in the acquired physical address is set to the block number. The page number included in the acquired physical address is set to the page number.

Consecutive information is set to the information about the offset on a page. In addition, when the cluster is stored across the pages, the block number included in the acquired physical address is set to the block number. Consecutive numbers are set to the page numbers, and information indicating the position of the head is set to the information about the offset on a page.

The transfer control unit 215 instructs the reading unit 212 to perform a reading process, using the acquired physical address and the acquired information indicating how many times greater the size of the data is than the division size as read destination information and the converted logical address as the logical address of the cluster to be read. When the cluster to be read is stored across adjacent slots in the same page or across the pages, the transfer control unit 215 adds the generated information items about consecutive read destination slots and transmits the added information to the reading unit 212. When the cluster to be read is stored across adjacent slots in the same page, the cluster is read from the storage medium 251 by one reading process since data is read from the storage medium 251 in the unit of the page 402. Therefore, when the cluster to be read is stored across adjacent slots in the same page, the cluster may be read by one reading process.

When receiving a notice indicating the occurrence of the read error from the reading unit 212, the transfer control unit 215 performs a process of maintaining consistency such that an error occurs when the cluster is read after the transfer process. For example, the transfer control unit 215 may transfer the cluster data with the read error, without correcting the read error. In addition, the transfer control unit 215 may insert information indicating that the read error occurs when the logical address is read into the management information stored in the first memory 252 such that the cluster data with the read error is not transferred.

The transfer control unit 215 receives the data read from the reading unit 212. The transfer control unit 215 writes the cluster to be transferred. Specifically, the transfer control unit 215 shifts the write destination information transmitted in the previous cluster write request for the writing unit 211 by the slot offset indicated by the information indicating how many times greater the size of the data is than the division size which is returned from the writing unit 211 in the previous cluster write request for the writing unit 111, thereby generating write destination information. The write destination information transmitted in the previous cluster write request for the writing unit 211 includes the block number of the write destination of the cluster, the page number, the information about the offset on a page, and the information about the offset on a slot. The transfer control unit 215 adds, to the information about the offset on a slot, the offset indicated by the information indicating how many times greater the size of the data is than the division size which is returned from the writing unit 211 in the previous cluster write request for the writing unit 211, thereby generating the write destination information.

In the previous cluster write request for the writing unit 211, when the next write destination information is given to the writing unit 211 (the cluster is stored across the slots or the pages), the transfer control unit 215 shifts the next write destination information by the remainder of the multiple of the division size to generate write destination information. Specifically, the next write destination information includes the block number of the write destination of the cluster, the page number, the information about the offset on a page, and the information about the offset on a slot which indicates the position of the head of the slot. The writing unit 211 adds an offset corresponding to the remainder of the multiple of the division size to the information about the offset on a slot to generate the write destination information.

When the block 400 to which data which is requested to be written by the host apparatus (not illustrated) is written is the same as the transfer destination block 400, the write control unit 213 and the transfer control unit 215 perform a process in cooperation with each other such that the generated write destination information items do not overlap each other.

The transfer control unit 215 transmits the generated write destination information, the write data which is extracted as the cluster data to be written, and the converted logical address as the logical address of the cluster to be written to the writing unit 211 and instructs the writing unit 211 to perform a writing process.

When a response indicating the overflow of the slot, which is a write destination, is received from the writing unit 211 and the cluster is stored across adjacent slots in the same page or the physical addresses are consecutive in the same management unit managing the block 400, the transfer control unit 215 gives the next write destination information to the writing unit 211. In addition, the transfer control unit 215 may give a dummy data storage instruction to the writing unit 211 in order to make data sizes equal to each other. For example, when the cluster is written to adjacent slots in the same page or the physical addresses are consecutive in the same management unit managing the block 400, the transfer control unit 215 gives the dummy data storage instruction to the writing unit 211. When the dummy data storage instruction is given to the writing unit 211, the transfer control unit 215 ensures a new write destination slot in order to write the cluster, which is a write target, and starts the writing process again. Then, the transfer control unit 215 receives the information indicating how many times greater the size of the data is than the division size from the writing unit 211.

The transfer control unit 215 repeatedly performs the above-mentioned process until the write request for the writing unit 211 corresponds to at least one page as a result of the comparison of the write data. The reason is as follows. The unit of input and output for the storage medium 251 is the page 402. Therefore, when data corresponding to at least one page is not written, a management information update process, which will be described below, is not performed and the transfer process is not completed.

The transfer control unit 215 updates the management information about the transferred cluster. Specifically, when receiving a write completion notice from the writing unit 211, the transfer control unit 215 updates the address mapping table 162 for the cluster written to the page. The transfer control unit 215 instructs the first access unit 102 to perform a writing process such that the physical address of the storage medium 251 indicated by the converted logical address in the address mapping table 162 is updated to the physical address of the storage medium 251, which is a write destination, for the cluster written to the page.

In addition, the transfer control unit 215 instructs the first access unit 102 to write the information indicating how many times greater the size of the data is than the division size which is acquired from the writing unit 211 to the address mapping table 162 for the cluster written to the page.

The transfer control unit 215 repeatedly performs the above-mentioned process according to a predetermined method.

Figure 14:
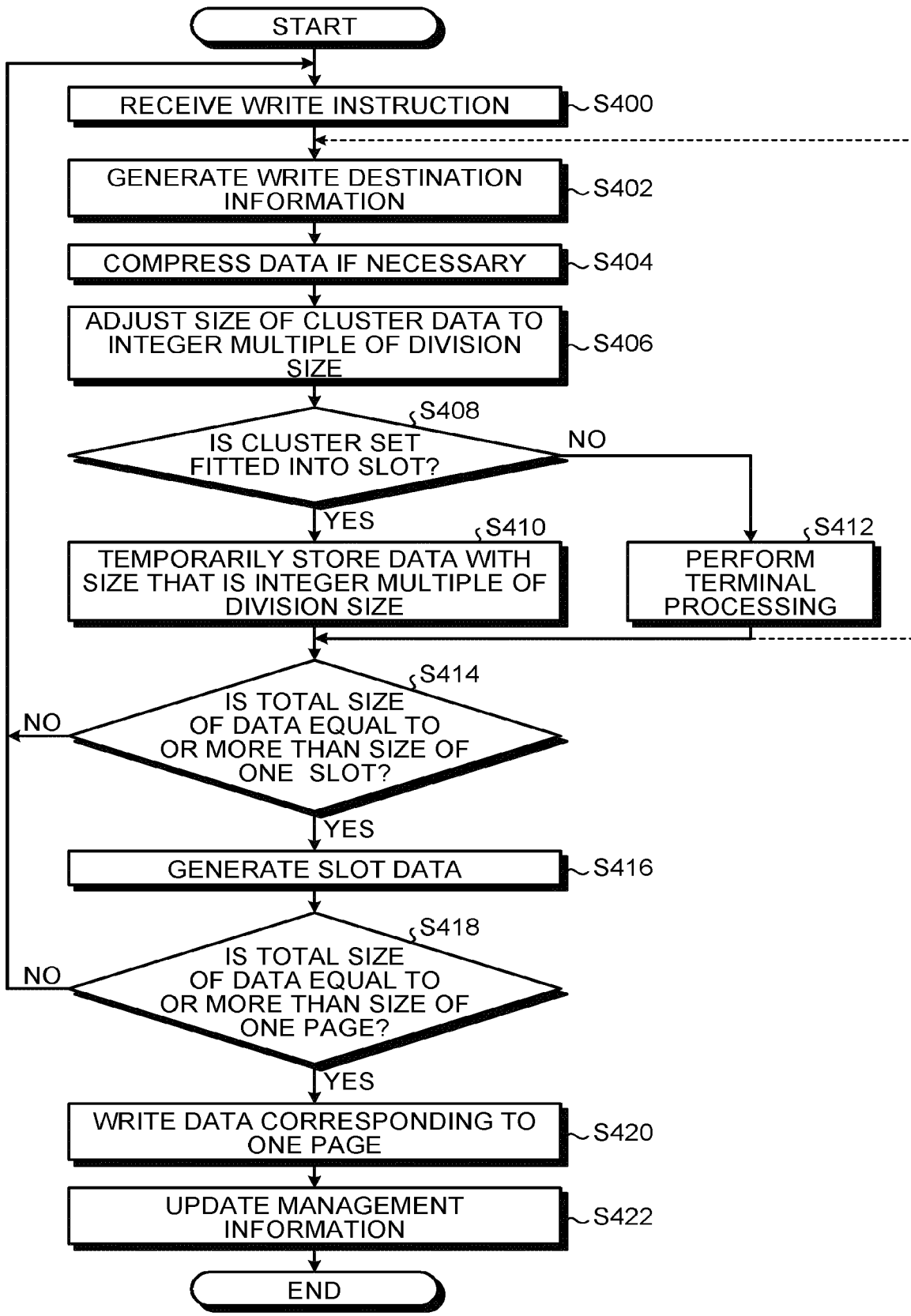
FIG. 14 is a flowchart illustrating an example of the procedure of a writing process according to the second embodiment.

Next, the operation of the data storage device 200 according to the second embodiment will be described. First, the procedure of the writing process performed by the data storage device 200 in response to a write instruction from the host apparatus (not illustrated) will be described with reference to FIG. 14. FIG. 14 is a flowchart illustrating an example of the procedure of the writing process performed by the data storage device 200.

(Writing Process)

In Step S400, the data storage device 200 receives a write instruction from, for example, an external host apparatus (not illustrated). Specifically, the interface unit 106 receives instructions including a write instruction and a read instruction from the host apparatus (not illustrated). The write instruction includes the data storage device address information and the write data. The read instruction includes the data storage device address information. The data storage device address information is address information which is provided from the data storage device 200 to the host apparatus (not illustrated).

For example, an LBA is an example of the data storage device address information of an HDD (Hard Disk Drive) or an SSD. The size of the data specified by LBA is set to, for example, 512 bytes. As described above, the size of the data specified by the data storage device address is generally different from the size of the data (cluster) specified by the logical address. However, the data storage device address and the logical address can be converted into each other. For example, when the data storage device address information is allocated for every 512 bytes and the logical address is allocated for every 1024 bytes, the quotient of the data storage device address information divided by 2 can be calculated to convert the data storage device address information into the logical address. In the second embodiment, for simplicity of explanation, an example in which the size of the data specified by the data storage device address is equal to the size of the cluster will be described. However, the invention is not limited thereto. The data storage device 200 may be configured such that the size of the data specified by the data storage device address is different from the size of the cluster.

When the received instruction is a write instruction, the interface unit 106 transmits the received write instruction to the write control unit 213.

In Step S402, the write control unit 113 generates write destination information. Specifically, when receiving the write instruction from the interface unit 106, the write control unit 213 extracts the data storage device address information and the write data from the received write instruction. Then, the write control unit 213 converts the extracted data storage device address information into a corresponding logical address. In addition, the write control unit 213 shifts the write destination information transmitted in the previous cluster write request for the writing unit 211 by the slot offset indicated by the information indicating how many times greater the size of the data is than the division size which is returned from the writing unit 211 in the previous cluster write request for the writing unit 211 to generate write destination information.

Specifically, the write destination information transmitted in the previous cluster write request for the writing unit 211 includes the block number of the write destination of the cluster, the page number, the information about the offset on a page, and the information about the offset on a slot. The write control unit 213 adds, to the information about the offset on a slot, the offset indicated by the information indicating how many times greater the size of the data is than the division size which is returned from the writing unit 211 in the previous cluster write request for the writing unit 211, thereby generating the write destination information.

In the previous cluster write request for the writing unit 211, when the next write destination information is given to the writing unit 211 (the cluster is stored across the slots or the pages), the write control unit 213 shifts the next write destination information by the remainder of the multiple of the division size to generate the write destination information. Specifically, the next write destination information includes the block number of the write destination of the cluster, the page number, the information about the offset on a page, and the information about the offset on a slot which indicates the position of the head of the slot. The writing unit 211 adds an offset corresponding to the remainder of the multiple of the division size to the information about the offset on a slot to generate the write destination information. In the data storage device 200, when the block 400 to which data which is requested to be written by the host apparatus is written is the same as the transfer destination block 400, the write control unit 213 and the transfer control unit 215 perform a process in cooperation with each other such that the generated write destination information items do not overlap each other. The write control unit 213 transmits the generated write destination information, the write data extracted as the cluster data to be written, and the logical address which is converted as the logical address of the cluster to be written to the writing unit 211 and instructs the writing unit 211 to perform a writing process.

The writing unit 211 receives a cluster write request from the write control unit 213. The cluster write request includes the write destination information, the cluster data to be written, and data indicating the logical address of the cluster to be written. The write destination information includes the block number of the write destination of the cluster, the page number, the information about the offset on a page, and the information about the offset on a slot.

In Step S404, the writing unit 211 transmits a compression instruction to the compression unit 104 (if necessary). Specifically, the writing unit 211 performs the same cluster data compression process as the writing unit 111. Specifically, the writing unit 211 extracts the cluster data to be written from the received cluster write request. The writing unit 211 transmits the extracted cluster data to be written to the compression unit 104 and instructs the compression unit 104 to compress the cluster data. Then, the writing unit 211 acquires the cluster data to be written which is compressed by the compression unit 104.

The writing unit 211 extracts data indicating the logical address of the cluster to be written from the received cluster write request and generates metadata including the extracted data indicating the logical address of the cluster to be written. When the metadata included in the cluster set is compressed, the writing unit 211 treats the compressed metadata the same as the metadata.

In Step S406, the writing unit 211 adjusts the size of the cluster data to an integer multiple of the division size. Specifically, the writing unit 211 adjusts the size of data obtained by adding the generated metadata and the compressed cluster data to an integer multiple of the division size.

Specifically, when the size of the data obtained by adding the metadata of the cluster to be compressed and the compressed cluster data is equal to or less than an integer multiple of the division size, the writing unit 211 generates dummy data corresponding to the remainder of the area of the data obtained by adding the metadata of the cluster to be compressed and the compressed cluster data in the area with a size that is an integer multiple of the division size. The dummy data may have a predetermined value (for example, all zero) or a random value. In addition, the dummy data may be error correction data which is generated on the basis of the data obtained by adding the metadata of the cluster to be compressed and the compressed cluster data. When the dummy data is the error correction data, it is possible to improve the reliability of the stored data.

Specifically, in the second embodiment, as described above, the cluster data is divided into four parts. When the size of the data obtained by adding the metadata of the cluster to be compressed and the compressed cluster data is equal to or less than (one time) the division size, the writing unit 211 stores the dummy data in the remainder of the area of the data obtained by adding the metadata of the cluster to be compressed and the compressed cluster data in the area with the division size (one time), as illustrated in FIG. 10A. In this way, the size of the data is an integer multiple of the division size.

Similarly, when the size of the data obtained by adding the metadata of the cluster to be compressed and the compressed cluster data is equal to or less than two times the division size, the size of the data is an integer multiple of the division size, as illustrated in FIG. 10B. When the size of the data obtained by adding the metadata of the cluster to be compressed and the compressed cluster data is equal to or less than three times the division size, the size of the data is an integer multiple of the division size, as illustrated in FIG. 10C. The size of the data is not limited to an integer multiple of the division size, but it may be other values. For example, the size of the data may be a multiple of 2.

When the size of the data obtained by adding the metadata of the cluster to be compressed and the compressed cluster data is equal to or less than four times the division size, that is, when the size of the data is equal to or less than the size of the cluster data which is not compressed, the size of the data may be set as follows. For example, as illustrated in FIG. 10D, the size of the data may be an integer multiple of the same division size as that illustrated in FIGS. 10A to 10C. In addition, the cluster data may be stored in a plurality of slots of the page 402 illustrated in FIG. 9, without being compressed.

The advantage of the structure in which the cluster data is compressed and stored and the size is an integer multiple of the division size is that error correction data, which is generated on the basis of the data obtained by adding the metadata of the cluster to be compressed and the compressed cluster data, is dummy data and the reliability of the stored data is improved. In addition, only when the cluster is stored across adjacent slots in the same page or the physical addresses are consecutive, in the range in which the units of management of the block 400 do not overlap each other (for example, in the same block 400), it is possible to store data across the pages. Therefore, according to the second embodiment, it is possible to improve the storage efficiency of the storage medium 251 and increase the lifespan of the data storage device 200.

The advantage of the structure in which the cluster data is stored without being compressed is that it is possible to reduce the time required for the compression process during, for example, the writing process or the time required for the decompression process during the reading process. The compressed cluster may be stored across adjacent slots in the same page illustrated in FIG. 11A, similarly to the structure in which the cluster is stored across the pages illustrated in FIG. 3B. In addition, as illustrated in FIG. 11B, only when the physical addresses are consecutive in the range in which the units of management of the block 400 do not overlap each other, the compressed cluster may be stored across the pages 402. In FIGS. 11A and 11B, for simplicity of explanation, the storage area of the metadata or the error correction data in the slot is not illustrated.

In Step S408, the writing unit 211 determines whether the generated cluster set is fitted into the slot. Specifically, the writing unit 211 determines whether data with a size that is an integer multiple of the division size is fitted into the slot, which is a write destination. Specifically, the writing unit 211 determines whether the sum of the information about the offset on a slot included in the write destination information and the size that is an integer multiple of the division size is fitted into the slot.

In Step S410, the second memory 153 temporarily stores the data with a size that is an integer multiple of the division size. Specifically, when the determination result in Step S408 is YES (the data is fitted into the slot, which is a write destination), the writing unit 211 instructs the second access unit 103 to perform a writing process such that the second memory 153 temporarily stores the data with a size that is an integer multiple of the division size. In addition, the writing unit 211 returns the information indicating how many times greater the data with a size that is an integer multiple of the division size is than the division size to the write request source. The write control unit 213 receives the information indicating how many times greater the data is than the division size from the writing unit 211.

In Step S412, the writing unit 211 and the write control unit 213 perform terminal processing. Specifically, when the determination result in Step S408 is NO (the data is not fitted into the slot, which is a write destination), the writing unit 211 returns a response indicating the overflow of the slot, which is a write destination, to the write request source. When the response indicating the overflow of the slot, which is a write destination, is received from the writing unit 211 and the cluster is stored across adjacent slots in the same page or the physical addresses are consecutive in the same management unit managing the block 400, the write control unit 213 gives the next write destination information to the writing unit 211. When receiving the next write destination information from the write request source, the writing unit 211 instructs the second access unit 103 to perform a writing process such that the second memory 153 temporarily stores the data with a size that is an integer multiple of the division size. In addition, the writing unit 211 returns the information indicating how many times greater the data with a size that is an integer multiple of the division size is than the division size to the write request source. The write control unit 213 receives the information indicating how many times greater the data is than the division size from the writing unit 211. Then, the write control unit 213 proceeds to Step S414.

When receiving a response indicating the overflow of the slot, which is a write destination, from the writing unit 211, the write control unit 213 may give a dummy data storage instruction to the writing unit 211. The write control unit 213 gives the dummy data storage instruction to the writing unit 211 when the cluster is stored across adjacent slots in the same page or the physical addresses are not consecutive in the range in which the units of management of the block 400 do not overlap each other. When receiving the dummy data storage instruction from the write request source, the writing unit 211 generates dummy data corresponding to the size of the remaining area of the slot, which is a write destination.

The writing unit 211 instructs the second access unit 103 to perform a writing process such that the second memory 153 temporarily stores the generated dummy data.

The writing unit 211 may generate the error correction data of the data with a size that is an integer multiple of the division size which is temporarily stored in the second memory 153, instead of the dummy data. The writing unit 211 may use the error correction data of the data with a size that is an integer multiple of the division size which is temporarily stored in the second memory 153 to improve the reliability of data. In addition, the writing unit 211 may appropriately change the order of the data with a size that is an integer multiple of the division size to reduce the amount of dummy data stored, thereby improving the usage efficiency of the storage medium 251.

When instructing the writing unit 211 to write the dummy data, the write control unit 213 ensures a new write destination slot in order to write the cluster data, which is a write target, and performs the writing process again from Step S402.

In Step S414, the writing unit 211 determines whether the total size of the data temporarily stored in the second memory 153 is equal to or more than the size of one slot. When the total size of the data temporarily stored in the second memory 153 is not equal to or more than the size of one slot (No in Step S414), the writing unit 211 proceeds to Step S400. When the total size of the data temporarily stored in the second memory 153 is equal to or more than the size of one slot (Yes in Step S414), the writing unit 211 proceeds to Step S416.

In Step S416, the writing unit 211 generates slot data. Specifically, when data corresponding to one slot is obtained, the writing unit 211 generates data for a special value (magic number) indicating the arrangement pattern of the compressed and stored cluster as the metadata in the storage format of the slot. In addition, the writing unit 211 generates the error correction data in the storage format of the slot.

Specifically, for example, when the cluster data is divided into four parts, data which is a base for generating the first error correction data piece includes the metadata indicating the generated magic number and the first data piece, as illustrated in FIG. 9. Data which is a base for generating the second error correction data piece includes the metadata indicating the generated magic number and the second data piece. Data which is a base for generating the third error correction data piece includes the metadata indicating the generated magic number and the third data piece. Data which is a base for generating the fourth error correction data piece includes the metadata indicating the generated magic number and the fourth data piece.

The writing unit 211 instructs the second access unit 103 to perform a writing process such that the metadata indicating the generated magic number, the data with a size that is an integer multiple of the division size which is temporarily stored in the second memory 153, and the generated error correction data are temporarily stored as data of the slot.

In addition, for example, when there is no necessity to compress data since the data size is not reduced by compression, the writing unit 211 may store the extracted cluster data to be written in a plurality of slots of the page 402 without transmitting the cluster data to the compression unit 104.

In Step S418, the writing unit 211 determines whether the size of the data to be written is equal to or more than one page. When the size of the data to be written is not equal to or more than one page (No in Step S418), the writing unit 211 proceeds to Step S400. When the size of the data to be written is equal to or more than one page (Yes in Step S418), the writing unit 211 proceeds to Step S420.

In Step S420, the writing unit 211 writes data corresponding to one page. Specifically, when the total size of the data temporarily stored in the second memory 153 is equal to or more than the size of the page 402, the writing unit 211 instructs the second access unit 103 to read data corresponding to the page size among the data pieces temporarily stored in the second memory 153 and acquires the data corresponding to the page size. Here, the writing unit 211 instructs the storage medium access unit 101 to write the block number of the write destination of the cluster and the page number which are included in the write destination information received from the write request source as the write destination page.

In Step S422, the write control unit 213 updates the management information. Specifically, the writing unit 211 transmits a notice indicating that the writing of data to the write destination page has been completed to the write request source. When receiving the write completion notice from the writing unit 211, the write control unit 213 updates the address mapping table 162 for the cluster written to the page. The write control unit 213 instructs the first access unit 102 to perform a writing process such that the physical address of the storage medium 251 indicated by the converted logical address in the address mapping table 162 is updated to the physical address of the storage medium 251, which is a write destination, for the cluster written to the page. In addition, the write control unit 213 instructs the first access unit 102 to write the information indicating how many times greater the size of the data is than the division size which is acquired from the writing unit 211 to the address mapping table 162 for the cluster written to the page.

Figure 15:
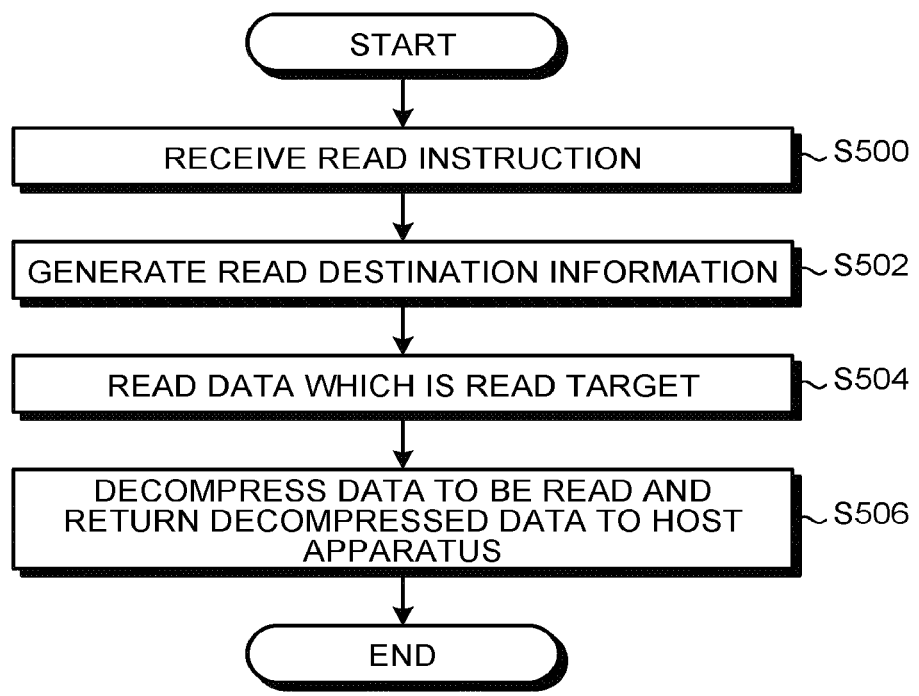
FIG. 15 is a flowchart illustrating an example of the procedure of a reading process according to the second embodiment.

Next, the procedure of the reading process performed by the data storage device 200 in response to a read instruction from the host apparatus (not illustrated) will be described with reference to FIG. 15. FIG. 15 is a flowchart illustrating an example of the procedure of the reading process performed by the data storage device 200.

(Reading Process)

In Step S500, the data storage device 200 receives a read instruction from, for example, an external host apparatus (not illustrated). Specifically, the interface unit 106 receives instructions including a write instruction and a read instruction from, for example, the host apparatus (not illustrated). The write instruction includes the data storage device address information and the write data. The read instruction includes the data storage device address information. The data storage device address information is address information which is provided from the data storage device 200 to the host apparatus (not illustrated).

For example, an LBA is an example of the data storage device address information of an HDD (Hard Disk Drive) or an SSD. The size of the data specified by LBA is set to, for example, 512 bytes. As described above, the size of the data specified by the data storage device address is generally different from the size of the data (cluster) specified by the logical address. However, the data storage device address and the logical address can be converted into each other. For example, when the data storage device address information is allocated for every 512 bytes and the logical address is allocated for every 1024 bytes, the quotient of the data storage device address information divided by 2 can be calculated to convert the data storage device address information into the logical address. In the second embodiment, for simplicity of explanation, an example in which the size of the data specified by the data storage device address is equal to the size of the cluster will be described. However, the invention is not limited thereto. The data storage device 200 may be configured such that the size of the data specified by the data storage device address is different from the size of the cluster.

When the received instruction is a read instruction, the interface unit 106 transmits the received read instruction to the read control unit 214.

In Step S502, the read control unit 214 generates read destination information. Specifically, when receiving the read instruction from the interface unit 106, the read control unit 214 extracts the data storage device address information from the received read instruction. Then, the read control unit 214 converts the extracted data storage device address information into a corresponding logical address. In addition, the read control unit 214 acquires information associated with the converted logical address. Specifically, the read control unit 214 instructs the first access unit 102 to read the physical address of the storage medium 251 and the information indicating how many times greater the size of the data is than the division size which are indicated by the converted logical address in the address mapping table 162. Then, the read control unit 214 acquires the physical address and the information indicating how many times greater the size of the data is than the division size. The read control unit 214 determines whether the cluster is stored across adjacent slots in the same pages or the pages on the basis of the information about the offset on a page and the information about the offset on a slot which are included in the acquired physical address and the acquired information indicating how many times greater the size of the data is than the division size. When the determination result is YES (the cluster is stored across adjacent slots in the same pages or the pages), the read control unit 214 generates information about consecutive read destination slots. The information about consecutive read destination slots includes the block number, the page number, and the information about the offset on a page. Here, the block number and numbers subsequent to the page number included in the acquired physical address are newly set as the block number and the page number included in the information about consecutive read destination pages.

When the cluster is stored across adjacent slots in the page, the block number and the page number included in the acquired physical address are set as the block number and the page number included in the information about consecutive read destination pages and consecutive information is set to the information about the offset on a page. In addition, when the cluster is stored across the pages, the block number included in the acquired physical address is set to the block number, consecutive numbers are set to the page numbers, and information indicating the position of the head is set to the information about the offset on a page.

In Step S504, the read control unit 214 reads data, which is a read target. Specifically, the read control unit 214 instructs the reading unit 212 to perform a reading process, using the acquired physical address and the acquired information indicating how many times greater the size of the data is than the division size as the read destination information and the converted logical address as the logical address of the cluster to be read. When the cluster to be read is stored across adjacent slots in the same page or the pages, the read control unit 214 adds the generated information items about consecutive read destination slots and transmits the added information to the reading unit 212. In addition, when the cluster set to be read is written to adjacent slots in the same page, the cluster, which is a read target, may be read from the storage medium 251 by one reading process since data is read from the storage medium 251 in the unit of the pages 402.

The reading unit 212 receives a cluster read request from the read request source. The cluster read request includes read destination information and data indicating the logical address of the cluster to be read. The read destination information includes the block number, the page number, the information about the offset on a page, the information about the offset on a slot, and the information indicating how many times greater the size of the data is than the division size. When the cluster to be read is stored across the slots or the pages, the reading unit 212 also receives information about consecutive read destination slots. The information about consecutive read destination slots includes the block number, the page number, and the information about the offset on a page.

The reading unit 212 extracts the block number and the page number from the acquired read destination information and instructs the storage medium access unit 101 to read the data of the page 402 with the extracted page number in the block 400 with the extracted block number, and acquires the data of the page. When the cluster to be read is stored across the slots or the pages, the reading unit 212 extracts the block number and the page number from the acquired information about consecutive read destination pages, instructs the storage medium access unit 101 to read the data of the pages 402 with the extracted page numbers in the block 400 with the extracted block number, and further acquires the data of the pages. In addition, when the cluster is stored across adjacent slots in the same page, the reading unit 212 can read the cluster from the storage medium 251 using one reading process since data is read from the storage medium 251 in the unit of the pages 402. Therefore, when the cluster is stored across adjacent slots in the same page, the reading unit 212 may read the cluster using only one reading process.

In addition, the reading unit 212 extracts the information about the offset on a page, the information about the offset on a slot, and the information indicating how many times greater than the size of the data is than the division size from the acquired read destination information. The reading unit 212 extracts the metadata of the slot, data with a size that is an integer multiple of the division size, and the error correction data of the data from the position indicated by the extracted information about the offset on a page, the extracted information about the offset on a slot, and the extracted information indicating how many times greater than the size of the data is than the division size among the data pieces of the acquired page. When the cluster to be read is stored across the slots or the pages, the reading unit extracts the remaining data for the cluster from the position of the head of the consecutive slots and adds the data pieces to generate data for the cluster.

In Step S506, the reading unit 212 decompresses the data to be read and returns the decompressed data to the host apparatus. Specifically, the reading unit 212 corrects the error of the extracted error correction target data using the extracted error correction data and acquires the error corrected data.

Specifically, the reading unit 212 uses data including the metadata of the slot and the data with a size that is an integer multiple of the division size as the basic data for generating the error correction data, among the extracted data pieces. In addition, the reading unit 212 performs error correction using the error correction data among the extracted data pieces and acquires the error corrected data.

When error correction fails (error correction is unavailable), the reading unit 212 notifies the read request source of the occurrence of a read error. When receiving a notice indicating the occurrence of the read error from the reading unit 212, the read control unit 214 transmits data indicating the read error to the interface unit 106. The first memory 252 may further store information indicating that the read error occurs when the logical address is read as one of the management information items. In this way, when a read request for the same logical address is issued again, it is possible to rapidly return the read error.

When receiving data (data indicating the read error) from the read control unit 214, the interface unit 106 transmits the received data (data indicating the read error) to the host apparatus (not illustrated). When error correction succeeds (error correction is available), the reading unit 212 extracts cluster data from the error corrected data. The reading unit 212 transmits the extracted cluster data to the decompression unit 105 and instructs the decompression unit 105 to decompress the extracted cluster data. The reading unit 212 acquires the decompressed cluster data.

For example, when the cluster data extracted from the error corrected data is not compressed, the reading unit 212 does not transmit the cluster data to the decompression unit 105. The reading unit 212 transmits the acquired decompressed cluster data to the read request source. When receiving the data read from the reading unit 212, the read control unit 214 transmits the received data to the interface unit 106. When receiving the data from the read control unit 114, the interface unit 106 transmits the received data to the host apparatus (not illustrated).

Figure 16:
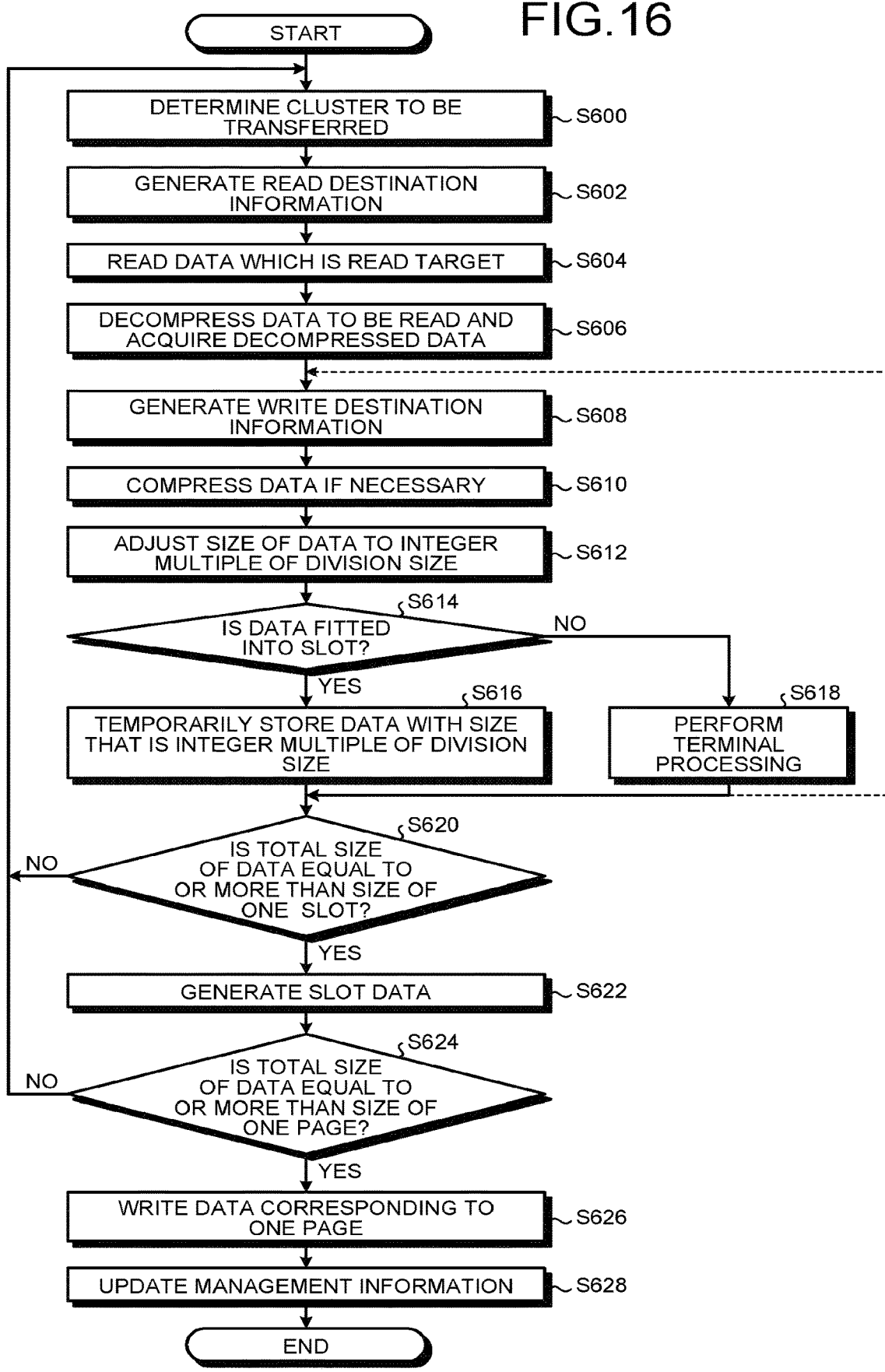
FIG. 16 is a flowchart illustrating an example of the procedure of a transfer process according to the second embodiment.

Next, the procedure of the transfer process performed by the data storage device 200 will be described with reference to FIG. 16. FIG. 16 is a flowchart illustrating an example of the procedure of the transfer process performed by the data storage device 200. The transfer control unit 215 controls the transfer process illustrated in FIG. 16 according to a predetermined rule.

(Transfer Process)

In Step S600, the transfer control unit 115 determines the cluster to be transferred. Specifically, the transfer control unit 215 instructs the first access unit 102 to read the management information from the first memory 252 and acquires the management information. The transfer control unit 215 determines the cluster to be transferred from the acquired management information using a predetermined method. In the second embodiment, any known method may be used to determine the cluster to be transferred. The transfer control unit 215 extracts the logical address of the determined cluster from the acquired management information.

In Step S602, the transfer control unit 215 generates read destination information. Specifically, the transfer control unit 215 acquires information associated with the extracted logical address. For example, the transfer control unit 215 instructs the first access unit 102 to read the physical address of the storage medium 251 and the information indicating how many times greater the size of the data is than the division size which are indicated by the extracted logical address in the address mapping table 162, and acquires the physical address and the information indicating how many times greater the size of the data is than the division size.

The transfer control unit 215 determines whether the cluster is stored across adjacent slots in the same page or the pages on the basis of the information about the offset on a page and the information about the offset on a slot included in the acquired physical address and the acquired information indicating how many times greater the size of the data is than the division size. When the determination result is YES (the cluster set stored across adjacent slots in the same page or the pages), the transfer control unit 215 generates information about consecutive read destination slots. Specifically, the information about consecutive read destination slots includes the block number, the page number, and the information about the offset on a page. When the cluster is stored across adjacent slots in the page, the block number included in the acquired physical address is set to the block number. The page number included in the acquired physical address is set to the page number.

Consecutive information is set to the information about the offset on a page. In addition, when the cluster is stored across the pages, the block number included in the acquired physical address is set to the block number. Consecutive numbers are set to the page numbers, and information indicating the position of the head is set to the information about the offset on a page.

In Step S604, the transfer control unit 215 reads data, which is a read target. Specifically, the transfer control unit 215 instructs the reading unit 212 to perform a reading process, using the acquired physical address and the acquired information indicating how many times greater the size of the data is than the division size as the read destination information and the converted logical address as the logical address of the cluster to be read.

When the cluster to be read is stored across adjacent slots in the same page or the pages, the transfer control unit 215 adds the generated information items about consecutive read destination slots and transmits the added information to the reading unit 212. When the cluster to be read is stored across adjacent slots in the same page, the cluster is read from the storage medium 251 by one reading process since data is read from the storage medium 251 in the unit of the pages 402. Therefore, when the cluster to be read is stored across adjacent slots in the same page, the cluster may be read by one reading process.

The reading unit 212 receives a cluster read request from the read request source. The cluster read request includes the read destination information and data indicating the logical address of the cluster to be read. The read destination information includes the block number, the page number, the information about the offset on a page, the information about the offset on a slot, and the information indicating how many times greater the size of the data is than the division size. When the cluster to be read is stored across the slots or the pages, the reading unit 212 also receives information about consecutive read destination slots. The information about consecutive read destination slots includes the block number, the page number, and the information about the offset on a page.

The reading unit 212 extracts the block number and the page number from the acquired read destination information, instructs the storage medium access unit 101 to read the data of the page 402 with the extracted page number in the block 400 with the extracted block number and acquires the data of the page. When the cluster to be read is stored across the slots or the pages, the reading unit 212 extracts the block number and the page number from the acquired information about consecutive read destination pages, instructs the storage medium access unit 101 to read the data of the pages 402 with the extracted page numbers in the block 400 with the extracted block number, and further acquires the data of the pages. When the cluster to be read is stored across adjacent slots in the same page, the reading unit 212 can read data from the storage medium 251 using one reading process since data is read from the storage medium 251 in the unit of the pages 402. Therefore, when the cluster is stored across adjacent slots in the same page, the reading unit 212 may perform one reading process to read data.

The reading unit 212 extracts the information about the offset on a page, the information about the offset on a slot, and the information indicating how many times greater the size of the data is than the division size from the acquired read destination information. The reading unit 212 extracts the metadata of the slot, data with a size that is an integer multiple of the division size, and the error correction data of the data from the position by the extracted information about the offset on a page, the extracted information about the offset on a slot, and the extracted information indicating how many times greater the size of the data is than the division size among the data pieces of the acquired page. When the cluster to be read is stored across the slots or the pages, the reading unit extracts the remaining data for the cluster from the position of the head of the consecutive slots and adds the data pieces to generate data for the cluster.

In Step S606, the transfer control unit 215 decompresses the read data and acquires the decompressed data. Specifically, the reading unit 212 corrects the error of the extracted error correction target data using the extracted error correction data and acquires the error corrected data. Specifically, the reading unit 212 uses data including the metadata of the slot and the data with a size that is an integer multiple of the division size as the basic data for generating the error correction data, among the extracted data pieces, and performs error correction using the error correction data among the extracted data pieces to acquire the error corrected data. When error correction fails (error correction is unavailable), the reading unit 212 notifies the read request source of the occurrence of a read error. When receiving a notice indicating the occurrence of the read error from the reading unit 212, the transfer control unit 215 performs a process of maintaining consistency such that an error occurs when the cluster is read after the transfer process. For example, the transfer control unit 215 may transfer the cluster data with the read error, without correcting the read error. In addition, the transfer control unit 215 may insert information indicating that the read error occurs when the logical address is read into the management information stored in the first memory 252 such that the cluster data with the read error is not transferred. When error correction succeeds (error correction is available), the reading unit 212 extracts the cluster data from the error corrected data. The reading unit 212 transmits the extracted cluster data to the decompression unit 105, instructs the decompression unit 105 to decompress the extracted cluster data, and acquires the decompressed cluster data.

For example, when the cluster data extracted from the error corrected data is not compressed, the reading unit 212 does not transmit the cluster data to the decompression unit 105. The reading unit 212 transmits the acquired decompressed cluster data to the read request source. The transfer control unit 215 receives the data read from the reading unit 212.

In Step S608, the transfer control unit 215 generates write destination information. Specifically, the transfer control unit 215 shifts the write destination information transmitted in the previous cluster write request for the writing unit 211 by the slot offset indicated by the information indicating how many times greater the size of the data is than the divides size which is returned from the writing unit 211 in the previous cluster write request for the writing unit 211, thereby generating the write destination information.

Specifically, the write destination information transmitted in the previous cluster write request for the writing unit 211 includes the block number of the write destination of the cluster, the page number, the information about the offset on a page, and the information about the offset on a slot. The transfer control unit 215 adds, to the information about the offset on a slot, the offset indicated by the information indicating how many times greater the size of the data is than the divides size which is returned from the writing unit 211 in the previous cluster write request for the writing unit 211, thereby generating the write destination information. In the previous cluster write request for the writing unit 211, when the next write destination information is given to the writing unit 211 (the cluster is stored across the slots or the pages), the transfer control unit 215 shifts the next write destination information by the remainder of the offset indicated by the information indicating how many times greater the size of the data is than the divides size.

Specifically, the next write destination information includes the block number of the write destination of the cluster, the page number, the information about the offset on a page, and the information about the off on the slot indicating the position of the head of the page. The writing unit 211 adds, to the information about the offset on a slot, the remainder of the offset indicated by the information indicating how many times greater the size of the data is than the divides size, thereby generating the write destination information.

In the data storage device 200, when the block 400 to which data which is requested to be written by the host apparatus is written is the same as the transfer destination block 400, the write control unit 213 and the transfer control unit 215 perform a process in cooperation with each other such that the generated write destination information items do not overlap each other. The transfer control unit 215 transmits the generated write destination information, the write data extracted as the cluster data to be written, and the logical address which is converted as the logical address of the cluster to be written to the writing unit 211 and instructs the writing unit 211 to perform a writing process.

The writing unit 211 receives a cluster write request from the transfer control unit 215. The cluster write request includes the write destination information, the cluster data to be written, and data indicating the logical address of the cluster to be written. The write destination information includes the block number of the write destination of the cluster, the page number, the information about the offset on a page, and the information about the offset on a slot.

In Step S610, the writing unit 211 compresses the cluster data using the compression unit 104 (if necessary). The cluster data compression process of the writing unit 211 is the same as that of the writing unit 111.

Specifically, the writing unit 211 extracts the cluster data to be written from the received cluster write request. The writing unit 211 transmits the extracted cluster data to be written to the compression unit 104 and instructs the compression unit 104 to compress the cluster data. Then, the writing unit 211 acquires the cluster data to be written which is compressed by the compression unit 104.

The writing unit 211 extracts data indicating the logical address of the cluster to be written from the received cluster write request and generates metadata including the extracted data indicating the logical address of the cluster to be written. When the metadata included in the cluster set is compressed, the writing unit 211 treats the compressed metadata the same as the metadata.

In Step S612, the writing unit 211 adjusts the size of the data to be equal to an integer multiple of the division size. Specifically, the writing unit 211 adjusts the size of the data obtained by adding the generated metadata and the acquired compressed cluster data to be equal to an integer multiple of the division size.

Specifically, when the size of data obtained by adding the metadata to be compressed and the compressed cluster data is equal to or less than an integer multiple of the division size, the writing unit 211 generates dummy data corresponding to the remainder of the area of the data obtained by adding the metadata of the cluster to be compressed and the compressed cluster data in the area with a size that is an integer multiple of the division size. The dummy data may have a predetermined value (for example, all zero) or a random value. In addition, the dummy data may be the error correction data which is generated on the basis of the data obtained by adding the metadata of the cluster to be compressed and the compressed cluster data. When the dummy data is the error correction data, it is possible to improve the reliability of the stored data.

Specifically, in the second embodiment, the cluster data is divided into four parts. Therefore, when the size of the data obtained by adding the metadata of the cluster to be compressed and the compressed cluster data is equal to or less than (one time) the division size, the dummy data is stored in the remainder of the area of the data obtained by adding the metadata of the cluster to be compressed and the compressed cluster data in the area with the division size (one time), as illustrated in FIG. 10A. In this way, the size of the data is an integer multiple of the division size.

Similarly, when the size of the data obtained by adding the metadata of the cluster to be compressed and the compressed cluster data is equal to or less than two times the division size, the size of the data is an integer multiple of the division size, as illustrated in FIG. 10B. When the size of the data obtained by adding the metadata of the cluster to be compressed and the compressed cluster data is equal to or less than three times the division size, the size of the data is an integer multiple of the division size, as illustrated in FIG. 10C. The size of the data is not limited to an integer multiple of the division size, but it may be other values. For example, the size of the data may be a multiple of 2.

When the size of the data obtained by adding the metadata of the cluster to be compressed and the compressed cluster data is equal to or less than four times the division size, that is, when the size of the data is equal to or less than the size of the cluster data which is not compressed, the size of the data may be set as follows. For example, as illustrated in FIG. 10D, the size of the data may be an integer multiple of the same division size as that illustrated in FIGS. 10A to 10C. In addition, the cluster data may be stored in a plurality of slots of the page 402 illustrated in FIG. 9, without being compressed.

The advantage of the structure in which the cluster data is compressed and stored and the size is an integer multiple of the division size is that the error correction data, which is generated on the basis of the data obtained by adding the metadata of the cluster to be compressed and the compressed cluster data, is dummy data and the reliability of the stored data is improved. In addition, only when the cluster is stored across adjacent slots in the same page or the physical addresses are consecutive in the range in which the units of management of the block 400 do not overlap each other (for example, in the same block 400), it is possible to store data across the pages. Therefore, according to the second embodiment, it is possible to improve the storage efficiency of the storage medium 251 and increase the lifespan of the data storage device 200.

The advantage of the structure in which the cluster data is stored without being compressed is that it is possible to reduce the time required for the compression process during, for example, the writing process or the time required for the decompression process during, for example, the reading process. The compressed cluster may be stored across adjacent slots in the same page illustrated in FIG. 11A, similarly to the structure in which the cluster is stored across the pages illustrated in FIG. 3B. In addition, as illustrated in FIG. 11B, only when the physical addresses are consecutive in the range in which the units of management of the block 400 do not overlap each other, the compressed cluster may be stored across the pages 402. In FIGS. 11A and 11B, for simplicity of explanation, the storage area of the metadata or the error correction data in the slot is not illustrated.

In Step S614, the writing unit 211 determines whether data with a size that is an integer multiple of the division size is fitted into the slot, which is a write destination. The writing unit 211 determines whether the sum of the information about the offset on a slot included in the write destination information and the size that is an integer multiple of the division size is fitted into the slot.

In Step S616, the second memory 153 temporarily stores the data with a size that is an integer multiple of the division size. Specifically, when the determination result in Step S614 is YES (the data is fitted into the slot, which is a write destination), the writing unit 211 instructs the second access unit 103 to perform a writing process such that the second memory 153 temporarily stores the data with a size that is an integer multiple of the division size. In addition, the writing unit 211 returns the information indicating how many times greater the data with a size that is an integer multiple of the division size is than the division size to the write request source. The transfer control unit 215 receives the information indicating how many times greater the data is than the division size from the writing unit 211.

In Step S618, the writing unit 211 and the transfer control unit 215 perform terminal processing. Specifically, when the determination result is NO (the data is not fitted into the slot, which is a write destination), the writing unit 211 returns a response indicating the overflow of the slot, which is a write destination, to the write request source. When the response indicating the overflow of the slot, which is a write destination, is received from the writing unit 211 and the cluster is stored across adjacent slots in the same page or the physical addresses are consecutive in the same management unit managing the block 400, the transfer control unit 215 gives the next write destination information to the writing unit 211. When receiving the next write destination information from the write request source, the writing unit 211 instructs the second access unit 103 to perform a writing process such that the second memory 153 temporarily stores the data with a size that is an integer multiple of the division size. In addition, the writing unit 211 returns the information indicating how many times greater the data with a size that is an integer multiple of the division size is than the division size to the write request source. The transfer control unit 215 receives the information indicating how many times greater the data is than the division size from the writing unit 211. Then, the transfer control unit 215 proceeds to Step S620.

When receiving a response indicating the overflow of the slot, which is a write destination, from the writing unit 211, the transfer control unit 215 may give a dummy data storage instruction to the writing unit 211. The transfer control unit 215 gives the dummy data storage instruction to the writing unit 211 when the cluster is not stored across adjacent slots in the same page or the physical addresses are not consecutive in the range in which the units of management of the block 400 do not overlap each other. When receiving the dummy data storage instruction from the write request source, the writing unit 211 generates dummy data corresponding to the size of the remaining area of the slot, which is a write destination. The writing unit 211 instructs the second access unit 103 to perform a writing process such that the second memory 153 temporarily stores the generated dummy data.

The writing unit 211 may generate the error correction data of the data with a size that is an integer multiple of the division size which is temporarily stored in the second memory 153, instead of the dummy data. The writing unit 211 may use the error correction data of the data with a size that is an integer multiple of the division size which is temporarily stored in the second memory 153 to improve the reliability of data. In addition, the writing unit 211 may appropriately change the order of the data with a size that is an integer multiple of the division size to reduce the amount of dummy data stored, thereby improving the usage efficiency of the storage medium 251.

When instructing the writing unit 211 to store the dummy data, the transfer control unit 215 ensures a new write destination slot in order to write the cluster data, which is a write target, and performs the writing process again.

In Step S620, the writing unit 211 determines whether the total size of the data temporarily stored in the second memory 153 is equal to or more than the size of one slot. When the total size of the data temporarily stored in the second memory 153 is not equal to or more than the size of one slot (No in Step S620), the writing unit 211 proceeds to Step S600. When the total size of the data temporarily stored in the second memory 153 is equal to or more than the size of one slot (Yes in Step S620), the writing unit 211 proceeds to Step S622.

In Step S622, the writing unit 211 generates slot data. Specifically, when data corresponding to one slot is obtained, the writing unit 211 generates data for a special value (magic number) indicating the arrangement pattern of the compressed and stored cluster as the metadata in the storage format of the slot. In addition, the writing unit 211 generates the error correction data in the storage format of the slot.

Specifically, for example, when the cluster data is divided into four parts, data which is a base for generating the first error correction data piece includes the metadata indicating the generated magic number and the first data piece, as illustrated in FIG. 9. Data which is a base for generating the second error correction data piece includes the metadata indicating the generated magic number and the second data piece. Data which is a base for generating the third error correction data piece includes the metadata indicating the generated magic number and the third data piece. Data which is a base for generating the fourth error correction data piece includes the metadata indicating the generated magic number and the fourth data piece.

The writing unit 211 instructs the second access unit 103 to perform a writing process such that the metadata indicating the generated magic number, the data with a size that is an integer multiple of the division size which is temporarily stored in the second memory 153, and the generated error correction data are temporarily stored as data of the slot. In addition, for example, when there is no necessity to compress data since the data size is not reduced by compression, the writing unit 211 may store the extracted cluster data to be written in a plurality of slots of the page 402 without transmitting the cluster data to the compression unit 104.

In Step S624, the transfer control unit 215 determines whether the total size of the data temporarily stored in the second memory 153 is equal to or more than the size of one page. When the total size of the data temporarily stored in the second memory 153 is not equal to or more than the size of the page 402 (No in Step S624), the writing unit 211 proceeds to Step S600. When the total size of the data temporarily stored in the second memory 153 is equal to or more than the size of the page 402 (Yes in Step S624), the writing unit 211 proceeds to Step S626. The transfer control unit 215 repeats the above-mentioned process from Step S600 until the write request for the writing unit 211 corresponds to at least one page as a result of the compression of the write data. The reason is as follows. Since the unit of input and output for the storage medium 251 is the page 402, the transfer control unit 215 needs to write data corresponding to at least one page in order to perform a process of updating the management information, which will be described. Therefore, the transfer process is not completed.

In Step S626, the writing unit 211 writes data corresponding to one page to the storage medium 251 through the storage medium access unit 101. Specifically, when the total size of the data temporarily stored in the second memory 153 is equal to or more than the size of the page 402, the writing unit 211 instructs the second access unit 103 to read data corresponding to the page size among the data pieces temporarily stored in the second memory 153, and acquires the data corresponding to the page size. Here, the writing unit 211 instructs the storage medium access unit 101 to write the block number of the write destination of the cluster and the page number which are included in the write destination information received from the write request source as the page, which is a write destination.

In Step S628, the transfer control unit 215 updates the management information. Specifically, the writing unit notifies the write request source that the writing of data to the write destination page has been completed. When receiving the write completion notice from the writing unit 211, the transfer control unit 215 updates the address mapping table 162 for the cluster written to the page. The transfer control unit 215 instructs the first access unit 102 to perform a writing process such that the physical address of the storage medium 251 indicated by the extracted logical address in the address mapping table 162 is updated to the physical address of the storage medium 251, which is a write destination, for the cluster written to the page. In addition, the transfer control unit 215 instructs the first access unit 102 to write the information indicating how many times greater the size of the data is than the division size which is acquired from the writing unit 211 to the address mapping table 162 for the cluster written to the page.

As such, according to the second embodiment, it is possible to adjust the size of the cluster set written to the page 402 to a predetermined unit. Therefore, the storage efficiency of the storage medium 251 is reduced a little, but it is possible to reduce the number of processes required to manage data, as compared to the first embodiment.

(Third Embodiment)

Next, a third embodiment will be described. In the third embodiment, the size of the address mapping table is reduced and memory capacity required for the address mapping table is reduced, as compared to the first and second embodiments. The third embodiment is a modification of the second embodiment, but may be a modification of the first embodiment.

In a controller of a data storage device according to the third embodiment, in addition to the controller of the data storage device according to the second embodiment, the storage medium includes a block including the plurality of pages. The write control unit makes a control that writes the piece of cluster data together with metadata including the logical address and information for specifying at least the block as the physical address of the write destination into the storage unit. The read control unit makes a control that reads the pieces of cluster data stored at the physical address acquired from the storage unit, extracts metadata which is written together with the read pieces of cluster data, compares the logical address included in the extracted metadata with the logical address of data which is requested to be read, and reads the pieces of cluster data with the identical logical address. The transfer control unit makes control that determines pieces of cluster data to be transferred among the pieces of cluster data written into the storage medium according to a predetermined rule, acquires the physical address corresponding to the determined pieces of cluster data from the storage unit, reads the pieces of cluster data stored at the acquired physical address, extracts metadata which is written together with the read pieces of cluster data, compares the logical address included in the extracted metadata with the logical address of the determined pieces of cluster data, and reads the pieces of cluster data with the identical logical address. The transfer control unit makes a control that writes the pieces of cluster data together with the metadata including the logical address into the storage medium, and writes information for specifying at least the block as the physical address of the transfer destination into the storage unit.

In the controller of the data storage device according to the third embodiment, the read control unit sequentially compares the logical address from the last piece of cluster data in a storing order of the pieces of cluster data. The transfer control unit sequentially compares the logical address from the last piece of cluster data in the storing order of the pieces of cluster data.

Hereinafter, a detailed example will be described. First, the structure of the data storage device according to the third embodiment will be described. In the third embodiment, components having the same functions as those in the second embodiment are denoted by the same reference numerals as those in the second embodiment. For example, the third embodiment differs from the second embodiment in that a read/write target is not the first memory 252, but is a first memory 352. The other components have the same functions as those in the components according to the second embodiment and are denoted by the same reference numerals as those in the second embodiment.

Figure 17:
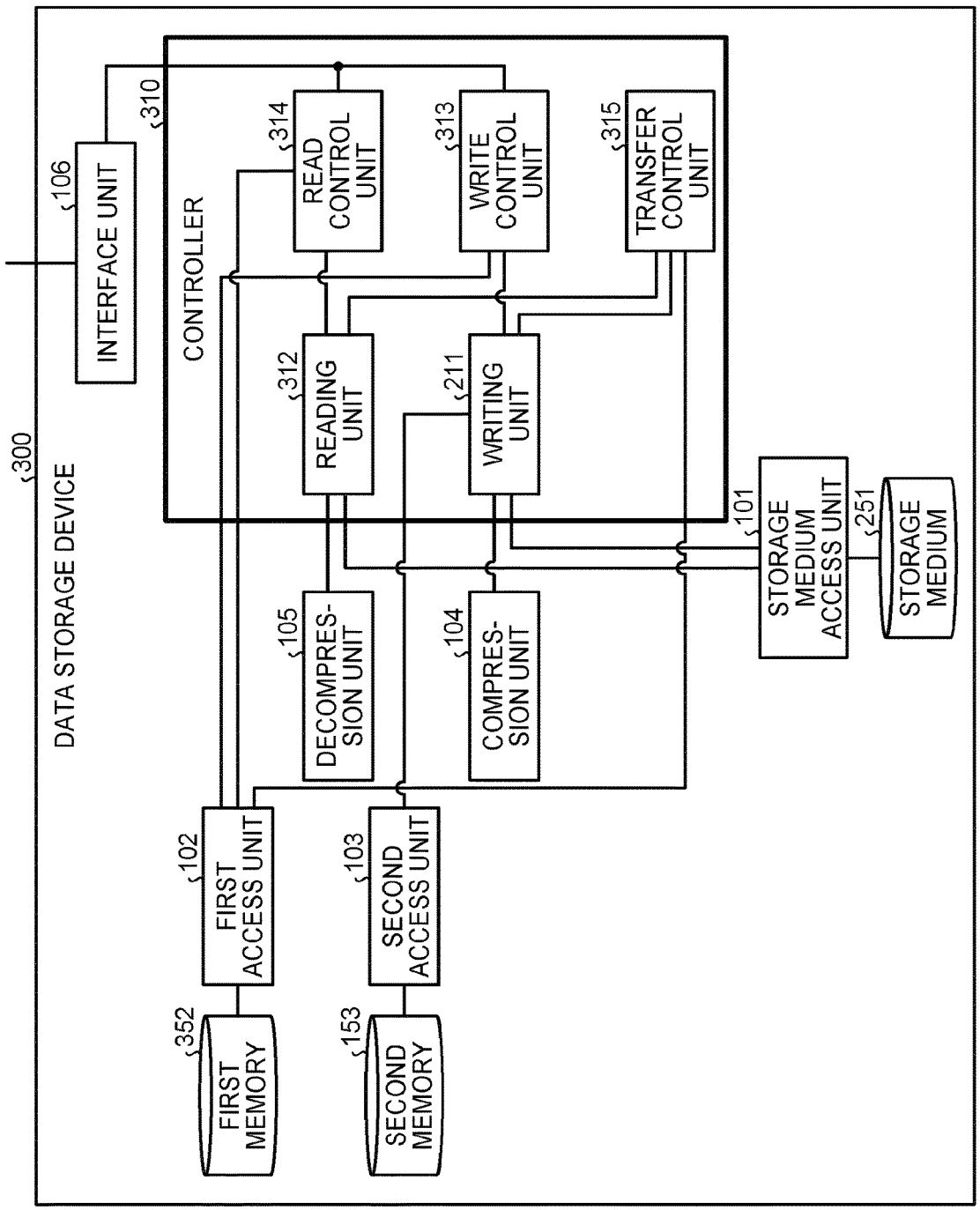
FIG. 17 is a block diagram illustrating an example of the structure of a data storage device according to a third embodiment.

FIG. 17 is a block diagram illustrating an example of the outline of the functional structure of a data storage device 300 according to the third embodiment. As illustrated in FIG. 17, the data storage device 300 includes a controller 310, the first access unit 102, the first memory 352, the second access unit 103, the second memory 153, the storage medium access unit 101, the storage medium 251, the interface unit 106, the compression unit 104, and the decompression unit 105.

(First Memory 352)

The first memory 352 stores management information. The management information includes an address mapping table 164. In addition, the first memory 352 may be configured so as to store information derived from the information of the address mapping table 164 in advance in order to simplify various processes performed by the data storage device 300.

Figure 18A:
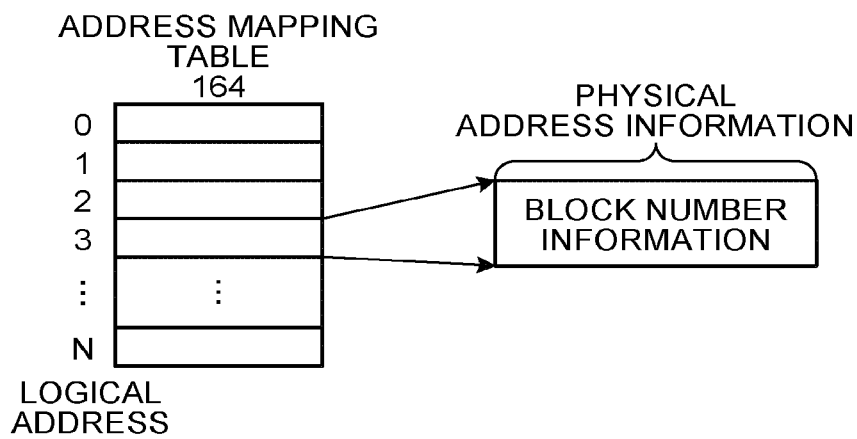
FIGS. 18A and 18B are schematic diagrams illustrating an address mapping table according to the third embodiment.

The address mapping table 164 manages the association between the logical address of a cluster and the physical address of the storage medium 251 in which data for the logical address is stored. When information about the managed logical address is minimized, the address mapping table 164 may manage only information indicating a block 400. For example, the address mapping table 162 manages, as the physical address of the storage medium 251, a set of block number information, page number information, information about a slot offset on a page, and information about an offset on a slot. In contrast, as illustrated in FIG. 18A, when the amount of information about the managed physical address is minimized, the address mapping table 164 may manage the block number information.

Figure 18B:
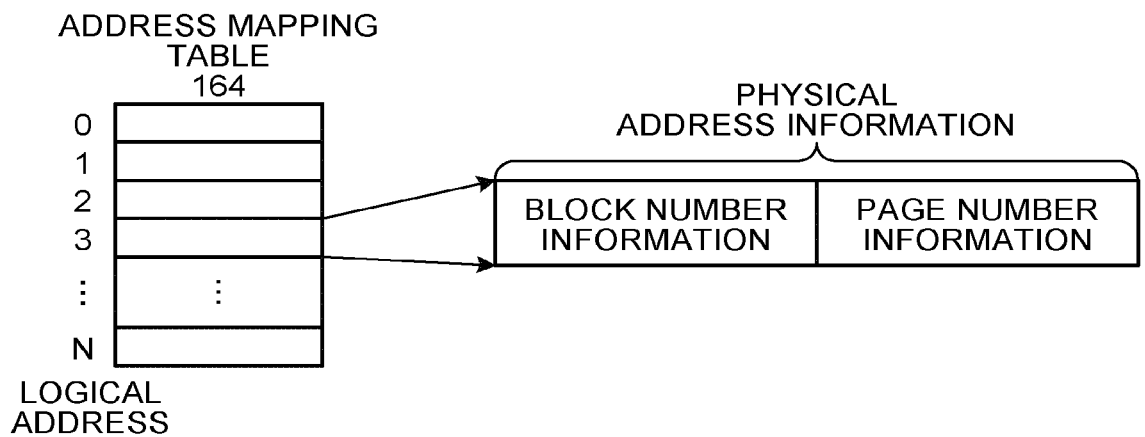

When the amount of information managed by the address mapping table 164 increases, the amount of cluster data (which will be described below) which is read and written is reduced. When the amount of information managed by the address mapping table 164 is reduced, the amount of cluster data (which will be described below) which is read and written increases. Next, in the third embodiment, a structure in which the address mapping table 164 manages a set of the block number information and the page number information as illustrated in FIG. 18B will be described. However, the structure of the address mapping table 164 is not limited to that illustrated in FIG. 18B, but may be other structures. In the third embodiment, the address mapping table 164 does not store the information indicating how many times greater the size of the data is than the division size which is stored in the address mapping table 162, in order to reduce the amount (size) of information.

(Controller 310)

The controller 310 includes a writing unit 211, a reading unit 312, a write control unit 313, a read control unit 314, and a transfer control unit 315.

(Reading Unit 312)

The reading unit 312 receives a cluster read request from a read request source. The cluster read request includes read destination information and data indicating the logical address of the cluster to be read. The read destination information includes a block number and a page number. The reading unit 312 extracts the block number and the page number from the acquired read destination information and instructs the storage medium access unit 101 to read the data of the page 402 with the extracted page number in the block 400 with the extracted block number, and acquires the data of the page. The page 402 stores a plurality of slots, but the number of slots stored in the page 402 may be changed. The unit of data input and output for the storage medium 251 is the page 402. Therefore, as described above, even when all data of the page is read, no new process occurs in the reading process.

The reading unit 312 corrects the error of slot data included in the acquired data of the page and acquires the error corrected slot data. When error correction fails (error correction is unavailable), the reading unit 312 notifies the read request source of the occurrence of a read error. When error correction succeeds (error correction is available), the reading unit 312 extracts the metadata of each slot from the error corrected data. The reading unit 312 calculates the arrangement pattern of the clusters stored in each slot from the magic number included in the extracted metadata of each slot. When the magic number indicating that the cluster is compressed and stored in the slot is not included in the extracted metadata of each slot, the reading unit 312 determines that the cluster is stored in the slot without being compressed. In addition, the reading unit 312 extracts the metadata of each cluster from the error corrected data according to the calculated arrangement pattern of the clusters. When the metadata of the compressed and stored cluster is stored without being compressed, the reading unit 312 directly extracts the metadata from the error corrected data. When the metadata of the compressed and stored cluster is compressed and stored, the reading unit 312 instructs the decompression unit 105 to decompress the error corrected data and acquires the metadata.

Figure 19:
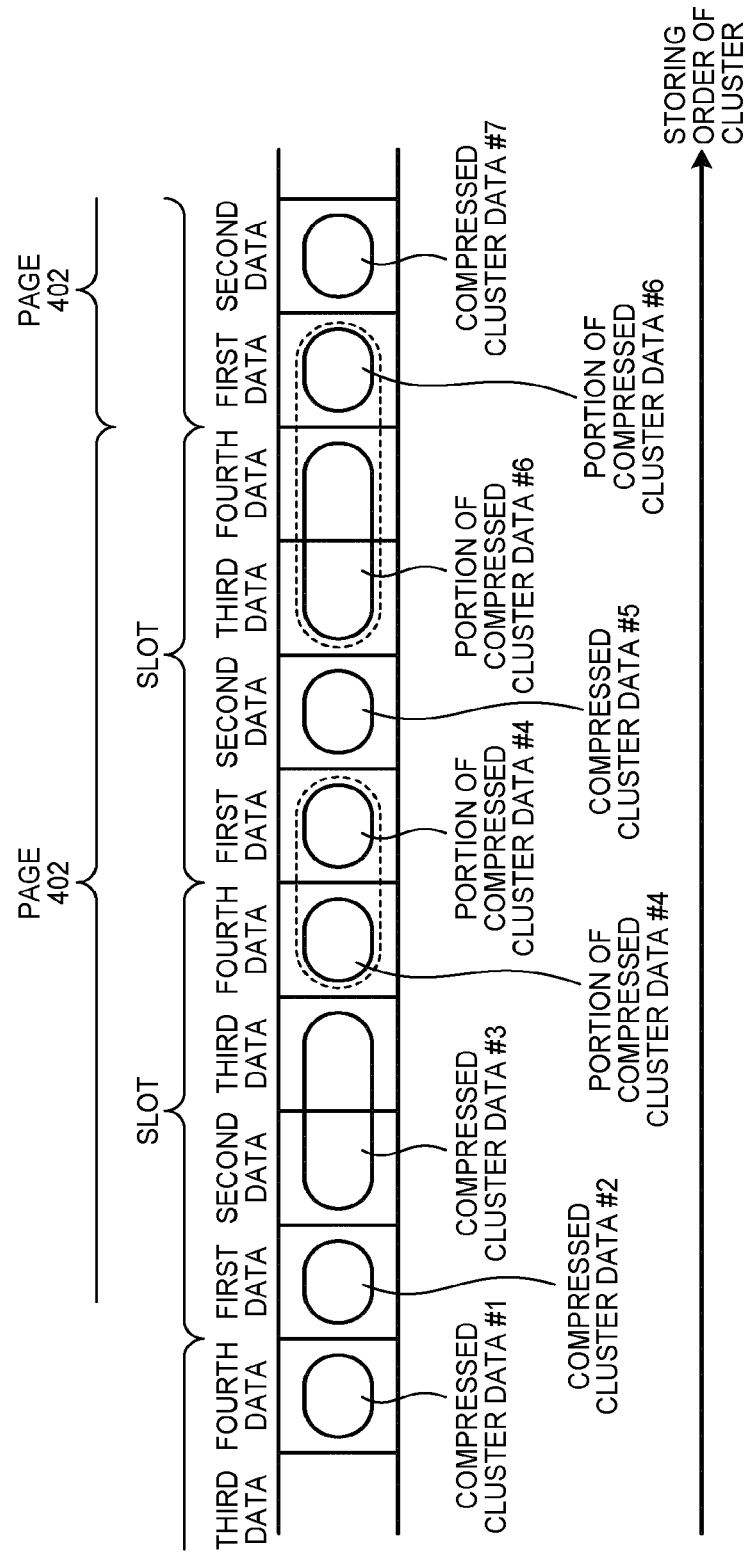
FIG. 19 is a schematic diagram illustrating the state of a cluster stored at the end of a slot.

As illustrated in FIG. 19, the cluster stored at the end of the slot is a portion of or the entire compressed cluster according to storage conditions. Therefore, it is necessary to determine whether the cluster is a portion of or the entire compressed cluster. The reading unit 312 may decompress the cluster to perform the determination. Specifically, the reading unit 312 instructs the decompression unit 105 to decompress the cluster stored at the end of the slot. When decompression succeeds and cluster data corresponding to the size of the cluster is obtained by the decompression, it may be determined that the cluster is the entire compressed cluster. On the other hand, when decompression fails or cluster data which does not correspond to the size of the cluster is obtained by the decompression, the reading unit 312 determines that the cluster is a portion of the compressed cluster. In FIG. 19, for simplicity of explanation, the storage area of the metadata or the error correction data in the slot is not illustrated.

When it is determined that the first cluster which is stored first in the page 402 is the entire compressed cluster, the reading unit 312 extracts the metadata of the cluster. On the other hand, when it is determined that the first cluster which is stored first in the page 402 is a portion of the compressed cluster (compressed cluster data #6 when the right page of FIG. 19 is a read target page), the reading unit 312 does not extract the metadata of the cluster. The reason is as follows. The physical address of the consecutive page immediately before the cluster is written to the address mapping table 164. Therefore, when there is a request to read the cluster, the reading unit 312 is requested to read the consecutive page immediately before the cluster.

When it is determined that each of the clusters stored at adjacent ends of adjacent slot in the page is a portion of the compressed cluster as in compressed cluster data #4 illustrated in FIG. 19, the clusters are added to form the entire compressed cluster. Therefore, the reading unit 312 extracts the metadata of the entire compressed cluster. When it is determined that each of the clusters stored at adjacent ends of adjacent slot in the page is the entire compressed cluster as in compressed cluster data #1 and #2 illustrated in FIG. 19, the reading unit 312 extracts the metadata of each cluster.

When it is determined that the last cluster which is stored last in the page 402 is a portion of the compressed cluster as in compressed cluster data #6 in the left page, which is a read target page, illustrated in FIG. 19, the last cluster is added to the first cluster which is stored first in the next page 402 with a consecutive physical address to form the entire cluster data. Therefore, the reading unit 312 acquires data stored in the next consecutive page 402 using the same process as that up to the error correction process, adds the last cluster and the first cluster which is stored first in the next page 402 with a consecutive physical address, and extracts the entire cluster data. In addition, the reading unit 312 extracts the metadata of the entire cluster data. On the other hand, when it is determined that the last cluster which is stored last in the page 402 is the entire compressed cluster, the reading unit 312 extracts the metadata of the cluster. The reading unit 312 extracts the logical address of the cluster to be read which is included in the received read request. The reading unit 312 extracts the logical address included in the extracted metadata of each cluster. The reading unit 312 compares the extracted logical address of the cluster to be read with the extracted logical address included in the metadata of each cluster and determines the cluster with the identical logical address to be the cluster to be read.

When there are a plurality of clusters with the same logical address, the reading unit determines the last cluster in the page 402 among the plurality of clusters to be the cluster to be read. Therefore, the reading unit sequentially compares the logical addresses from the last cluster in the page 402, which makes it possible to reduce the time required for comparison.

The reading unit 312 transmits the cluster data which has been determined to be the cluster to be read to the decompression unit 105, instructs the decompression unit 105 to decompress the cluster data, and acquires the decompressed cluster data. In some cases, the reading unit 312 does not transmit the cluster data which has been determined to be the cluster to be read to the decompression unit 105, if necessary. In this case, the reading unit 312 replaces the decompressed cluster data in the subsequent process with the cluster data to be read which is not transmitted to the decompression unit 105. For example, when the cluster data is stored in the storage medium 251 without being compressed, the reading unit 312 does not transmit the cluster data to the decompression unit 105. The reading unit 312 transmits the acquired cluster data to the read request source.

(Write Control Unit 313)

The write control unit 313 performs processes other than the following processes, similarly to the write control unit 213.

When receiving a write completion notice from the writing unit 211, the write control unit 313 updates the address mapping table 164 for the cluster written to the page. Specifically, the write control unit 313 instructs the first access unit 102 to perform a writing process such that the physical address of the storage medium 251 indicated by the converted logical address in the address mapping table 164 is updated to the physical address of the storage medium 251, which is a write destination, for the cluster written to the page. However, the physical address to be updated of the storage medium 251, which a write destination, includes the block number information and the page number information included in the generated write destination information. When the first cluster which is stored first in the page 402 is a portion of the compressed cluster data (corresponding to compressed cluster data #6 when the right page of FIG. 19 is the page to which the writing of data has been completed), the write control unit 313 does not update the address mapping table 164 for the cluster. This is because the physical address of the previous consecutive page is written to the address mapping table 164 for the cluster. In addition, unlike the write control unit 213, the write control unit 313 instructs the first access unit 102 to write the information indicating how many times greater the size of the data is than the division size which is acquired from the writing unit 211 to the address mapping table 164 for the cluster written to the page.

(Read Control Unit 314)

When receiving a read instruction from the interface unit 106, the read control unit 314 extracts data storage device address information from the received read instruction. The read control unit 314 converts the extracted data storage device address information to a corresponding logical address. The read control unit 314 acquires information associated with the converted logical address. Specifically, the read control unit 314 instructs the first access unit 102 to read the physical address of the storage medium 251 indicated by the converted logical address in the address mapping table 164, and acquires information about the physical address. The physical address includes the block number information and the page number information.

The read control unit 314 instructs the reading unit 312 to perform a reading process, using the acquired physical address as the read destination information and the converted logical address as the logical address of the cluster to be read. When receiving a notice indicating the occurrence of the read error from the reading unit 312, the read control unit 314 transmits data indicating the read error to the interface unit 106. The first memory 352 may further store information indicating that the read error occurs when the logical address is read as one of the management information items. In this way, when a read request is issued for the same logical address again, it is possible to rapidly return the read error. When receiving the data read from the reading unit 312, the read control unit 314 transmits the received data to the interface unit 106.

(Transfer Control Unit 315)

The transfer control unit 315 controls the following transfer process according to a predetermined rule. First, the transfer control unit 315 determines the cluster to be transferred. Specifically, the transfer control unit 315 instructs the first access unit 102 to read the management information from the first memory 352 and acquires the management information. The transfer control unit 315 determines the cluster to be transferred from the acquired management information according to a predetermined rule. The cluster to be transferred may be determined according to any known rule. The transfer control unit 315 extracts the logical address of the determined cluster from the acquired management information.

Then, the transfer control unit 315 reads the cluster to be transferred. Specifically, the transfer control unit 315 acquires information associated with the extracted logical address. The transfer control unit 315 instructs the first access unit 102 to read the physical address of the storage medium 251 indicated by the converted logical address in the address mapping table 164, and acquires information indicating the physical address. The physical address includes the block number information and the page number information.

The transfer control unit 315 instructs the reading unit 312 to perform a reading process, using the acquired physical address as the read destination information and the converted logical address as the logical address of the cluster to be read. When receiving a notice indicating the occurrence of the read error from the reading unit 312, the transfer control unit 315 performs a process of maintaining consistency such that an error occurs when the cluster is read after the transfer process. For example, the transfer control unit 315 may transfer cluster data with the read error, without correcting the read error. In addition, the transfer control unit 315 may insert information indicating that the read error occurs when the logical address is read into the management information stored in the first memory 352 such that the cluster data with the read error is not transferred. The transfer control unit 315 receives the data read from the reading unit 312.

The transfer control unit 315 writes the cluster to be transferred. The process of writing the cluster to be transferred in the transfer control unit 315 is the same as that in the transfer control unit 215. The transfer control unit 315 repeatedly performs the above-mentioned process until a write request for the writing unit 211 corresponds to at least one page. The reason is as follows. Since the unit of input and output for the storage medium 251 is the page 402, the transfer control unit 315 needs to write data corresponding to at least one page in order to perform a process of updating the management information, which will be described. Therefore, the transfer process is not completed.

The transfer control unit 315 updates the management information about the transferred cluster. Specifically, when receiving the write completion notice from the writing unit 211, the transfer control unit 315 updates the address mapping table 164 for the cluster written to the page. The transfer control unit 315 instructs the first access unit 102 to perform a writing process such that the physical address of the storage medium 251 indicated by the converted logical address in the address mapping table 164 is updated to the physical address of the storage medium 251, which is a write destination, for the cluster written to the page. However, the physical address to be updated of the storage medium 251, which a write destination, includes the block number information and the page number information included in the generated write destination information. When the first cluster which is stored first in the page 402 is a portion of the compressed cluster data (corresponding to compressed cluster data #6 when the right page of FIG. 19 is the page to which the writing of data has been completed), the transfer control unit 315 does not update the address mapping table 164 for the cluster. This is because the physical address of the previous consecutive page is registered in the address mapping table 164 for the cluster. The transfer control unit 315 repeatedly performs the above-mentioned process according to a predetermined rule, if necessary.

Figure 20:
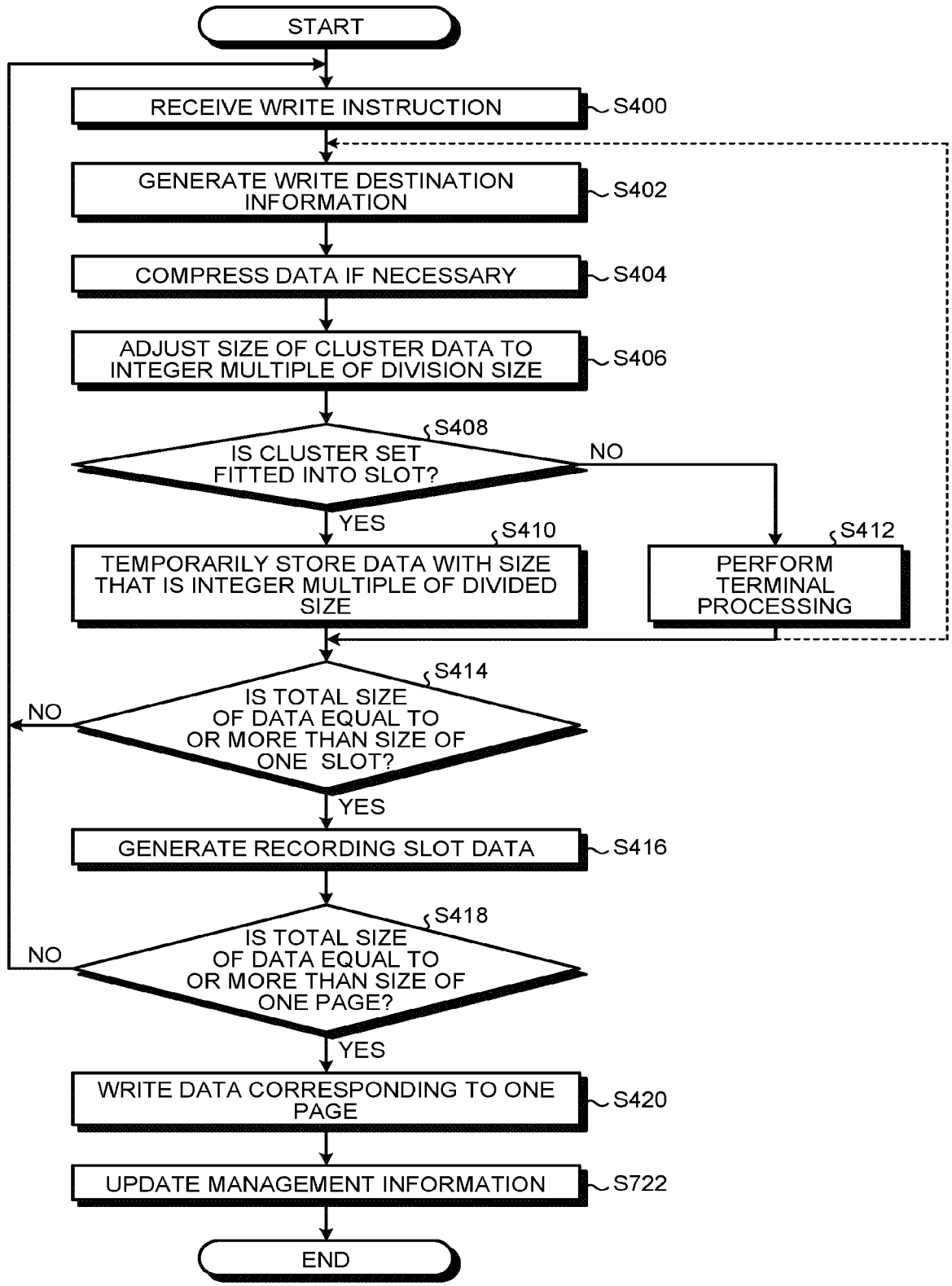
FIG. 20 is a flowchart illustrating an example of the procedure of a writing process according to the third embodiment.

Next, the operation of the data storage device 300 according to the third embodiment will be described. First, the procedure of the writing process performed by the data storage device 300 in response to a write instruction from the host apparatus (not illustrated) will be described with reference to FIG. 20. FIG. 20 is a flowchart illustrating an example of the procedure of the writing process performed by the data storage device 300. In the flowchart illustrated in FIG. 20, the write control unit 313 is used instead of the write control unit 213, as compared to the flowchart illustrated in FIG. 14. However, in the flowchart illustrated in FIG. 20, processes which are substantially the same as those illustrated in FIG. 14 are denoted by the same reference numerals as those in FIG. 14.

(Writing Process)

In Step S722, the write control unit 313 updates the management information. Specifically, the writing unit 211 transmits a notice indicating that the writing of data to the write destination page has been completed to the write request source. When receiving the write completion notice from the writing unit 211, the write control unit 313 updates the address mapping table 164 for the cluster written to the page. The write control unit 313 instructs the first access unit 102 to perform a writing process such that the physical address of the storage medium 251 indicated by the converted logical address in the address mapping table 164 is updated to the physical address of the storage medium 251, which is a write destination, for the cluster written to the page. However, the physical address to be updated of the storage medium 251, which is a write destination, includes the block number information and the page number information included in the generated write destination information. When the first cluster which is stored first in the page 402 is a portion of the compressed cluster data (corresponding to compressed cluster data #6 when the right page of FIG. 19 is the page to which the writing of data has been completed), the write control unit 313 does not update the address mapping table 164 for the cluster. This is because the physical address of the previous consecutive page is registered in the address mapping table 164 for the cluster.

Figure 21:
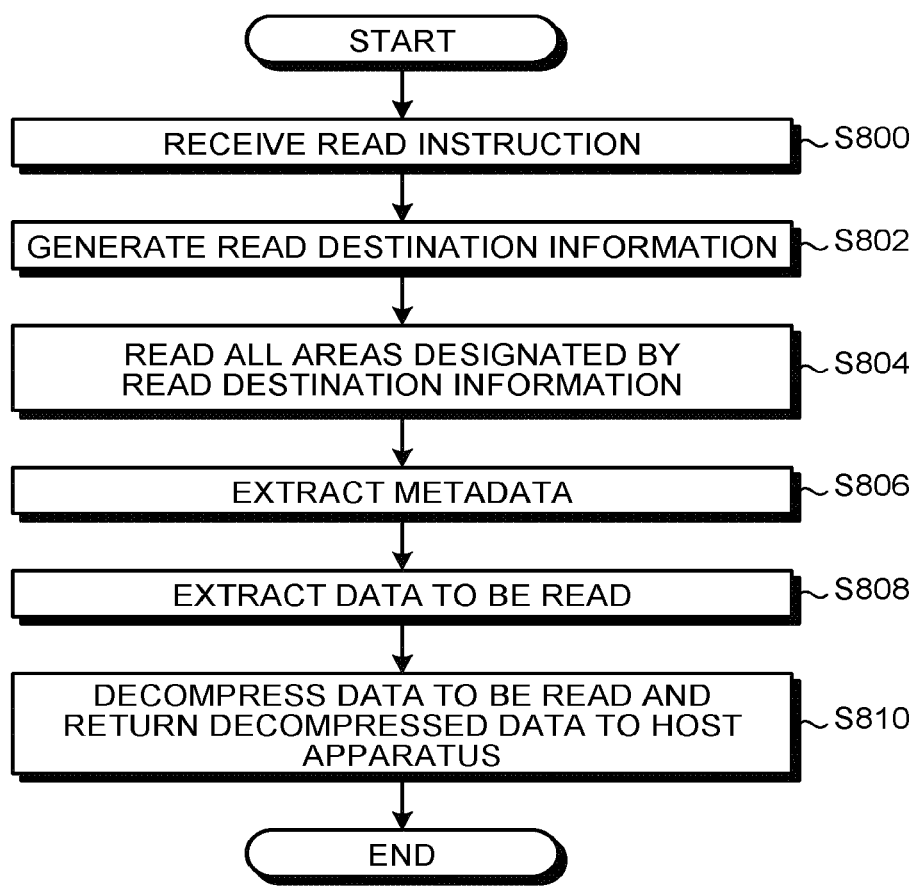
FIG. 21 is a flowchart illustrating an example of the procedure of a reading process according to the third embodiment.

Next, the procedure of the reading process performed by the data storage device 300 in response to a read instruction from the host apparatus (not illustrated) will be described with reference to FIG. 21. FIG. 21 is a flowchart illustrating an example of the procedure of the reading process performed by the data storage device 300.

(Reading Process)

In Step S800, the data storage device 300 receives a read instruction. Specifically, the interface unit 106 receives instructions including a write instruction and a read instruction from, for example, the host apparatus (not illustrated). The write instruction includes data storage device address information and the write data. The read instruction includes the data storage device address information.

The data storage device address information is provided from the data storage device 300 to the host apparatus (not illustrated).

For example, an LBA is an example of the data storage device address information of an HDD (Hard Disk Drive) or an SSD. The size of the data specified by LBA is set to, for example, 512 bytes. As described above, the size of the data specified by the data storage device address is generally different from the size of the data (cluster) specified by the logical address. However, the data storage device address and the logical address can be converted into each other. For example, when the data storage device address information is allocated for every 512 bytes and the logical address is allocated for every 1024 bytes, the quotient of the data storage device address information divided by 2 can be calculated to convert the data storage device address information into the logical address.

In the third embodiment, for simplicity of explanation, an example in which the size of the data specified by the data storage device address is equal to the size of the cluster will be described. However, the invention is not limited thereto. The data storage device 300 may be configured such that the size of the data specified by the data storage device address is different from the size of the cluster.

When the received instruction is a read instruction, the interface unit 106 transmits the received read instruction to the read control unit 314.

In Step S802, the read control unit 314 generates read destination information. Specifically, when receiving the read instruction from the interface unit 106, the read control unit 314 extracts the data storage device address information from the received read instruction. Then, the read control unit 314 converts the extracted data storage device address information into a corresponding logical address. The read control unit 314 acquires information associated with the converted logical address. The read control unit 314 instructs the first access unit 102 to read the physical address of the storage medium 251 indicated by the converted logical address in the address mapping table 164, and acquires information indicating the physical address. The physical address includes the block number information and the page number information.

In Step S804, the read control unit 314 reads all of the areas designated by the read destination information. Specifically, the read control unit 314 instructs the reading unit 312 to perform a reading process, using the acquired physical address as the read destination information and the converted logical address as the logical address of the cluster to be read. The reading unit 312 receives a cluster read request from the read request source. The cluster read request includes the read destination information and data indicating the logical address of the cluster to be read. The read destination information includes the block number and the page number. The reading unit 312 extracts the block number and the page number from the acquired read destination information, instructs the storage medium access unit 101 to read the data of the page 402 with the extracted page number in the block 400 with the extracted block number, and acquires the data of the page.

The page 402 stores a plurality of slots, but the number of slots stored in the page 402 may be changed. The unit of data input and output for the storage medium 251 is the page 402. Therefore, even when all data of the page is read, no new process is needed.

In Step S806, the read control unit 314 extracts the metadata. Specifically, the reading unit 312 corrects the error of slot data included in the acquired data of the page and acquires the error corrected slot data. When error correction fails (error correction is unavailable), the reading unit 312 notifies the read request source of the occurrence of a read error. When receiving a notice indicating the occurrence of the read error from the reading unit 312, the read control unit 314 transmits data indicating the read error to the interface unit 106. When reading the logical address, the first memory 352 may further store information indicating that the read error occurs when the logical address is read as one of the management information items. In this way, when a read request is issued for the same logical address again, it is possible to rapidly return the read error.

When receiving the data (data indicating the read error) from the read control unit 114, the interface unit 106 transmits the received data to the host apparatus (not illustrated). When error correction succeeds (error correction is available), the reading unit 312 extracts the metadata of each slot from the error corrected data. The reading unit 312 calculates the arrangement pattern of the clusters stored in each slot from the magic number included in the extracted metadata of each slot. When the magic number indicating that the cluster is compressed and stored in the slot is not included in the extracted metadata of each slot, the reading unit 312 determines that the cluster is stored in the slot without being compressed. In addition, the reading unit 312 extracts the metadata of each cluster from the error corrected data according to the calculated arrangement pattern of the clusters. When the metadata of the compressed and stored cluster is stored without being compressed, the reading unit 312 may directly extract the metadata from the error corrected data. On the other hand, when the metadata of the compressed and stored cluster is compressed and stored, the reading unit 312 can instruct the decompression unit 105 to decompress the error corrected data and acquire the metadata.

As illustrated in FIG. 19, the cluster stored at the end of the slot is a portion of or the entire compressed cluster according to storage conditions. Therefore, it is necessary to determine whether the cluster is a portion of or the entire compressed cluster. The reading unit 312 may decompress the cluster to perform the determination. Specifically, the reading unit 312 instructs the decompression unit 105 to decompress the cluster stored at the end of the slot. When decompression succeeds and cluster data corresponding to the size of the cluster is obtained by the decompression, the read control unit 314 can determine that the cluster is the entire compressed cluster. On the other hand, when decompression fails or cluster data which does not correspond to the size of the cluster is obtained by the decompression, it is possible to determine that the cluster is a portion of the compressed cluster. In FIG. 19, for simplicity of explanation, the storage area of the metadata or the error correction data in the slot is not illustrated.

When it is determined that the first cluster which is stored first in the page 402 is the entire compressed cluster, the reading unit 312 extracts the metadata of the cluster. On the other hand, when it is determined that the first cluster which is stored first in the page 402 is a portion of the compressed cluster (compressed cluster data #6 when the right page of FIG. 19 is a read target page), the reading unit 312 does not extract the metadata of the cluster. The reason is as follows. The physical address of the consecutive page immediately before the cluster is registered in the address mapping table 164. Therefore, when there is a request to read the cluster, the reading unit 312 is requested to read the consecutive page immediately before the cluster.

When it is determined that each of the clusters stored at adjacent ends of adjacent slot in the page is a portion of the compressed cluster as in compressed cluster data #4 illustrated in FIG. 19, the clusters are added to form the entire compressed cluster. Therefore, the reading unit 312 extracts the metadata of the entire compressed cluster. When it is determined that each of the clusters stored at adjacent ends of adjacent slot in the page is the entire compressed cluster as in compressed cluster data #1 and #2 illustrated in FIG. 19, the reading unit 312 extracts the metadata of each cluster.

When it is determined that the last cluster which is stored last in the page 402 is a portion of the compressed cluster as in compressed cluster data #6 in the left page, which is a read target page, illustrated in FIG. 19, the last cluster is added to the first cluster which is stored first in the next page 402 with a consecutive physical address to form the entire cluster data. Therefore, the reading unit 312 acquires data stored in the next consecutive page 402 using the same process as that up to the error correction process, adds the last cluster and the first cluster which is stored first in the next page 402 with a consecutive physical address, and extracts the entire cluster data. In addition, the reading unit 312 extracts the metadata of the entire cluster data. On the other hand, when it is determined that the last cluster which is stored last in the page 402 is the entire compressed cluster, the reading unit 312 extracts the metadata of the cluster.

In Step S808, the reading unit 312 extracts data to be read. Specifically, the reading unit 312 extracts the logical address of the cluster to be read which is included in the received read request. The reading unit 312 extracts the logical address included in the extracted metadata of each cluster. The reading unit 312 compares the extracted logical address of the cluster to be read with the extracted logical address included in the metadata of each cluster and determines the cluster with the identical logical address to be the cluster to be read.

When there are a plurality of clusters with the same logical address, the reading unit 312 determines the last cluster in the page 402 among the plurality of clusters to be the cluster to be read. Therefore, the reading unit 312 sequentially compares the logical addresses from the last cluster in the page 402, which makes it possible to reduce the time required for comparison.

In Step S810, the controller 310 decompresses the data to be read and returns the decompressed data to the host apparatus. Specifically, the reading unit 312 transmits the cluster data which has been determined to be the cluster to be read to the decompression unit 105, instructs the decompression unit 105 to decompress the cluster data, and acquires the decompressed cluster data. In some cases, the reading unit 312 does not transmit the cluster data which has been determined to be the cluster to be read to the decompression unit 105, if necessary. In this case, the reading unit 312 replaces the decompressed cluster data in the subsequent process with the cluster data to be read which is not transmitted to the decompression unit 105. For example, when the cluster data is stored in the storage medium 251 without being compressed, the reading unit 312 does not transmit the cluster data to the decompression unit 105. The reading unit 312 transmits the acquired decompressed cluster data to the read request source. When receiving the data read from the reading unit 312, the read control unit 314 transmits the received data to the interface unit 106. When receiving the data from the read control unit 314, the interface unit 106 transmits the received data to the host apparatus (not illustrated).

Figure 22:
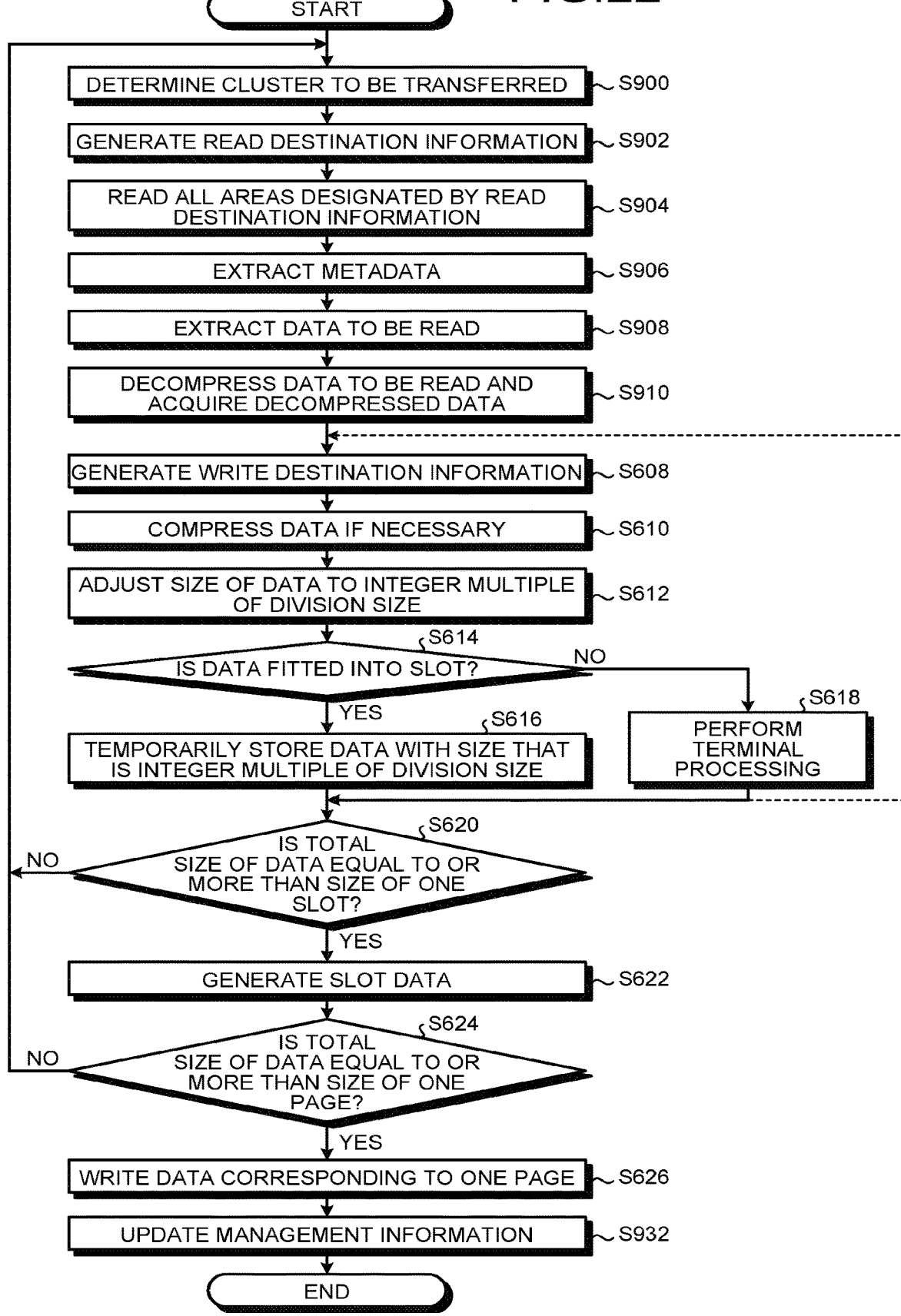
FIG. 22 is a flowchart illustrating an example of the procedure of a transfer process according to the third embodiment.

Next, the procedure of the transfer process performed by the data storage device 300 will be described with reference to FIG. 22. FIG. 22 is a flowchart illustrating an example of the procedure of the transfer process performed by the data storage device 300. The transfer control unit 315 controls the transfer process illustrated in FIG. 22 according to a predetermined rule. In the flowchart illustrated in FIG. 22, the transfer control unit 315 is used instead of the transfer control unit 215, as compared to the flowchart illustrated in FIG. 16. However, in the flowchart illustrated in FIG. 22, processes which are substantially the same as those illustrated in FIG. 16 are denoted by the same reference numerals as those in FIG. 16.

(Transfer Process)

In Step S900, the transfer control unit 315 determines the cluster to be transferred. Specifically, the transfer control unit 315 instructs the first access unit 102 to read the management information from the first memory 352 and acquires the management information. The transfer control unit 315 determines the cluster to be transferred from the acquired management information using a predetermined method. In the third embodiment, any known method may be used to determine the cluster to be transferred. The transfer control unit 315 extracts the logical address of the determined cluster from the acquired management information.

In Step S902, the transfer control unit 315 generates the read destination information. Specifically, the transfer control unit 315 acquires information associated with the extracted logical address. For example, the transfer control unit 315 instructs the first access unit 102 to read the physical address of the storage medium 251 indicated by the converted logical address in the address mapping table 164, and acquires information indicating the physical address. The physical address includes the block number information and the page number information.

In Step S904, the transfer control unit 315 reads all of the areas designated by the read destination information. Specifically, the transfer control unit 315 instructs the reading unit 312 to perform a reading process, using the acquired physical address as the read destination information and the converted logical address as the logical address of the cluster to be read. The reading unit 312 receives a cluster read request from the read request source. The cluster read request includes the read destination information and data indicating the logical address of the cluster to be read. The read destination information includes the block number and the page number. The reading unit 312 extracts the block number and the page number from the acquired read destination information, instructs the storage medium access unit 101 to read the data of the page 402 with the extracted page number in the block 400 with the extracted block number, and acquires the data of the page.

The page 402 stores a plurality of slots, but the number of slots stored in the page 402 may be changed. The unit of data input and output for the storage medium 251 is the page 402. Therefore, even when all data of the page is read, no new process is needed.

In Step S906, the transfer control unit 315 extracts the metadata. Specifically, the reading unit 312 corrects the error of slot data included in the acquired data of the page and acquires the error corrected slot data. When error correction fails (error correction is unavailable), the reading unit 312 notifies the read request source of the occurrence of a read error. When receiving a notice indicating the occurrence of the read error from the reading unit 312, the transfer control unit 315 performs a process of maintaining consistency such that an error occurs when the cluster is read after the transfer process. For example, the transfer control unit 315 may transfer the cluster data with the read error, without correcting the read error. In addition, the transfer control unit 315 may insert information indicating that the read error occurs when the logical address is read into the management information stored in the first memory 352 such that the cluster data with the read error is not transferred. When error correction succeeds (error correction is available), the reading unit 312 extracts the metadata of each slot from the error corrected data. The reading unit 312 calculates the arrangement pattern of the clusters stored in each slot from the magic number included in the extracted metadata of each slot. When the magic number indicating that the cluster is compressed and stored in the slot is not included in the extracted metadata of each slot, the reading unit 312 determines that the cluster is stored in the slot without being compressed.

The reading unit 312 extracts the metadata of each cluster from the error corrected data according to the calculated arrangement pattern of the clusters. When the metadata of the compressed and stored cluster is stored without being compressed, the reading unit 312 directly extracts the metadata from the error corrected data. When the metadata of the compressed and stored cluster is compressed and stored, the reading unit 312 instructs the decompression unit 105 to decompress the error corrected data and acquires the metadata.

As illustrated in FIG. 19, the cluster stored at the end of the slot is a portion of or the entire compressed cluster according to storage conditions. Therefore, it is necessary to determine whether the cluster stored at the end of the slot is a portion of or the entire compressed cluster. The reading unit 312 decompresses the cluster to determine whether the cluster is a portion of or the entire compressed cluster. Specifically, the reading unit 312 instructs the decompression unit 105 to decompress the cluster stored at the end of the slot. When decompression succeeds and cluster data corresponding to the size of the cluster is obtained by the decompression, the reading unit 312 determines that the cluster is the entire compressed cluster. On the other hand, when decompression fails or cluster data which does not correspond to the size of the cluster is obtained by the decompression, the reading unit 312 determines that the cluster is a portion of the compressed cluster. In FIG. 19, for simplicity of explanation, the storage area of the metadata or the error correction data in the slot is not illustrated.

When it is determined that the first cluster which is stored first in the page 402 is the entire compressed cluster, the reading unit 312 extracts the metadata of the cluster. On the other hand, when it is determined that the first cluster which is stored first in the page 402 is a portion of the compressed cluster (compressed cluster data #6 when the right page of FIG. 19 is a read target page), the reading unit 312 does not extract the metadata of the cluster. The reason is as follows. The physical address of the consecutive page immediately before the cluster is written to the address mapping table 164. Therefore, when there is a request to read the cluster, the reading unit 312 is requested to read the consecutive page immediately before the cluster.

When it is determined that each of the clusters stored at adjacent ends of adjacent slot in the page is a portion of the compressed cluster as in compressed cluster data #4 illustrated in FIG. 19, the clusters are added to form the entire compressed cluster. Therefore, the reading unit 312 extracts the metadata of the entire compressed cluster. When it is determined that each of the clusters stored at adjacent ends of adjacent slot in the page is the entire compressed cluster as in compressed cluster data #1 and #2 illustrated in FIG. 19, the reading unit 312 extracts the metadata of each cluster.

When it is determined that the last cluster which is stored last in the page 402 is a portion of the compressed cluster as in compressed cluster data #6 in the left page, which is a read target page, illustrated in FIG. 19, the last cluster is added to the first cluster which is stored first in the next page 402 with a consecutive physical address to form the entire cluster data. Therefore, the reading unit 312 acquires data stored in the next consecutive page 402 using the same process as that up to the error correction process, adds the last cluster and the first cluster which is stored first in the next page 402 with a consecutive physical address, and extracts the entire cluster data. In addition, the reading unit 312 extracts the metadata of the entire cluster data. On the other hand, when it is determined that the last cluster which is stored last in the page 402 is the entire compressed cluster, the reading unit 312 extracts the metadata of the cluster.

In Step S908, the reading unit 312 extracts the data to be read. Specifically, the reading unit 312 extracts the logical address of the cluster to be read which is included in the received read request. The reading unit 312 extracts the logical address included in the extracted metadata of each cluster. The reading unit 312 compares the extracted logical address of the cluster to be read with the extracted logical address included in the metadata of each cluster and determines the cluster with the identical logical address to be the cluster to be read.

When there are a plurality of clusters with the same logical address, the reading unit 312 determines the last cluster in the page 402 among the plurality of clusters to be the cluster to be read. Therefore, the reading unit 312 sequentially compares the logical addresses from the last cluster in the page 402, which makes it possible to reduce the time required for comparison.

In Step S910, the reading unit 312 decompresses the read target data which has been read. Specifically, the reading unit 312 transmits the cluster data which has been determined to be the cluster to be read to the decompression unit 105, instructs the decompression unit 105 to decompress the cluster data, and acquires the decompressed cluster data. In some cases, the reading unit 312 does not transmit the cluster data which has been determined to be the cluster to be read to the decompression unit 105, if necessary. In this case, the reading unit 312 replaces the decompressed cluster data in the subsequent process with the cluster data to be read which is not transmitted to the decompression unit 105. For example, when the cluster data is stored in the storage medium 251 without being compressed, the reading unit 312 does not transmit the cluster data to the decompression unit 105. The reading unit 312 transmits the acquired cluster data to the read request source. The transfer control unit 315 receives the data read from the reading unit 312.

In Step S932, the transfer control unit 315 updates the management information. Specifically, the writing unit 211 transmits a notice indicating that the writing of data to the write destination page has been completed to the write request source. When receiving the write completion notice from the writing unit 211, the transfer control unit 315 updates the address mapping table 164 for the cluster written to the page. The transfer control unit 315 instructs the first access unit 102 to perform a writing process such that the physical address of the storage medium 251 indicated by the converted logical address in the address mapping table 164 is updated to the physical address of the storage medium 251, which is a write destination, for the cluster written to the page. However, the physical address to be updated of the storage medium 251, which a write destination, includes the block number information and the page number information included in the generated write destination information. When the first cluster which is stored first in the page 402 is a portion of the compressed cluster data (corresponding to compressed cluster data #6 when the right page of FIG. 19 is the page to which the writing of data has been completed), the transfer control unit 315 does not update the address mapping table 164 for the cluster. This is because the physical address of the previous consecutive page is registered in the address mapping table 164 for the cluster.

As such, according to the third embodiment, it is possible to reduce the size of the address mapping table 164, as compared to the size of the address mapping table 162 according to the second embodiment. That is, according to the third embodiment, it is possible to reduce memory capacity required for the first memory 352, as compared to memory capacity required for the first memory 252 according to the second embodiment.

(Fourth Embodiment)

However, in the first to third embodiments, in some cases, the writing unit 111 or the writing unit 211 gives an instruction not to compress data. In addition, in some cases, the reading unit 112, the reading unit 212, or the reading unit 312 gives an instruction not to decompress data. The fourth embodiment is an example of a combination of a structure in which the compression process is not performed and a structure in which the decompression process is not performed. The combination of the structure in which the compression process is not performed and the structure in which the decompression process is not performed in the fourth embodiment is an illustrative example, but other combinations thereof may be made. Here, the fourth embodiment, which is a modification of the data storage device 300, will be described. However, the fourth embodiment may be a modification of the data storage device 100 or the data storage device 200.

(First Combination)

First, a first combination will be described. In the first combination, the data storage device 300 (the data storage device 100 or the data storage device 200) does not compress and store the data which is requested to be written by the host apparatus, but stores the data to be transferred. That is, when the cluster data which is requested to be written by the host apparatus is stored in the storage medium, the data storage device 300 does not compress the cluster data. When the cluster data to be transferred is stored in the storage medium, the data storage device 300 compresses the cluster data. When reading the cluster data which has been requested to be written by the host apparatus and then stored in the storage medium, the data storage device 300 does not decompress the read cluster data. When reading the cluster data which has been transferred and stored in the storage medium from the storage medium, the data storage device 300 decompresses the read cluster data.

Specifically, when receiving a write request from the write control unit 313, the writing unit 211 does not transmits the cluster data to be written to the compression unit 104 and instructs the storage medium access unit 101 to write the cluster data, which is a write target, to the storage medium 251. Therefore, when the data which has been requested to be written by the host apparatus and then stored in the storage medium is read, the reading unit 312 returns the data read from the storage medium 251 to the read request source, without transmitting the data to the decompression unit 105, since the data stored without being compressed.

When receiving a write request from the transfer control unit 315, the writing unit 211 transmits the cluster data to be written to the compression unit 104 and instructs the storage medium access unit 101 to write the compressed data to the storage medium 251. Therefore, when the transferred data is read, the reading unit 312 transmits the data read from the storage medium 251 to the decompression unit 105 since the data is compressed and stored and returns the decompressed data to the read request source.

(Second Combination)

Next, a second combination based on the first combination will be described. In the first combination, in the data storage device 300, the transferred data is compressed and stored. Therefore, in the second combination, when the previously transferred data is a transfer source, the data, which is the transfer source, is read in a compressed state and is then written to a transfer destination in the compressed state. In this way, a data decompression process during reading in the transfer process and a data compression process during writing in the transfer process are reduced.

In the controller of the data storage device according to the second combination, the transfer control unit makes control that does not decompress a piece of cluster data read for piece of cluster data to be transferred again and being written into the storage medium by the control of the transfer control unit among the pieces of cluster data to be transferred which are determined according to a predetermined rule, and a control that does not compress the pieces of cluster data by the external compression unit, in addition to the controller of the data storage device according to the first combination.

Specifically, when receiving a write request from the write control unit 313, the writing unit 211 instructs the storage medium access unit 101 to write cluster data, which is a write target, to the storage medium 251, without transmitting the cluster data to the compression unit 104. When reading the data which has been requested to be written by the host apparatus and then stored in response to a read request from the host apparatus, the reading unit 312 returns the data read from the storage medium 251 to the read request source, without transmitting the data to the decompression unit 105, since the data is stored without being compressed.

When the data to be read has been previously transferred and is requested to be read by a read control unit of the host apparatus, the reading unit 312 transmits the data read from the storage medium 251 to the decompression unit 105 since the data is compressed and stored and returns the decompressed data to the read request source.

When the data to be read has been previously transferred and is requested to be read by the transfer control unit, the reading unit 312 returns the data read from the storage medium 251 to the read request source, without transmitting the data to the decompression unit 105 in order to reduce the data decompression process during reading in the transfer process although the data is compressed and stored.

In a case in which a write request is received from the transfer control unit 315, when the data to be transferred has not been previously transferred (the data has been requested to be written by the host apparatus and has not been transferred), the writing unit 211 transmits the cluster data to be written to the compression unit 104 and instructs the storage medium access unit 101 to write the compressed data to the storage medium 251.

In a case in which a write request is received from the transfer control unit 315, when the data to be transferred has been previously transferred, the writing unit 211 instructs the storage medium access unit 101 to write the cluster data, which is a write target, to the storage medium 251, without transmitting the cluster data to the compression unit 104, in order to reduce the data compression process during writing in the transfer process.

(Third Combination)

Next, a third combination will be described. In the third combination, the data storage device 300 compresses and stores the data which is requested to be written by the host apparatus, constantly reads the compressed data, which is a transfer source, in the transfer process, and writes the compressed data to a transfer destination. In this way, the data decompression process during reading in the transfer process and the data compression process during writing in the transfer process are constantly reduced.

In the third combination, the write control unit in the controller of the data storage device 300 (the data storage device 100 or the data storage device 200) performs control such that the compression unit compresses the cluster data, the read control unit performs control such that the decompression unit decompresses the cluster data, the transfer control unit performs control such that the decompression unit does not decompress the cluster data and the compression unit does not compress the cluster data.

Specifically, when receiving a write request from the write control unit 313, the writing unit 211 transmits the cluster target to be written to the compression unit 104 and instructs the storage medium access unit 101 to write the compressed data to the storage medium 251.

When receives a read request from the transfer control unit 315, the reading unit 312 returns the data read from the storage medium 251 to the read request source, without transmitting the data to the decompression unit 105, in order to reduce the data decompression process during reading in the transfer process although the data is compressed and stored.

When a write request is received from the transfer control unit 315, the writing unit 211 instructs the storage medium access unit 101 to write the cluster data, which is a write target, to the storage medium 251, without transmitting the cluster data to the compression unit 104 in order to reduce the data compression process during writing in the transfer process.

When a read request is received from the read control unit 314, the reading unit 312 transmits the data read from the storage medium 251 to the decompression unit 105 since the data is compressed and stored and returns the decompressed data to the read request source.

(Fourth Combination)

Next a fourth combination will be described. In the fourth combination, when the time required for the compression process is equal to or greater than a predetermined threshold value, the data storage device 300 cancels a process of compressing and storing the cluster and stores the cluster without compression.

In the fourth combination, the write control unit in the controller of the data storage device 300 (the data storage device 100 or the data storage device 200) performs control such that, when the time required for the compression unit to compress cluster data is equal to or more than a predetermined time, the compression of the cluster data by the compression unit is cancelled, the cluster data whose compression is cancelled is written to the storage medium according to the physical address of a write destination, and the correspondence between the logical address and the physical address of the write destination is written to the storage unit; the read control unit performs control such that, when the read cluster data is not compressed, the read cluster data is output without being decompressed by the decompression unit; and the transfer control unit performs control such that, when the read cluster data is not compressed, the decompression unit does not decompress the read cluster data, and when the time required for the compression unit to compress the cluster data is equal to or more than a predetermined time, the compression of the cluster data by the compression unit is cancelled, the cluster data whose compression is cancelled is written to the storage medium according to the physical address of a write destination, and the correspondence between the logical address and the physical address of the write destination is written to the storage unit.

Specifically, the writing unit 211 transmits the cluster data to be written to the compression unit 104. When receiving the compressed data from the compression unit 104 at the time that is less than the predetermined threshold value, the writing unit 211 instructs the storage medium access unit 101 to write the acquired compressed cluster data to the storage medium 251. Therefore, when the compressed and stored data is read, the reading unit 312 transmits the data read from the storage medium 251 to the decompression unit 105 and returns the decompressed data to the read request source.

The writing unit 211 transmits the cluster data to be written to the compression unit 104. When the compressed data is not received from the compression unit 104 after the time equal to or more than the predetermined threshold value has elapsed, the writing unit 211 instructs the storage medium access unit 101 to write the (non-compressed) cluster data, which is a write target, to the storage medium 251. Therefore, when the data which is stored without being compressed is read, the reading unit 312 returns the data read from the storage medium 251 to the read request source, without transmitting the data to the decompression unit 105.

However, in general, the time required for the data compression process is relatively longer than that required for the data transfer process. Here, the peak write performance of the data storage device 300 represents the performance when it is not necessary to perform the transfer process and only the writing process requested by the host apparatus is performed. Therefore, in the first combination or the second combination in which the data compression process is not performed in the writing process requested by the host apparatus, it is possible to improve the peak write performance of the data storage device.

In a semiconductor storage medium, such as NAND flash memory, the time required for the data writing process is more than that required for the data transfer process or the data reading process. When the compression efficiency of the data which is requested to be written is very high, the amount of data written to the semiconductor storage medium is significantly reduced. As a result, the time required to write data to the semiconductor storage medium is significantly reduced. Therefore, in some cases, the total processing time including the time required to compress data is reduced. When the compression efficiency of data is very high, the data storage device 300 according to the third combination of the fourth embodiment performs the data compression process in the writing process requested by the host apparatus. In this way, it is possible to improve the write performance of the data storage device. In addition, in the data storage device 300 according to the third combination of the fourth embodiment, since the data compression process is performed in the writing process requested by the host apparatus, it is possible to minimize the amount of data written to the storage medium. Therefore, it is possible to maximize the lifespan of the data storage device.

In the data storage device 300 according to the fourth combination of the fourth embodiment, when the time required for the compression process is equal to or greater than the predetermined threshold value, the process of compressing and storing the cluster data is cancelled and the cluster data is stored without being compressed. Therefore, it is possible to appropriately set the balance between an improvement in the write performance of the data storage device and an increase in the lifespan of the data storage device.

(Fifth Embodiment)

As an example of the effect of the fourth embodiment, the peak write performance of the data storage device 300 is improved. However, when the data which is requested to be written by the host apparatus is stored in the storage medium without being compressed, the capacity of data written to the storage medium is more than that when data is stored without being compressed, even though data is compressed and stored in the storage medium in the transfer process.

However, in general, when the compression ratio of data increases, the time required to compress data increases. When the compression ratio of data is reduced, the time required to compress data is reduced. Therefore, the data which is requested to be written by the host apparatus is compressed at a low compression ratio and is then stored in the storage medium. Data is written at a high compression ratio in the transfer process and is then stored in the storage medium. In this way, it is possible to reduce the capacity of data written to the storage medium, without damaging the peak write performance of the data storage device.

Next, a detailed example of the fifth embodiment will be described. Here, the fifth embodiment is a modification of the data storage device 300. However, the fifth embodiment may be a modification of the data storage device 100 or the data storage device 200. Combinations of the structures of the data storage device 300 according to the fifth embodiment are illustrative, but the data storage device 300 may have various other combinations of the structures.

(First Combination)

First, a first combination will be described. In the first combination, the write control unit in the controller of the data storage device 300 (the data storage device 100 or the data storage device 200) performs control such that data which is requested to be written by an external apparatus is converted into a plurality of cluster data pieces with the size of the cluster, an external compression unit compresses the converted cluster data at a first compression ratio, the compressed cluster data is written to the storage medium according to the physical address of a write destination, and the correspondence between the logical address and the physical address of the write destination is written to the storage unit; the read control unit performs control such that the physical address of data which is requested to be read by the external apparatus is acquired from the storage unit, the cluster data is read from the storage medium according to the acquired physical address, an external decompression unit decompresses the read cluster data at the first compression ratio or a second compression ratio higher than the first compression ratio, and the decompressed cluster data is output; and the transfer control unit performs control such that the cluster data to be transferred among the cluster data pieces written to the storage medium is determined according to a predetermined rule, the determined cluster data is read from the storage medium, the external decompression unit decompresses the read cluster data at the first compression ratio or the second compression ratio, the external compression unit compresses the decompressed cluster data at the second compression ratio, the compressed cluster data is written to the storage medium according to the physical address of a transfer destination, and the correspondence between the logical address and the physical address of the transfer destination is written to the storage unit.

Specifically, in the data storage device 300 according to the first combination, the compression unit 104 can set a plurality of compression ratios. The decompression unit 105 can decompress each of the data pieces which are compressed at the plurality of compression ratios. When a write request is received from the write control unit 313, the writing unit 211 transmits the cluster data to be written to the compression unit 104 such that the compression unit compresses the cluster data at a low compression ratio and instructs the storage medium access unit 101 to write the compressed data to the storage medium 251. Therefore, when data which is requested to be written by the host apparatus is read, the reading unit 312 transmits the data read from the storage medium 251 to the decompression unit 105 since the data is compressed at the low compression ratio, instructs the decompression unit 105 to decompress the data compressed at the low compression ratio, and returns the decompressed data to the read request source.

When receiving a write request from the transfer control unit 315, the writing unit 211 transmits the cluster data to be written to the compression unit 104 such that the compression unit 104 compresses the cluster data at a high compression ratio, and instructs the storage medium access unit 101 to write the compressed data to the storage medium 251. Therefore, when the transferred data is read, the reading unit 312 transmits the data read from the storage medium 251 to the decompression unit 105 since the data is compressed at the high compression ratio, instructs the decompression unit 105 to decompress the data compressed at the high compression ratio, and returns the decompressed data to the read request source.

(Second Combination)

Next, a second combination will be described. In the second combination, in the data storage device 300, when the previously transferred data is a transfer source and the compression ratio in the previous transfer process is equal to that in the current transfer process, the compressed data, which is the transfer source, is read without being decompressed and is then written to a transfer destination, similarly to the second combination of the fourth embodiment. In this way, the data decompression process during reading in the transfer process and the data compression process during writing in the transfer process are reduced.

Specifically, the compression unit 104 can set a plurality of compression ratios and the decompression unit 105 can set a plurality of compression ratios. When receiving a write request from the write control unit 313, the writing unit 211 transmits the cluster data to be written to the compression unit 104 such that the compression unit 104 compresses the cluster data at a low compression ratio, and instructs the storage medium access unit 101 to write the compressed data to the storage medium 251. Therefore, when data which has been requested to be written by the host apparatus and then stored is read, the reading unit 312 transmits the data read from the storage medium 251 to the decompression unit 105 since the data is compressed at the low compression ratio, instructs the decompression unit 105 to decompress the data compressed at the low compression ratio, and returns the decompressed data to the read request source.

When the data to be read has been previously transferred and is requested to be read by the read control unit 314, the reading unit 312 transmits the data read from the storage medium 251 to the decompression unit 105 since the data is compressed at a high compression ratio and is then stored, instructs the decompression unit 105 to decompress the data compressed at the high compression ratio, and returns the decompressed data to the read request source.

In a case in which the data to be read has been previously transferred and is requested to be read by the transfer control unit, when the data is compressed at a high compression ratio and is then stored and the compression ratio in the previous transfer process is equal to that in the current transfer process, the reading unit 312 transmits the data read from the storage medium 251 to the read request source, without transmitting the data to the decompression unit 105, in order to reduce the data decompression process during reading in the transfer process.

When a write request is received from the transfer control unit 315 and the data to be transferred has not been previously transferred (the data has not been requested to be written by the host apparatus and transferred), the writing unit 211 transmits the cluster data to be written to the compression unit 104 such that the compression unit 104 compresses the cluster data at a high compression ratio, and instructs the storage medium access unit 101 to write the compressed data to the storage medium 251.

On the other hand, in a case in which a write request is received from the transfer control unit 315 and the data to be transferred has been previously transferred, when the compression ratio in the previous transfer process is equal to that in the current transfer process, the writing unit 211 instructs the storage medium access unit 101 to write the cluster data, which is a write target, to the storage medium 251, without transmitting the cluster data to the compression unit 104 in order to reduce the data compression process during reading in the transfer process.

(Sixth Embodiment)

A data storage device without a data compression function provides, to the host apparatus, a capacity obtained by subtracting a predetermined capacity required for, for example, a transfer process from the capacity of the storage medium capable of storing data as a capacity (hereinafter, referred to as declared capacity) which is allowed to be used for the host apparatus. In the sixth embodiment, a variation in the structure of the declared capacity in the data storage device with the data compression function according to the first to fifth embodiments will be described. The data storage device without the data compression function according to the sixth embodiment and the data storage device with the data compression function according to the first to fifth embodiments are similar in the capacity of the storage medium capable of storing data and the capacity required for, for example, the transfer process, but the invention is not limited thereto. The sixth embodiment may be a modification of the data storage device 100, the data storage device 200, or the data storage device 300.

(First Structure)

The first structure of the declared capacity provides the same declared capacity as that of the data storage device without the data compression function to the host apparatus. In this structure, the amount of data written to the storage medium is reduced according to the compression result of data and the lifespan of the data storage device increases.

(Second Structure)

In the data storage device with the data compression function, the amount of data which is actually stored in the storage medium is the same as that in a case in which data is not compressed according to the compression result of data, but the data storage device stores a large amount of data than the case. Therefore, the second structure provides a capacity more than the declared capacity of the data storage device without the data compression function to the host apparatus.

In some cases, in practice, a data capacity less than the declared capacity provided to the host apparatus is stored in the storage medium according to the compression result of data. In this case, it is difficult to process a new write request from the host apparatus. Therefore, in this case, the data storage device returns a write error in response to a new write request from the host apparatus. In addition, the data storage device may have a function of notifying the host apparatus of the remaining capacity capable of storing data according to the compression result of data.

As described in the second embodiment, when the size of the compressed data is set to a predetermined unit, the data storage device 200 according to the sixth embodiment may use the maximum value of the declared capacity as a capacity capable of storing data at the maximum compression ratio. In this case, when it is difficult to process the write request from the host apparatus, the data storage device returns a write error.

Specifically, for example, when the data size of the compressed cluster is adjusted to one of four parts divided from the area in which a non-compressed cluster is stored, the maximum value of the declared capacity may be four times the declared capacity of the data storage device without the data compression function. However, in this case, there are the above-mentioned restrictions.

In this structure, the capacity of data written to the storage medium is reduced according to the compression result of data and the lifespan of the data storage device increases. In addition, it is possible to provide a declared capacity more than that of the data storage device without the data compression function to the host apparatus.

(Seventh Embodiment)

However, in the first to sixth embodiments, reversible compression is assumed as the compression and decompression processes. There is irreversible compression in which, when the compressed data is decompressed, the decompressed data does not return to the data before compression. Here, a mismatched portion between the data before compression and data obtained by decompressing the irreversibly compressed data may be considered as the error of the data obtained by decompressing the irreversibly compressed data with respect to the data before compression. Therefore, when an error correction code is generated using the data before compression as a base for generating the error correction data, the data obtained by decompressing the irreversibly compressed data can be corrected with the error correction code as long as the number of mismatched portions is within the range in which errors can be corrected with the generated error correction code. In this way, it is possible to obtain the data before compression. In the seventh embodiment, it is assumed that the number of mismatched portions is within the range in which errors can be corrected with the generated error correction code. The seventh embodiment may be a modification of the data storage device 100, the data storage device 200, or the data storage device 300.

When the cluster data is stored in the storage medium, the data storage device 200 generates error correction data for correcting the irreversibly compressed data, using the data before compression as a base for generating the error correction data, and irreversible compresses the cluster data. Then, the data storage device 200 stores the irreversibly compressed cluster data and the generated error correction data for correcting the irreversibly compressed data so as to be associated with each other.

When the cluster data is read from the storage medium, the data storage device 200 decompresses the read cluster data as the irreversibly compressed data and corrects the decompressed cluster data with the error correction data for correcting the irreversibly compressed data which is stored associated with the read cluster data.

Next, the seventh embodiment will be described as a modification of the second embodiment. When the size obtained by adding the metadata of the cluster to be compressed and the compressed cluster data is equal to or less than an integer multiple of the division size, the writing unit 211 according to the second embodiment writes the dummy data to the remainder of the area of the data obtained by adding the metadata of the cluster to be compressed and the compressed cluster data in the area with a size that is an integer multiple of the division size, thereby setting the size of the cluster data to the size that is an integer multiple of the division size.

Figure 23:
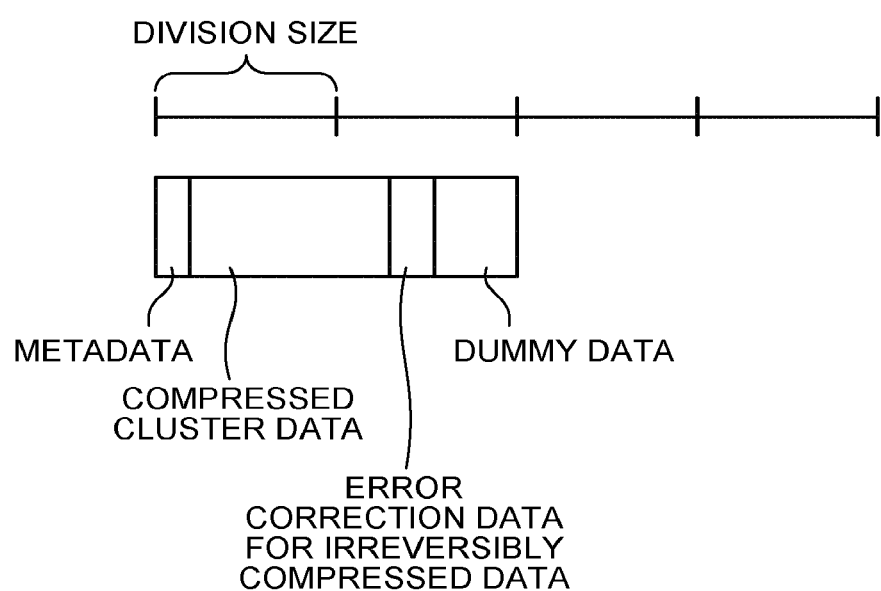
FIG. 23 is a schematic diagram illustrating an example of data including error correction data for correcting irreversibly compressed data.

As illustrated in FIG. 23, when the size of data obtained by adding the metadata of the cluster to be compressed, the compressed cluster data, and the error correction data for correcting the irreversibly compressed data, which is error correction data generated using the data before compression as a base for generating the error correction data, is equal to or less than an integer multiple of the division size, the writing unit 211 according to the seventh embodiment writes the dummy data to the remainder of the area of the data obtained by adding the metadata of the cluster to be compressed, the compressed cluster data, and the error correction data for correcting the irreversibly compressed data in the area with a size that is an integer multiple of the division size, thereby setting the size of the cluster data to the size that is an integer multiple of the division size.

The reading unit 212 according to the second embodiment transmits the extracted cluster data to the decompression unit 105, instructs the decompression unit 105 to decompress the cluster data, and acquires the decompressed cluster data. In contrast, the reading unit 212 according to the seventh embodiment transmits the extracted cluster data to the decompression unit 105, instructs the decompression unit 105 to decompress the cluster data, acquires the decompressed cluster data, uses the decompressed cluster data as a base for generating the error correction data, extracts the error correction data for correcting the irreversibly compressed data for the cluster, performs error correction using the error correction data for correcting the irreversibly compressed data as the error correction data, and acquires the error corrected cluster data.

As such, the data storage device 200 according to the seventh embodiment may perform an irreversible compression process and a process of decompressing the irreversibly compressed data.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A controller that controls reading and writing of data from and to a storage medium, the storage medium including a first block and a second block, each of the first block and the second block being a unit of data erasing, each of the first block and the second block including a plurality of pages, each of the plurality of pages being a unit of data reading or data writing, each of the plurality of pages including at least one cluster set having a size of a predetermined data unit, the at least one cluster set including a plurality of clusters, each of the plurality of pages including at least one set area with a size that is an integer multiple of a size of each of the plurality of clusters, each of the plurality of pages being divided into the at least one set area by a predetermined division size, the storage medium storing a plurality of pieces of cluster data in the plurality of pages, the controller comprising:

a control circuitry configured to generate a piece of cluster data from data requested to be written by an external device, to compress the generated piece of cluster data by an external compression unit, and to write the compressed piece of cluster data to the storage medium, wherein when the control circuitry generates the piece of cluster data from the data requested to be written by the external device, and when a size of the generated piece of cluster data is not equal to the size of the set area, the control circuitry compresses the generated piece of cluster data by the external compression unit at a first compression ratio, and the control circuitry writes the compressed piece of cluster data to the first block, when the control circuitry generates the piece of cluster data from the data requested to be written by the external device, and when writing of the generated piece of cluster data to the first block causes a total size of data in a write destination page of the first block to exceed a size of the write destination page, the control circuitry writes the generated piece of cluster data to the first block across a plurality of pages including the write destination page and a page having a physical address consecutive to a physical address of the write destination page in a management unit in which the first block is managed, when the control circuitry transfers the piece of cluster data from the first block to the second block, the control circuitry reads the piece of cluster data written in the first block, decompresses the read piece of cluster data by an external decompression unit, compresses the decompressed piece of cluster data by the external compression unit at a second compression ratio higher than the first compression ratio to generate second data, and writes the second data to the second block, wherein when the writing of the second data to the second block causes a total size of data in a write destination page of the second block to exceed a size of the write destination page, the control circuitry writes the second data to the second block across a plurality of pages including the write destination page and a page having a physical address consecutive to a physical address of the write destination page in a management unit in which the second block is managed, and the second data is the compressed piece of cluster data compressed by the external compression unit at the second compression ratio.

2. The controller according to claim 1, wherein the at least one cluster set includes at least one piece of the plurality of pieces of cluster data and at least one of metadata, error correction data, and dummy data.

3. The controller according to claim 1, wherein
when the control circuitry reads the piece of cluster data compressed at the first compression ratio or the second compression ratio from the storage medium, the control circuitry decompresses the read piece of cluster data by the external decompression unit.

4. The controller according to claim 1, wherein
the control circuitry is further configured to add dummy data to the piece of cluster data compressed at the first compression ratio so that a size of the piece of cluster data compressed at the first compression ratio is an integer multiple of the division size.

5. The controller according to claim 1, wherein
when the size of the generated piece of cluster data is equal to the size of the set area, the control circuitry is further configured to cancel the compression of the generated piece of cluster data by the external compression unit, and to write the generated piece of cluster data whose compression is cancelled to the storage medium.

6. The controller according to claim 1, wherein
the control circuitry is further configured to cancel the compression of the generated piece of cluster data by the external compression unit when a time required for the compression performed by the external compression unit is equal to or more than a predetermined time.

7. The controller according to claim 1, wherein
the control circuitry is further configured to read a piece of cluster data of the plurality of cluster data from the storage medium, to decompress the read piece of cluster data by the external decompression unit when the read piece of cluster data is compressed, and to output the read piece of cluster data without decompressing by the external decompression unit when the read piece of cluster data is not compressed.

8. The controller according to claim 1, wherein
when the control circuitry reads the piece of cluster data which has been transferred to the second block at the transferring and transfers the read piece of cluster data again, the control circuitry is further configured to not decompress the read piece of cluster data by the external decompression unit, to not compress the read piece of cluster data by the external compression unit, and to write the read piece of cluster data into the storage medium.

9. A controller that controls the reading and writing of data from and to a storage medium, the storage medium including a first block and a second block, each of the first block and the second block being a unit of data erasing, each of the first block and the second block including a plurality of pages, each of the plurality of pages being a unit of data reading or data writing, each of the plurality of pages including at least one cluster set having a size of a predetermined data unit, the at least one cluster set including a plurality of clusters, each of the plurality of pages including at least one set area with a size that is an integer multiple of a size of each of the plurality of clusters, each of the plurality of pages being divided into the at least one set area by a predetermined division size, the storage medium storing a plurality of pieces of cluster data in the plurality of pages, the controller comprising:

a control circuitry configured to generate a piece of cluster data from data requested to be written by an external device, and to write the piece of cluster data to the first block of the storage medium, wherein when a size of the generated piece of cluster data is not equal to the size of the set area, and when the control circuitry transfers the piece of cluster data from the first block to the second block, the control circuitry reads the piece of cluster data written in the first block, compresses the read piece of cluster data by an external compression unit at a certain compression ratio, and writes the compressed piece of cluster data to the second block, wherein when writing of the read piece of cluster data to the second block causes a total size of data in a write destination page of the second block to exceed a size of the write destination page, the control circuitry writes the read piece of cluster data to the second block across a plurality of pages including the write destination page and a page having a physical address consecutive to a physical address of the write destination page in a management unit in which the second block is managed.

10. The controller according to claim 9, wherein
the at least one cluster set includes at least one piece of the plurality of pieces of cluster data and at least one of metadata, error correction data, and dummy data.

11. The controller according to claim 9, wherein
when the control circuitry reads the piece of cluster data compressed at the certain compression ratio from the storage medium, the control circuitry decompresses the read piece of cluster data by an external decompression unit.

12. The controller according to claim 9, wherein
the control circuitry is further configured to add dummy data to the compressed piece of cluster data so that a size of the compressed piece of cluster data is an integer multiple of the division size.

13. The controller according to claim 9, wherein
when the size of the generated piece of cluster data is equal to the size of the set area, the control circuitry does not compress the generated piece of cluster data by the external compression unit, and writes the generated piece of cluster data that is not compressed to the storage medium.

14. The controller according to claim 9, wherein
the control circuitry does not compress the generated piece of cluster data by the external compression unit when a time required for the compression performed by the external compression unit is equal to or more than a predetermined time.

15. The controller according to claim 9, wherein
the control circuitry is further configured to read a piece of cluster data of the plurality of cluster data from the storage medium, to decompress the read piece of cluster data by an external decompression unit when the read piece of cluster data is compressed, and to output the read piece of cluster data without decompressing by the external decompression unit when the read piece of cluster data is not compressed.

16. The controller according to claim 9, wherein
when the control circuitry reads the piece of cluster data which has been transferred to the second block at the transferring and transfers the read piece of cluster data again, the control circuitry is further configured to not decompress the read piece of cluster data by an external decompression unit, to not compress the read piece of cluster data by the external compression unit, and to write the read piece of cluster data into the storage medium.

17. A data storage device that controls reading and writing of data from and to a storage medium, the data storage device comprising:
the storage medium including a first block and a second block, each of the first block and the second block being a unit of data erasing, each of the first block and the second block including a plurality of pages, each of the plurality of pages being a unit of data reading or data writing, each of the plurality of pages including at least one cluster set having a size of a predetermined data unit, the at least one cluster set including a plurality of clusters, each of the plurality of pages including at least one set area with a size that is an integer multiple of a size of each of the plurality of clusters, each of the plurality of pages being divided into the at least one set area by a predetermined division size, the storage medium storing a plurality of pieces of cluster data in the plurality of pages; and
a control circuitry configured to generate a piece of cluster data from data requested to be written by an external device, to compress the generated piece of cluster data by an external compression unit, and to write the compressed piece of cluster data to the storage medium, wherein
when the control circuitry generates the piece of cluster data from the data requested to be written by the external device, and when a size of the generated piece of cluster data is not equal to the size of the set area, the control circuitry compresses the generated piece of cluster data by the external compression unit at a first compression ratio, and the control circuitry writes the compressed piece of cluster data to the first block,
when the control circuitry generates the piece of cluster data from the data requested to be written by the external device, and when writing of the generated piece of cluster data to the first block causes a total size of data in a write destination page of the first block to exceed a size of the write destination page, the control circuitry writes the generated piece of cluster data to the first block across a plurality of pages including the write destination page and a page having a physical address consecutive to a physical address of the write destination page in a management unit in which the first block is managed,
when the control circuitry transfers the piece of cluster data from the first block to the second block, the control circuitry reads the piece of cluster data written in the first block, decompresses the read piece of cluster data by an external decompression unit, compresses the decompressed piece of cluster data by an external compression unit at a second compression ratio higher than the first compression ratio to generate second data, and writes the second data to the second block, wherein when the writing of the second data to the second block causes a total size of data in a write destination page of the second block to exceed a size of the write destination page, the control circuitry writes the second data to the second block across a plurality of pages including the write destination page and a page having a physical address consecutive to a physical address of the write destination page in a management unit in which the second block is managed, and
the second data is the compressed piece of cluster data compressed by the external compression unit at the second compression ratio.

18. The data storage device according to claim 17, wherein
the at least one cluster set includes at least one piece of the plurality of pieces of cluster data and at least one of metadata, error correction data, and dummy data.

19. The data storage device according to claim 17, wherein
when the control circuitry reads the piece of cluster data compressed at the first compression ratio or the second compression ratio from the storage medium, the control circuitry decompresses the read piece of cluster data by the external decompression unit.

20. The data storage device according to claim 17, wherein
the control circuitry is further configured to add dummy data to the piece of cluster data compressed at the first compression ratio so that a size of the piece of cluster data compressed at the first compression ratio is an integer multiple of the division size.

* * * * *